(12) United States Patent
Sugimoto et al.

(10) Patent No.: US 7,489,383 B2
(45) Date of Patent: Feb. 10, 2009

(54) OPTICAL AXIS DEFLECTING METHOD, OPTICAL AXIS DEFLECTING ELEMENT, OPTICAL PATH DEFLECTING UNIT, METHOD OF DRIVING OPTICAL AXIS DEFLECTING ELEMENT, AND IMAGE DISPLAY APPARATUS

(75) Inventors: Hiroyuki Sugimoto, Kanagawa (JP); Yumi Matsuki, Kanagawa (JP); Yukiko Hirano, Kanagawa (JP); Kenji Namie, Kanagawa (JP); Toshiaki Tokita, Kanagawa (JP); Takanobu Osaka, Kanagawa (JP); Koh Fujimura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 472 days.

(21) Appl. No.: 11/409,059

(22) Filed: Apr. 24, 2006

(65) Prior Publication Data

US 2006/0250543 A1 Nov. 9, 2006

(30) Foreign Application Priority Data

Apr. 22, 2005 (JP) ............................. 2005-125787

(51) Int. Cl.
*G09K 19/02* (2006.01)
(52) U.S. Cl. ...................... 349/172; 349/171
(58) Field of Classification Search ................. 349/172, 349/171
See application file for complete search history.

(56) References Cited

U.S. PATENT DOCUMENTS

| 6,919,982 | B2 | 7/2005 | Nimura et al. |
| 7,345,733 | B2 * | 3/2008 | Sugimoto et al. ........... 349/172 |
| 2002/0135729 | A1 | 9/2002 | Tokita et al. |
| 2003/0098945 | A1 | 5/2003 | Sugimoto et al. |
| 2004/0021811 | A1 | 2/2004 | Matsuki et al. |
| 2004/0036829 | A1 | 2/2004 | Sugimoto et al. |
| 2006/0039068 | A1 | 2/2006 | Tokita et al. |

FOREIGN PATENT DOCUMENTS

| JP | 1-101520 | 4/1989 |
| JP | 4-340932 | 11/1992 |
| JP | 5-313116 | 11/1993 |
| JP | 6-18940 | 1/1994 |
| JP | 9-133904 | 5/1997 |
| JP | 10-133135 | 5/1998 |
| JP | 2939826 | 6/1999 |
| JP | 2002-328402 | 11/2002 |
| JP | 3547015 | 4/2004 |

OTHER PUBLICATIONS

"Crystal Optics", Edited by Optics Conference of the Japan Society of Applied Physics, Apr. 25, 1975, cover page and pp. 198-199, with partial English Translation.

* cited by examiner

*Primary Examiner*—Kiet T Nguyen
(74) *Attorney, Agent, or Firm*—Oblon, Spivak, McClelland, Maier & Neustadt, P.C.

(57) ABSTRACT

An optical axis deflecting element is provided with a pair of transparent substrates, a liquid crystal layer disposed between substrate surfaces of the pair of transparent substrates and having a chiral smectic C-phase forming a homeotropic orientation, and a plurality of electrode pairs each defining one of a plurality of divided regions into which an effective region of the liquid crystal layer is divided, wherein an electric field is independently applicable to each divided region defined by a corresponding electrode pair in a direction parallel to the substrate surfaces.

20 Claims, 37 Drawing Sheets

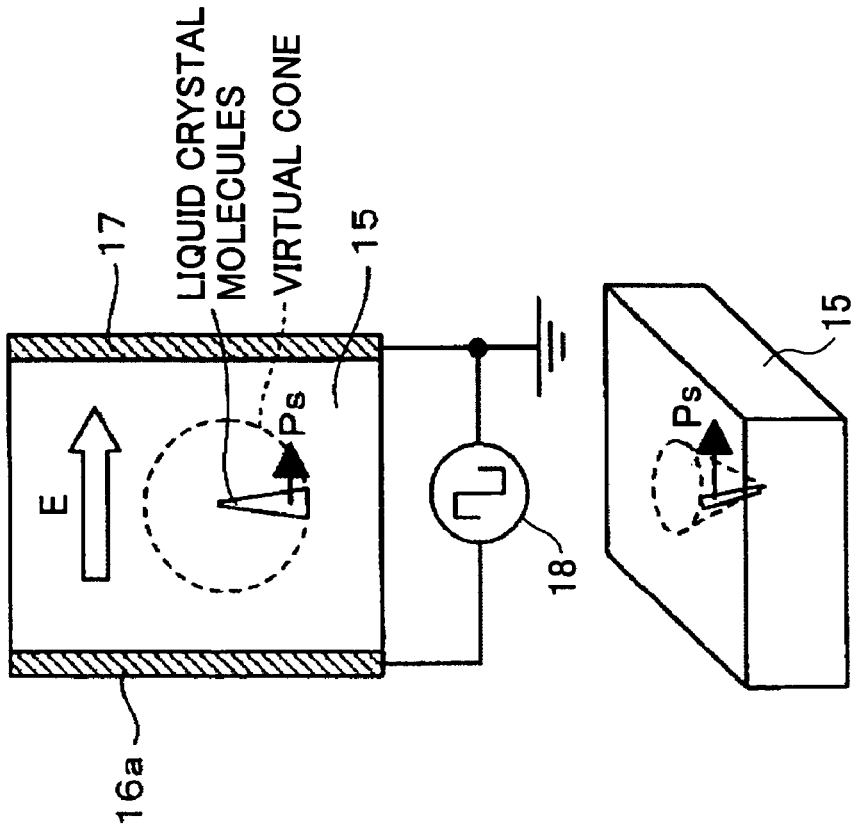
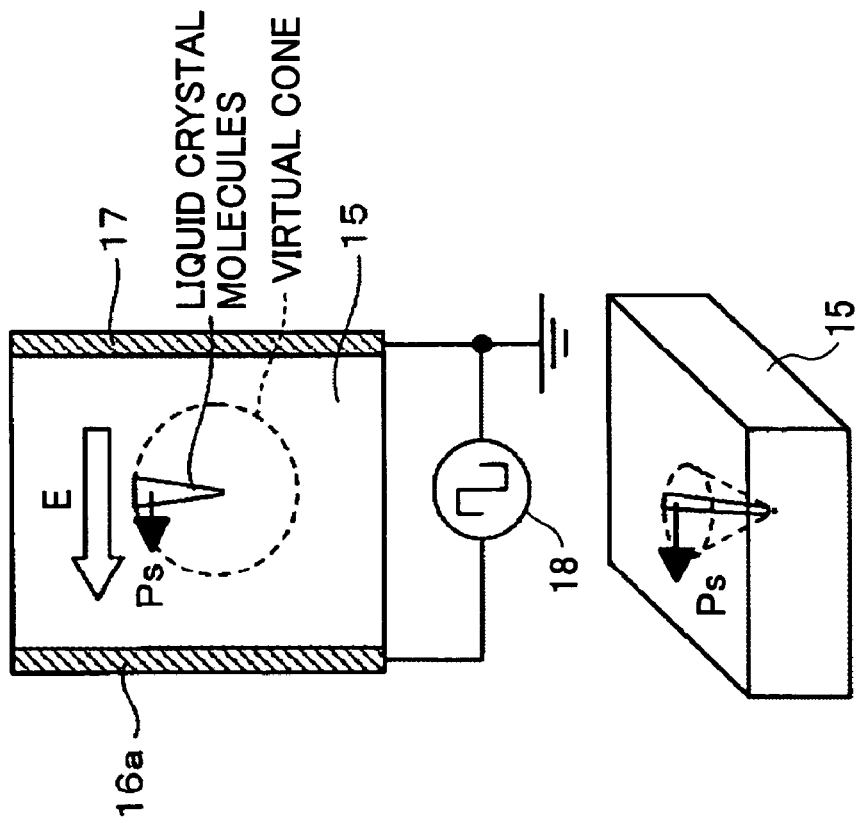

1ST DIVIDED REGION TILT ANGLE OF OPTICAL AXIS

2ND DIVIDED REGION TILT ANGLE OF OPTICAL AXIS

POWER SUPPLY VOLTAGE

SWITCHES

1ST DIVIDED REGION TILT ANGLE OF OPTICAL AXIS

2ND DIVIDED REGION TILT ANGLE OF OPTICAL AXIS

POWER SUPPLY VOLTAGE

SWITCHES

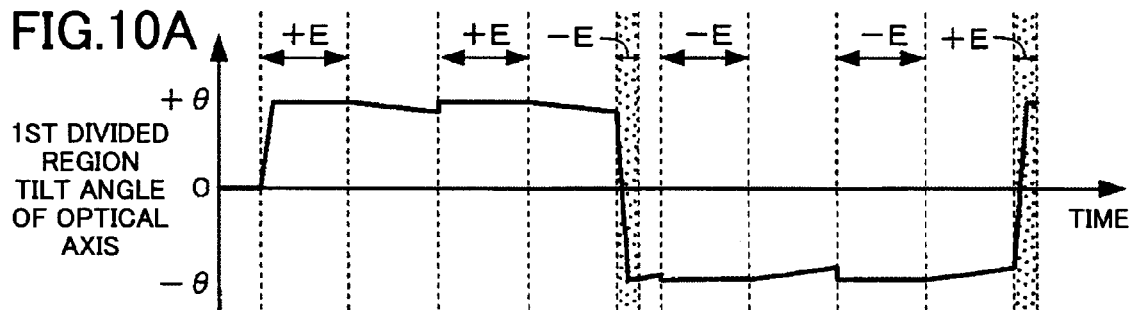
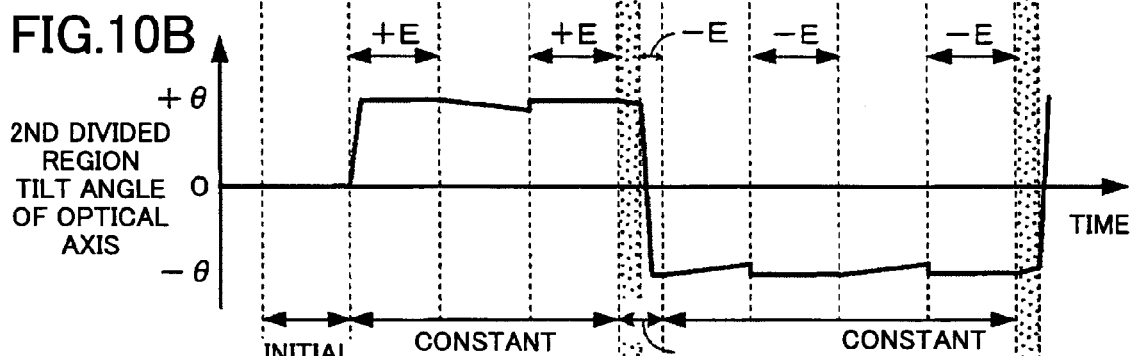
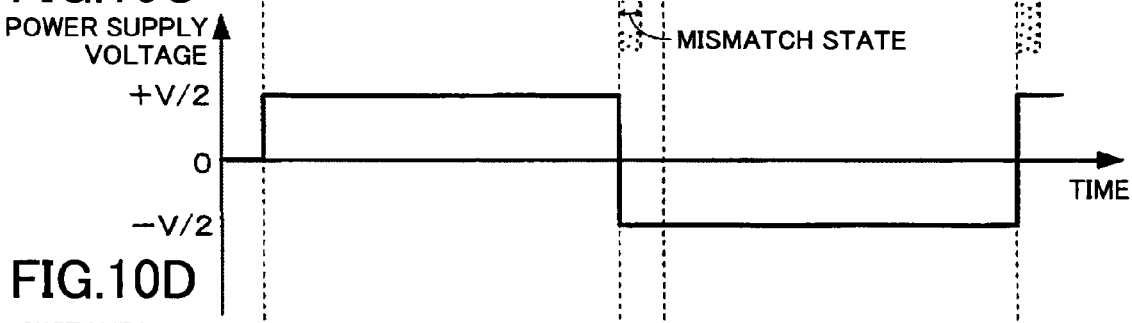
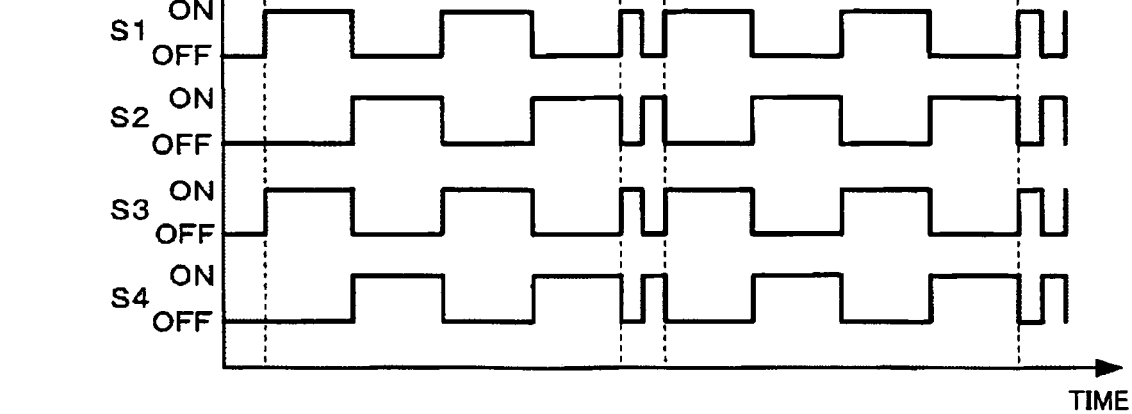

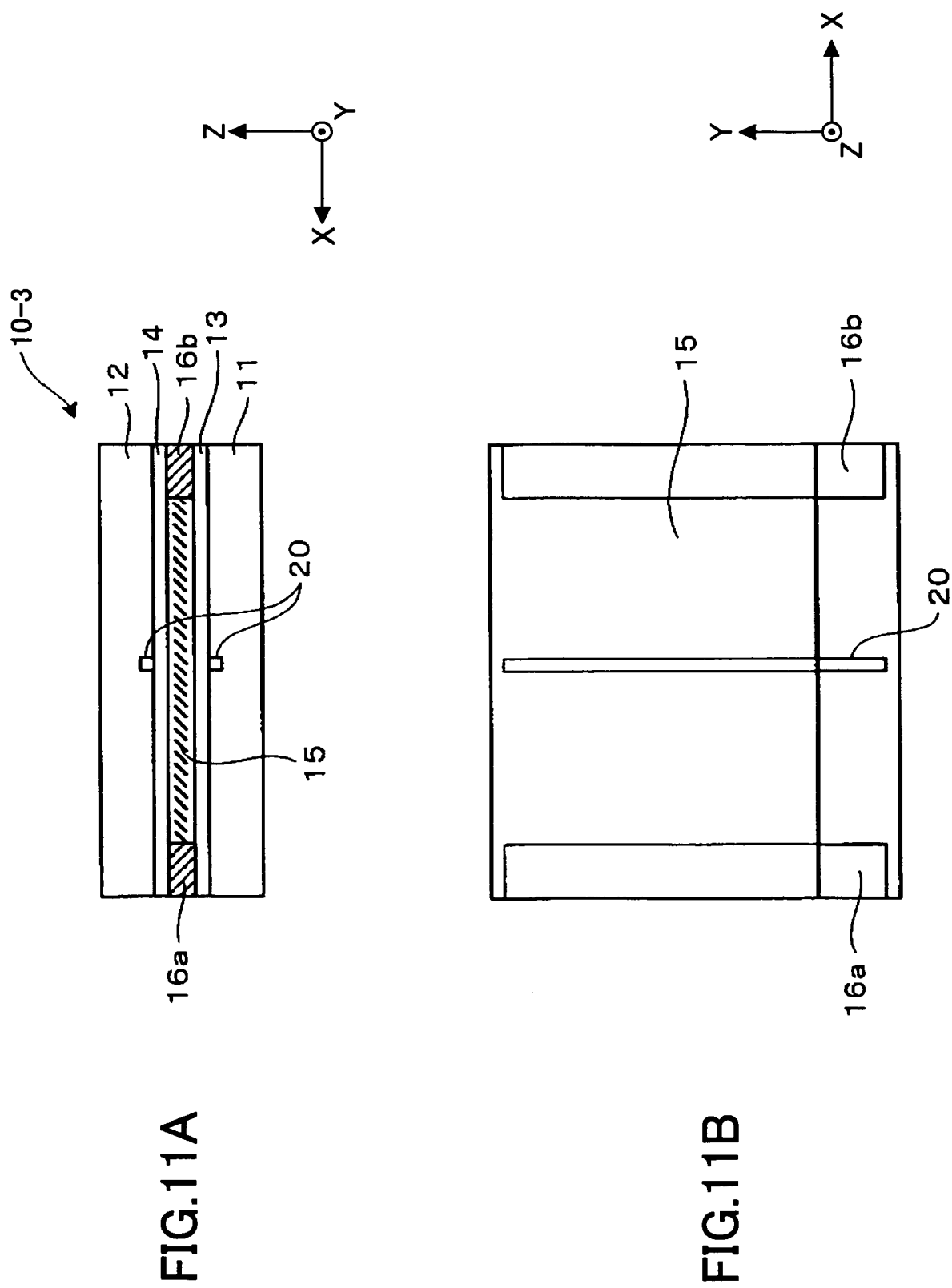

FIG.29
(a)
1ST DIVIDED
REGION 15a
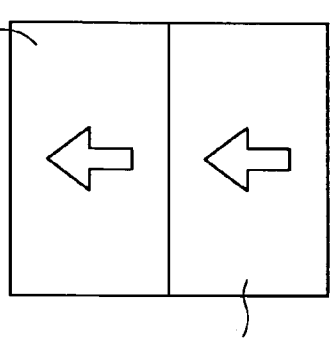
2ND DIVIDED REGION 15b
(b)
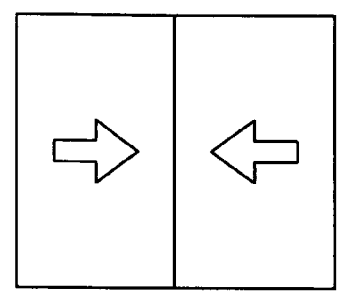
(c)
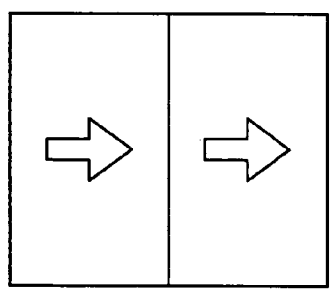
(d)
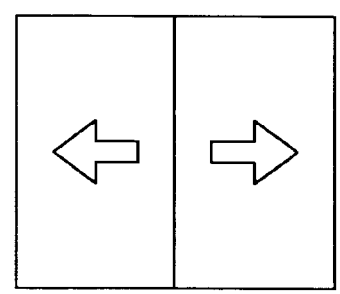
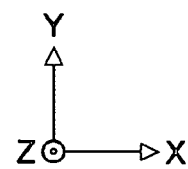

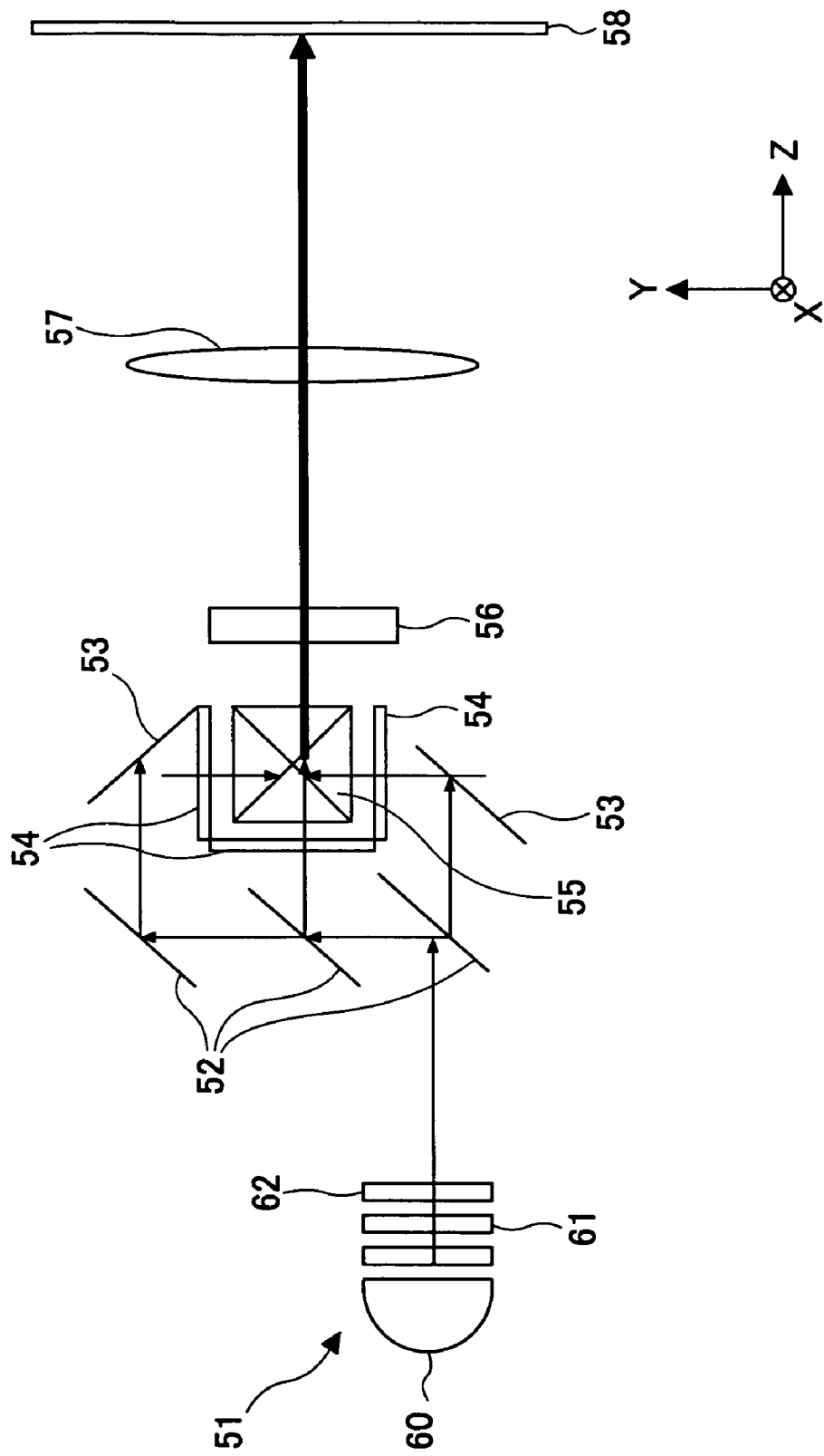

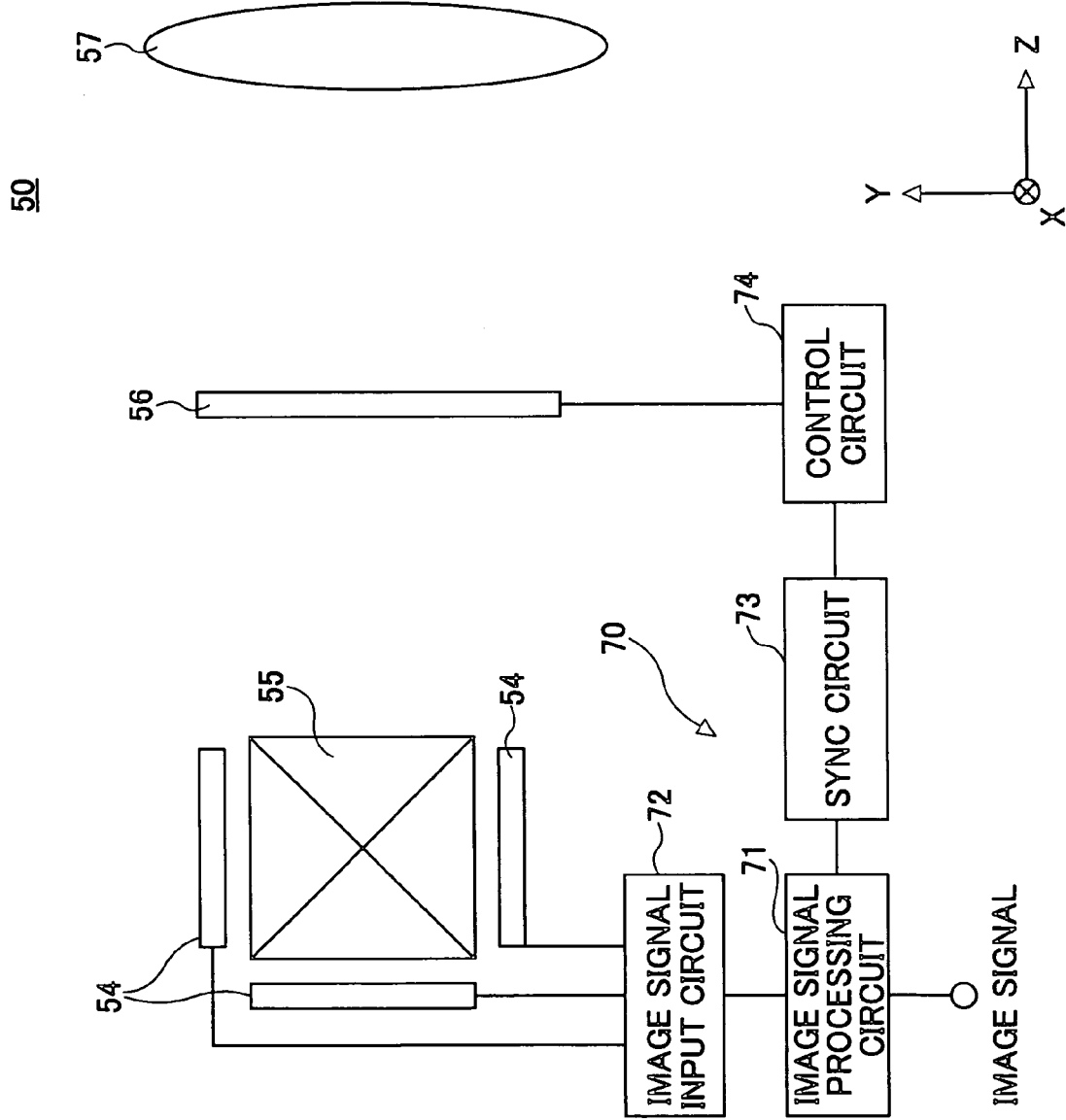

OPTICAL AXIS DEFLECTING METHOD, OPTICAL AXIS DEFLECTING ELEMENT, OPTICAL PATH DEFLECTING UNIT, METHOD OF DRIVING OPTICAL AXIS DEFLECTING ELEMENT, AND IMAGE DISPLAY APPARATUS

BACKGROUND OF THE INVENTION

1. Field of the Invention

The present invention generally relates to optical axis deflecting methods, optical axis deflecting elements, optical axis deflecting units, methods of driving optical axis deflecting element and image display apparatuses, and more particularly to an optical axis deflecting method and an optical axis deflecting element for changing a tilt direction of an optical axis of a uniaxial material in response to an electrical signal, an optical axis deflecting unit for deflecting an optical path of light in response to an electrical signal using such an optical axis deflecting element, a method of driving such an optical axis deflecting element, and an image display apparatus which uses such an optical axis deflecting element or unit. The present invention also relates to an optical path deflecting method, an optical path deflecting element and an optical path deflecting unit using such an optical axis deflecting element.

2. Description of the Related Art

In this specification, an "optical path deflecting element" refers to an optical element capable of deflecting an optical path of light in response to an external electrical signal, by shifting outgoing light in parallel with respect to incoming light or, by rotating the incoming light by a certain angle or, by combining the parallel shift and the rotation of the incoming light, so as to switch the optical path. An amount or magnitude of the parallel shift of the optical path deflection is referred to as a "shift quantity". An amount of the rotation of the optical path deflection is referred to as a "rotation angle". An "optical path deflecting unit" refers to a device which includes the "optical path deflecting element" and deflects the optical path of light.

An image display apparatus may include at least an image display element having a plurality of light controllable pixels arranged two-dimensionally, a light source for illuminating the image display element, an optical member for monitoring an image pattern displayed by the image display element, and an optical path deflecting means for deflecting light in the optical path between the image display element and the optical member for each of a plurality of sub fields into which an image field is divided time-divisionally. This image display apparatus can display an image by increasing the apparent number of pixels of the image display element, by displaying an image pattern having a display position that is shifted depending on the deflection state of the optical path for each of the sub fields caused by the optical path deflecting means. A "pixel shift element" refers to such an optical path deflecting means. Basically, the "optical path deflecting element" and the "optical path deflecting unit" can be applied as the "optical path deflecting means (pixel shift element)".

Conventionally, various optical path deflecting elements and pixel shift elements using liquid crystal materials, and image display apparatuses using such elements, have been proposed. Examples of the proposed elements and apparatuses may be found in Japanese Laid-Open Patent Applications No. 6-18940, No. 9-133904, No. 5-313116, No. 6-324320 and No. 10-133135, and Japanese Patent No. 2939826. But according to the conventional optical path deflecting elements and pixel shift elements, the following problems (1) through (3) were encountered.

(1) Because of the complex structure of the elements, the elements are expensive and the size of the elements are large. In addition, the optical loss, optical noise such as ghost, resolution and the like deteriorate.

(2) In the case of a structure having a movable part, the positioning accuracy and the durability deteriorate, and problems such as vibration and mechanical noise increase.

(3) In the case of a structure using a nematic liquid crystal, it is difficult to obtain a high response speed.

A Japanese Laid-Open Patent application No. 2002-328402 proposes optical path deflecting elements and pixel shift elements using liquid crystal materials, and image display apparatuses using such elements, that are designed to suppress particularly the problems (1) described above. FIG. 1 is a cross sectional view showing an optical path deflecting element proposed in the Japanese Laid-Open Patent application No. 2002-328402.

An optical path deflecting element 1 shown in FIG. 1 includes a pair of transparent substrates 2 and 3. An orientation layer 4 is provided on at least one of the substrates 2 and 3, and a liquid crystal layer 5 having a chiral smectic C-phase forming a homeotropic orientation is provided between the substrates 2 and 3. Electrodes 6a and 6b forming an electrode pair 6 are provided at ends of the substrates 2 and 3, so as to apply an electric field on the liquid crystal layer 5 when a voltage from a power supply 7 is supplied across the electrode pair 6. Since the optical path deflecting element 1 uses the liquid crystal layer 5 having the chiral smectic C-phase, it is possible to suppress the problems (1) described above. In addition, it is also possible to suppress the problems (2) and (3) described above.

In the case of the optical path deflecting element 1 shown in FIG. 1, if the electric field is applied in a direction perpendicular to a spiral axis of the chiral smectic C-phase, that is, in a direction parallel to the liquid crystal layer 5, it may be regarded that liquid crystal molecules undergo a rotary motion within a cone-shaped virtual surface within the liquid crystal layer 5. In this state, a proportion of the liquid crystal molecules that are oriented in the same direction changes depending on characteristics such as the spiral pitch and spontaneous polarization of the liquid crystal layer 5, and a tilt direction of the optical axis of the liquid crystal layer 5 corresponding to an average orientation direction of the liquid crystal molecules changes.

As described in the Japanese Laid-Open Patent Application No. 2002-328402, when a conoscope image of the liquid crystal layer having the chiral smectic C-phase and not applied with an electric field is observed in a direction normal to the liquid crystal layer using a polarizing microscope, a cross image is located at a central portion, and a uniaxial optical axis of the liquid crystal layer can be confirmed. FIG. 2 is a diagram showing a model of the liquid crystal molecule arrangement of the chiral smectic C-phase, for showing a change in the spiral structure due to the applied electric field. In the model of the liquid crystal molecule arrangement, molecular layers having a tilt angle $\theta$ form the spiral structure by being mutually shifted and overlapping with each other.

When the applied electric field E is E=0, the spiral structure has a symmetric structure to the right and left as shown in FIG. 2(a), and the liquid crystal director direction is spatially averaged. The average optical axis of the liquid crystal layer is aligned in the direction normal to the liquid crystal layer. Hence, the liquid crystal layer is optically isotropic with respect to incoming light parallel to the average optical axis.

When the applied field E is parallel to the liquid crystal layer and is relatively small such that a relationship $0 < E < E_s$ is satisfied, where $E_s$ is a threshold value of the electric field E, an angular moment acts on the liquid crystal molecules due to the action of a spontaneous polarization Ps on the electric field E. As a result, the spiral structure becomes distorted and non-symmetrical as shown in FIG. 2(b), and the average optical axis is tilted in a direction. In this state, the distortion increases as the electric field intensity increase, to thereby increase the tilt angle of the average optical axis. The increase in the tilt angle of the average optical axis may be observed from a positional shift of the cross image in the conoscope image.

When the electric field intensity is further increased and the applied electric field E becomes greater than or equal to the threshold value Es (that is, E≧Es), the spiral structure disappears, and optically, the liquid crystal layer becomes approximately uniaxial as shown in FIG. 2(c). In this state, the tilt angle of the optical axis becomes equal to the tilt angle θ of the liquid crystal director. This tilt angle θ does not changed even if the applied electric field E is further increased, and the tilt angle of the optical axis becomes fixed.

Therefore, when a sufficiently large electric field E is applied on the liquid crystal layer, the orientation directions of the liquid crystal molecules within the liquid crystal layer become aligned, and the spiral structure disappears. In addition, when the direction of the applied electric field E is reversed, the tilt direction of the optical axis of the liquid crystal layer is also reversed. Thus, the liquid crystal layer can function as an optical axis deflecting element or a dynamic double refraction plate, and may be applied to optical path deflecting elements, optical deflecting units and the like.

When the optical path deflecting element or the optical axis deflecting element is applied to the image display apparatus and the like, it is necessary to design the width of the effective region of the liquid crystal layer for transmitting the light to a large value. But when an attempt is made to apply an electric field which is parallel to the liquid crystal layer (that is, parallel to the substrate surface) with a sufficiently large intensity for driving the liquid crystal layer, an extremely large voltage on the order of several kV must be supplied across the width of the effective region if the width of the effective region is greater than or equal to several tens of mm and large.

However, when the extremely large voltage on the order of several kV is supplied across the width of the effective region of the optical path deflecting element, discharge and noise may be generated within the image display apparatus. In addition, the size of the required power supply increases, and the power consumption increases.

SUMMARY OF THE INVENTION

Accordingly, it is a general object of the present invention to provide a novel and useful optical axis deflecting method, optical axis deflecting element, optical axis deflecting unit, optical path deflecting method, optical path deflecting element, method of driving optical axis deflecting element and image display apparatus, in which the problems described above are suppressed.

Another and more specific object of the present invention is to provide an optical axis deflecting method, an optical axis deflecting element, an optical axis deflecting unit, an optical path deflecting method, an optical path deflecting element, an optical path deflecting unit, a method of driving optical axis deflecting element and an image display apparatus, which can obtain an optical axis deflecting effect similar to that obtainable conventionally, but by supplying a voltage that is small compared to the voltage conventionally required to apply an electric field on a liquid crystal layer. As a result, it is possible to suppress the generation of discharge and noise, and reduce the size of the power supply and reduce the power consumption.

Still another and more specific object of the present invention is to provide an optical axis deflecting element comprising a pair of transparent substrates; a liquid crystal layer disposed between substrate surfaces of the pair of transparent substrates and having a chiral smectic C-phase forming a homeotropic orientation; and a plurality of electrode pairs each defining one of a plurality of divided regions into which an effective region of the liquid crystal layer is divided, wherein an electric field is independently applicable to each divided region defined by a corresponding electrode pair in a direction parallel to the substrate surfaces.

A further object of the present invention is to provide an optical axis deflecting unit comprising an optical axis deflecting element described above, and a driving part configured to time-divisionally supply a voltage to the electrode pairs defining each of the divided regions forming the effective region.

Another object of the present invention is to provide an image display apparatus comprising an image display element having a plurality of two-dimensionally arranged pixels capable of controlling light depending on image information, and an optical axis deflecting unit described above and configured to deflect an optical path of light from the image display element corresponding to each pixel thereof.

Still another object of the present invention is to provide a driving method for driving an optical axis deflecting element comprising a pair of transparent substrates, a liquid crystal layer disposed between substrate surfaces of the pair of transparent substrates and having a chiral smectic C-phase forming a homeotropic orientation, and a plurality of electrode pairs each defining one of a plurality of divided regions into which an effective region of the liquid crystal layer is divided, the driving method comprising independently applying an electric field to each divided region defined by a corresponding electrode pair in a direction parallel to the substrate surfaces.

Another object of the present invention is to provide a driving method for driving an optical axis deflecting element which has an effective region of a liquid crystal layer for transmitting light divided into first through Nth divided regions, where N is an integer greater than or equal to two, and an outgoing optical path of the optical axis deflecting element is switched with respect to incoming light by time-divisionally applying an electric field to the first through Nth divided regions in a direction approximately parallel to a direction in which the first through Nth divided regions are arranged, the driving method comprising driving the liquid crystal layer in a first time interval, at least one second time interval, a third time interval and at least one time interval so that a tilt angle of optical axes of a liquid crystal material forming the liquid crystal layer is maintained approximately constant independently within each of the first through Nth divided regions during one frame that is required to update one image by a line-sequential scanning system, where the first time interval time-divisionally applies the electric field in a first direction with respect to the first through Nth divided regions, the second time interval sequentially switches a direction of the electric field that is time-divisionally applied to the first through (N−1)-th divided regions to a second direction which is opposite to the first direction, the third time interval time-divisionally applies the electric field in the second direction with respect to the first through Nth divided regions, and the fourth time interval sequentially switches the direction of the electric field that is time-divisionally applied to the first through (N−1)-th divided regions to the first direction.

Still another object of the present invention is to provide an optical path deflecting unit comprising an optical axis deflecting element which has an effective region of a liquid crystal layer for transmitting light divided into first through Nth divided regions, where N is an integer greater than or equal to two, and a driving part configured to switch an outgoing optical path of the optical axis deflecting element with respect to incoming light by time-divisionally applying an electric field to the first through Nth divided regions in a direction approximately parallel to a direction in which the first through Nth divided regions are arranged, wherein the driving part drives the liquid crystal layer in a first time interval, at least one second time interval, a third time interval and at least one time interval so that a tilt angle of optical axes of a liquid crystal material forming the liquid crystal layer is maintained approximately constant independently within each of the first through Nth divided regions during one frame that is required to update one image by a line-sequential scanning system, the first time interval time-divisionally applies the electric field in a first direction with respect to the first through Nth divided regions, the second time interval sequentially switches a direction of the electric field that is time-divisionally applied to the first through (N−1)-th divided regions to a second direction which is opposite to the first direction, the third time interval time-divisionally applies the electric field in the second direction with respect to the first through Nth divided regions, and the fourth time interval sequentially switches the direction of the electric field that is time-divisionally applied to the first through (N−1)-th divided regions to the first direction.

A further object of the present invention is to provide an image display apparatus comprising the optical path deflecting unit described above, an image display element having two-dimensionally arranged pixels and employing a line-sequential scanning system, and a light source illuminating the image display element, wherein an image is displayed by deflecting an optical path of outgoing light of the image display element by the optical path deflecting unit.

Other objects and further features of the present invention will be apparent from the following detailed description when read in conjunction with the accompanying drawings.

BRIEF DESCRIPTION OF THE DRAWINGS

FIGS. 4A and 4B are diagrams for explaining a relationship between a direction of an electric field applied on an optical axis deflecting element and an orientation direction of liquid crystal molecules;

FIGS. 10A through 10D are timing charts for explaining still another driving timing for the optical axis deflecting element of the first embodiment;

FIGS. 11A and 11B are a cross sectional view and a plan view respectively showing an important part of the optical axis deflecting element in a third embodiment of the present invention;

FIG. 29 is a diagram for explaining the electric field applied to each divided region in the tenth embodiment;

FIG. 36 is a diagram showing an important part of the image display apparatus including the optical axis deflecting element in a twelfth embodiment of the present invention; and FIG. 37 is a diagram showing a control system of the image display apparatus shown in FIG. 36.

DESCRIPTION OF THE PREFERRED EMBODIMENTS

A description will be given of embodiments of the optical axis deflecting method, optical axis deflecting element, optical axis deflecting unit, optical path deflecting method, optical path deflecting element, optical path deflecting unit, method of driving optical axis deflecting element and image display apparatus according to the present invention, by referring to FIGS. 3 through 37.

First, a description will be given of a first embodiment of the present invention.

Figure 3:
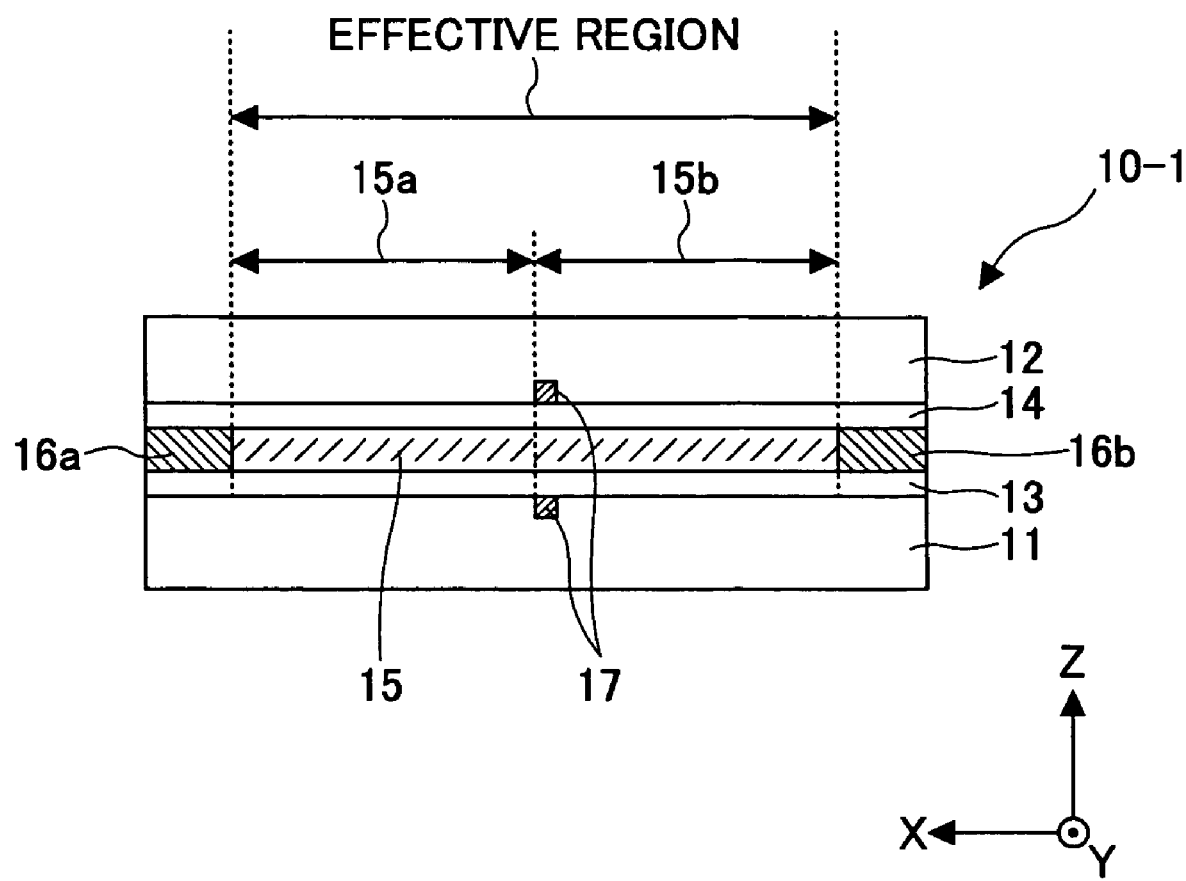
FIG. 3 is a cross sectional view showing an important part of an optical axis deflecting element in a first embodiment of the present invention.

FIG. 3 is a cross sectional view showing an important part of an optical axis deflecting element in this first embodiment of the present invention. As shown in FIG. 3, an optical axis deflecting element 1 has a pair of confronting transparent substrates 11 and 12. The transparent substrates 11 and 12 may be made of glass, quartz, plastics or the like, and is preferably made of a transparent material having no double refraction. The transparent substrates 11 and 12 have a thickness in a range of several tens of μm to several mm. The thicknesses of the transparent substrates 11 and 12 may be the same or, mutually different. In this embodiment, it is assumed for the sake of convenience that the thicknesses of the transparent substrates 11 and 12 are the same. Perpendicular orientation layers 13 and 14 are provided on inner surfaces of the transparent substrates 11 and 12. The perpendicular orientation layers 13 and 14 may be made of any suitable material capable of orienting liquid crystal molecules in a perpendicular direction (homeotropic orientation) with respect to the substrate surface, and is not limited to a particular material. For example, a silane coupling agent or a perpendicular orientation agent for liquid crystal display, a $SiO_2$ evaporation layer or the like may be used for perpendicular orientation layers 13 and 14. In this specification, the "perpendicular orientation (homeotropic orientation)" not only refers to a state where the liquid crystal molecules are oriented perpendicularly to the substrate surface, but also refers to a state where the liquid crystal molecules are tilted by several tens of degrees from the substrate normal, that is, the state where the liquid crystal molecules have an approximately perpendicular orientation.

A liquid crystal layer 15 is provided between the perpendicular orientation layers 13 and 14. For example, the liquid crystal layer 15 is made of a liquid crystal material capable of forming the chiral smectic C-phase. A distance between the perpendicular orientation layers 13 and 14 in a direction perpendicular to the substrate surface may be prescribed by a spacer (not shown) or, by a pair of electrodes 16a and 16b which are provided on respective ends of the liquid crystal layer 15 as shown in FIG. 3 and also functioning as the spacer. When providing the spacer separately from the electrodes 16a and 16b, the spacer may be formed by a sheet member having a thickness in a range of several μm to several mm or grains having grain diameters comparable to the sheet member thickness, and it is desirable to provide the spacer outside an effective region of the liquid crystal layer 15. For example, the electrodes 16a and 16b may be formed by a metal sheet or metal layer made of aluminum, copper, chrome or the like. It is preferable that the thickness of the electrodes 16a and 16b provided on the respective ends of the effective region is approximately the same as the thickness of the liquid crystal layer 15.

A dividing electrode 17 is provided within the effective region to electrically divide the effective region into two divided regions. The dividing electrode 17 may be made of a metal sheet or the like, similarly as in the case of the electrodes 16a and 16b. However, in order to form a uniform liquid crystal layer 15 and maintain the orientation thereof, it is preferable not to provide the dividing electrode 17 within the liquid crystal layer 15 but to provide the dividing electrode 17 by forming a metal layer or the like on the corresponding perpendicular orientation layers 13 and 14. A width of the dividing electrode 17 taken along a horizontal direction in FIG. 3 is preferably as narrow as possible, and is 5 μm, for example. A voltage from a driving part or means (not shown) is supplied to the pair of electrodes defining each divided region, so as to apply to the liquid crystal layer 15 an electric field in a direction approximately parallel to a direction in which the divided regions are arranged, that is also approximately parallel to the substrate surface. This direction in which the electric field is applied is also referred to as a "parallel electric field".

In this embodiment, it is assumed for the sake of convenience that the liquid crystal layer 15 is made of a ferroelectric liquid crystal, but the liquid crystal layer 15 may of course be made of an antiferroelectric liquid crystal.

A description will be given of the liquid crystal layer 15 capable of forming the smectic C-phase. A "smectic liquid crystal" has the long axes of the liquid crystal molecules arranged in a layer form (smectic layer). The liquid crystal in which the normal direction to the layer (layer normal direction) and the long axis direction of the liquid crystal molecules match is said to as having the "smectic A-phase". On the other hand, the liquid crystal in which the normal direction to the layer (layer normal direction) and the long axis direction of the liquid crystal molecules do not match is said to as having the "smectic C-phase". Generally, the ferroelectric liquid crystal having the smectic C-phase has the so-called spiral structure in which the liquid crystal director direction rotates spirally for each smectic layer in a state where no external electric field is applied thereto, and is said to have the "chiral smectic C-phase". In the chiral smectic C-phase, the liquid crystal directors of the antiferroelectric liquid crystal face confronting directions for each layer. The liquid crystal having the chiral smectic C-phase includes asymmetric carbon in the molecular structure, and therefore generates spontaneous polarization Ps. The optical characteristic of the liquid crystal is controlled by reorienting the liquid crystal molecules in the direction determined by the spontaneous polarization Ps and the external electric field E applied thereto.

FIGS. 4A and 4B are diagrams for explaining a relationship between the direction of the electric field applied on the optical axis deflecting element and the orientation direction of the liquid crystal molecules. FIGS. 4A and 4B show a case where the electric field is applied to an arbitrary divided region of the liquid crystal layer 15 (for example, the divided region defined between the electrodes 16a and 17) of the optical axis deflecting element 10-1 shown in FIG. 3, and schematically shows the direction of the electric field and the tilt direction of the liquid crystal molecules. In each of FIGS. 4A and 4B, the upper part shows the plan view and the lower part shows the perspective view of the arbitrary divided region. Ps denotes the spontaneous polarization, and E denotes the electric field applied to the arbitrary divided region. A power supply 18 supplies a rectangular wave A.C. voltage to the electrodes defining the arbitrary divided region of the liquid crystal layer 15.

Figure 2:
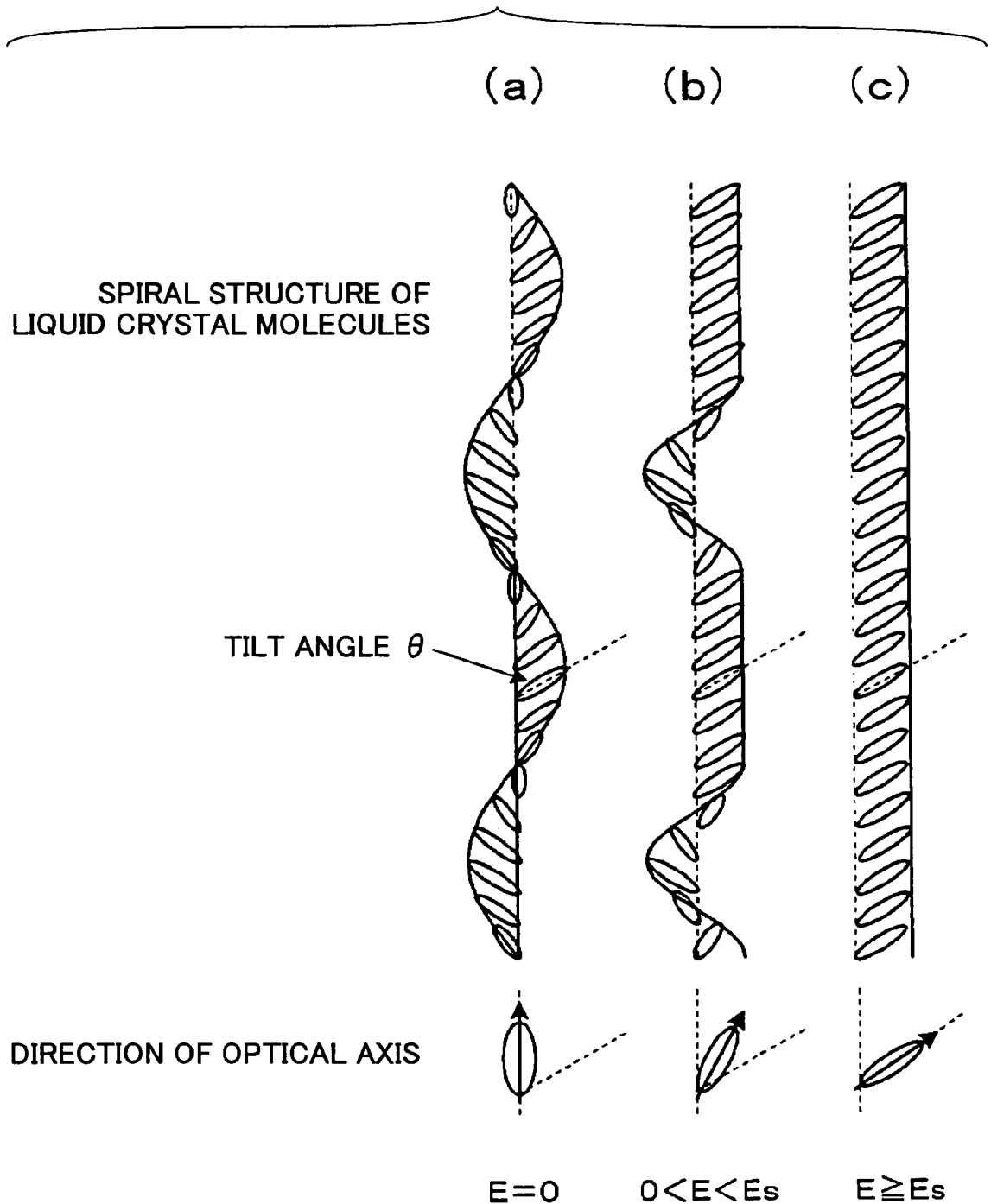
FIG. 2 is a diagram showing a model of the liquid crystal molecule arrangement of the chiral smectic C-phase, for showing a change in the spiral structure due to the applied electric field.

As may be seen from FIGS. 4A and 4B, when the direction of the applied electric field E is reversed, the tilt direction of the liquid crystal molecules having the approximately perpendicular orientation is also reversed. In FIGS. 4A and 4B, it is assumed for the sake of convenience that the spontaneous polarization Ps has a positive value. When the tilt direction of the liquid crystal molecules is reversed, it may be regarded that the liquid crystal molecules undergo a rotary motion within a cone-shaped virtual surface within the liquid crystal layer 5 as shown in the lower part of each of FIGS. 4A and 4B. The model of the liquid crystal molecule arrangement of the chiral smectic C-phase (the model showing the change in the spiral structure due to the applied electric field) for this case is the same as that shown in FIG. 2 described above.

Next, a description will be given of a case where the electric field is applied on the liquid crystal layer 15 and a case where the application of the electric field on the liquid crystal layer 15 is stopped. When the electric field is applied to the chiral smectic C-phase which forms the spiral structure when no electric field is applied thereto, an electrical driving force acts in a direction to orient the liquid crystal molecules by the interaction of the electric field and dipole caused by the carbonyl group within the liquid crystal molecules. For this reason, the time required to reorient the liquid crystals by applying the electric field is relatively short. In the case of a general ferroelectric liquid crystal material, the orientation transition of the liquid crystals is completed in sub milliseconds to several tens of microseconds depending on the electric field intensity. On the other hand, when the application of the electric field on the liquid crystal layer 15 is stopped, the liquid crystal layer 15 tends to return to the initial orientation state at the time when no electric field was applied thereto. But because this returning to the initial orientation state depends on a restoration force caused by a viscoelasticity of the liquid crystal layer 15, the orientation transition of the liquid crystals take a longer time on the order of several tens of milliseconds to several seconds. Hence, this embodiment effectively utilizes the fact that the reorientation rate of the liquid crystal layer 15 is sufficiently slow when the electric field is switched from the ON state to the OFF state. In other words, as shown in FIG. 3, the effective region of the liquid crystal layer 15 of the optical axis deflecting element 10-1 is divided into a plurality of divided regions (into two divided regions in this embodiment) by arranging one or more dividing electrodes 17, so that the electric field can be applied independently to each divided region.

Figure 5:
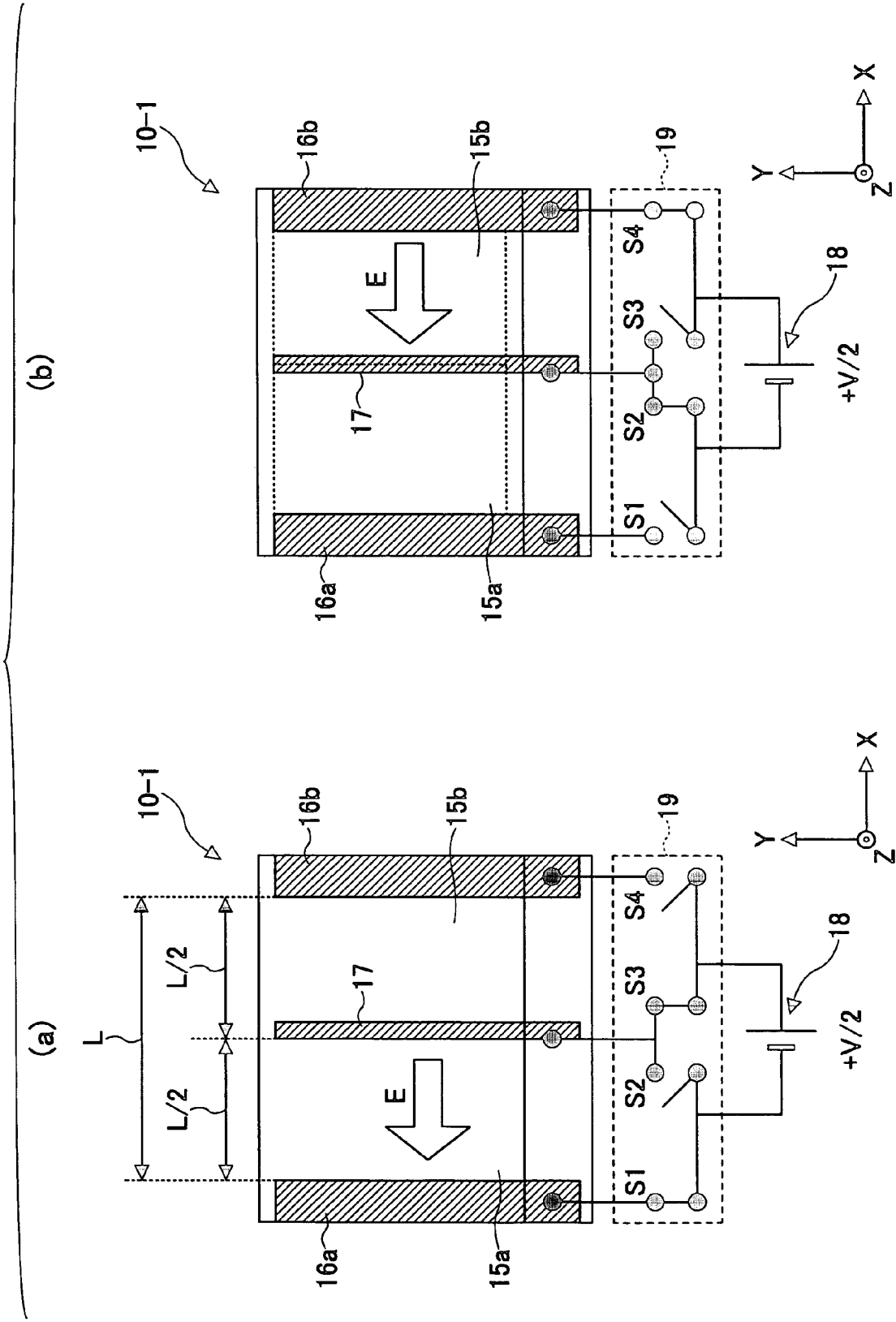
FIG. 5 is a diagram for explaining an operation of the optical axis deflecting element shown in FIG. 3.

FIG. 5 is a diagram for explaining an operation of the optical axis deflecting element 10-1 shown in FIG. 3. FIG. 5(a) shows a state where the electric field is applied to one of the divided regions forming the effective region of the liquid crystal layer 15, and FIG. 5(b) shows a state where the electric field is applied to the other of the divided regions forming the effective region of the liquid crystal layer 15.

As shown in FIG. 5, the effective region of the liquid crystal layer 15 of the optical axis deflecting element 10-1 has an effective width L. One dividing electrode 17 is arranged at a center of the effective region, so as to divide the effective region into two divided regions respectively having a width L/2. Each of the electrodes 16a, 17 and 16b of the optical axis deflecting element 10-1 is connected to a driving part or means which includes a switching part 19 and a power supply 18 for supplying a power supply voltage +V/2. By appropriately controlling ON/OFF states of each of switches S1 through S4 within the switching part 19, it is possible to selectively and time-divisionally supply the voltage to each electrode pair.

If the effective width L is 42 mm and the electric field (or electric field intensity) E applied with respect to the optical axis deflecting element is E=150 V/mm, for example, it is necessary to supply a high voltage of 6.3 kV when applying the electric field on the entire effective region. On the other hand, the width L/2 of each divided region to which the electric field is to be applied is approximately 21 mm, and thus, even when the electric field (or electric field intensity) E applied with respect to the optical axis deflecting element is E=150 V/mm, it is possible to set the voltage itself to be applied to approximately 3.15 kV by alternately applying the electric field to each of the divided regions for a short time on the order of approximately several milliseconds, for example. Accordingly, it is possible to simplify the measures that would otherwise have to be taken in order to suppress the generation of discharge and noise within the apparatus which uses the optical axis deflecting element 10-1, and in addition, it is possible to reduce the cost and the power consumption of the apparatus as a whole since the size of the power supply can be reduced.

For example, a voltage is temporarily supplied to a first electrode pair (electrodes 16a and 17) to generate an electric field within a first divided region 15a on the left as shown in FIG. 5(a), so as to tilt the optical axis of the liquid crystal layer 15 within the first divided region 15a. The supply of the voltage to the first electrode pair is stopped after the optical axis within the first divided region 15a reaches a desired tilted state.

Immediately thereafter, a voltage is temporarily supplied to a second electrode pair (electrodes 17 and 16b) to generate an electric field within a second divided region 15b on the right as shown in FIG. 5(b), so as to tilt the optical axis of the liquid crystal layer 15 within the second divided region 15b. The supply of the voltage to the second electrode pair is stopped after the optical axis within the second divided region 15b reaches a desired tilted state.

Thereafter, before the time when the tilted state of the optical axis within the first divided region 15a returns to the initial state by the reorientation, the voltage is temporarily supplied again to the first electrode pair (electrodes 16a and 17) so as to apply the electric field having the same polarity as before to the liquid crystal layer 15 within the first divided region 15a. Hence, the optical axis within the first divided region 15a is maintained in the desired tilted state.

Thereafter, before the time when the tilted state of the optical axis within the second divided region 15b returns to the initial state by the reorientation, the voltage is temporarily supplied again to the second electrode pair (electrodes 17 and 16b) so as to apply the electric field having the same polarity as before to the liquid crystal layer 15 within the second divided region 15b. Hence, the optical axis within the second divided region 15b is maintained in the desired tilted state.

In order to simplify the description, the power supply 18 is illustrated in FIG. 5 as a D.C. power supply, and the electric field E is illustrated as being applied in only one direction. However, the power supply 18 may be formed by an A.C. power supply which supplies a rectangular wave A.C. voltage, so that the direction of the electric field E applied to each of the divided regions 15a and 15b may be reversed.

FIG. 5 shows the function of the switching part 19 in a simplified manner. However, it is preferable that the switches S1 through S4 for realizing the function of the switching part 19 have a high withstand voltage and are capable of carrying out a high-speed switching operation. For this reason, compared to a delay switch or the like, it is preferable to use for each of the switches S1 through S4 a photo-coupler or the like having a high withstand voltage and capable of optically carrying out a high-speed switching operation. In addition, since the operation of the photo-coupler can be controlled in response to an external electrical signal, it is possible in this case to selectively supply the voltage to each electrode pair of the optical axis deflecting element 10-1 depending on the external electrical signal. Accordingly, it is possible in this case to easily control the electric field that is applied to each divided region of the liquid crystal layer 15, and to easily control the tilt direction of the optical axis in each divided region of the liquid crystal layer 15. The switching part of the embodiments described later may be constructed similarly to the switching part 19 by use of the photo-coupler or the like.

Figure 1:
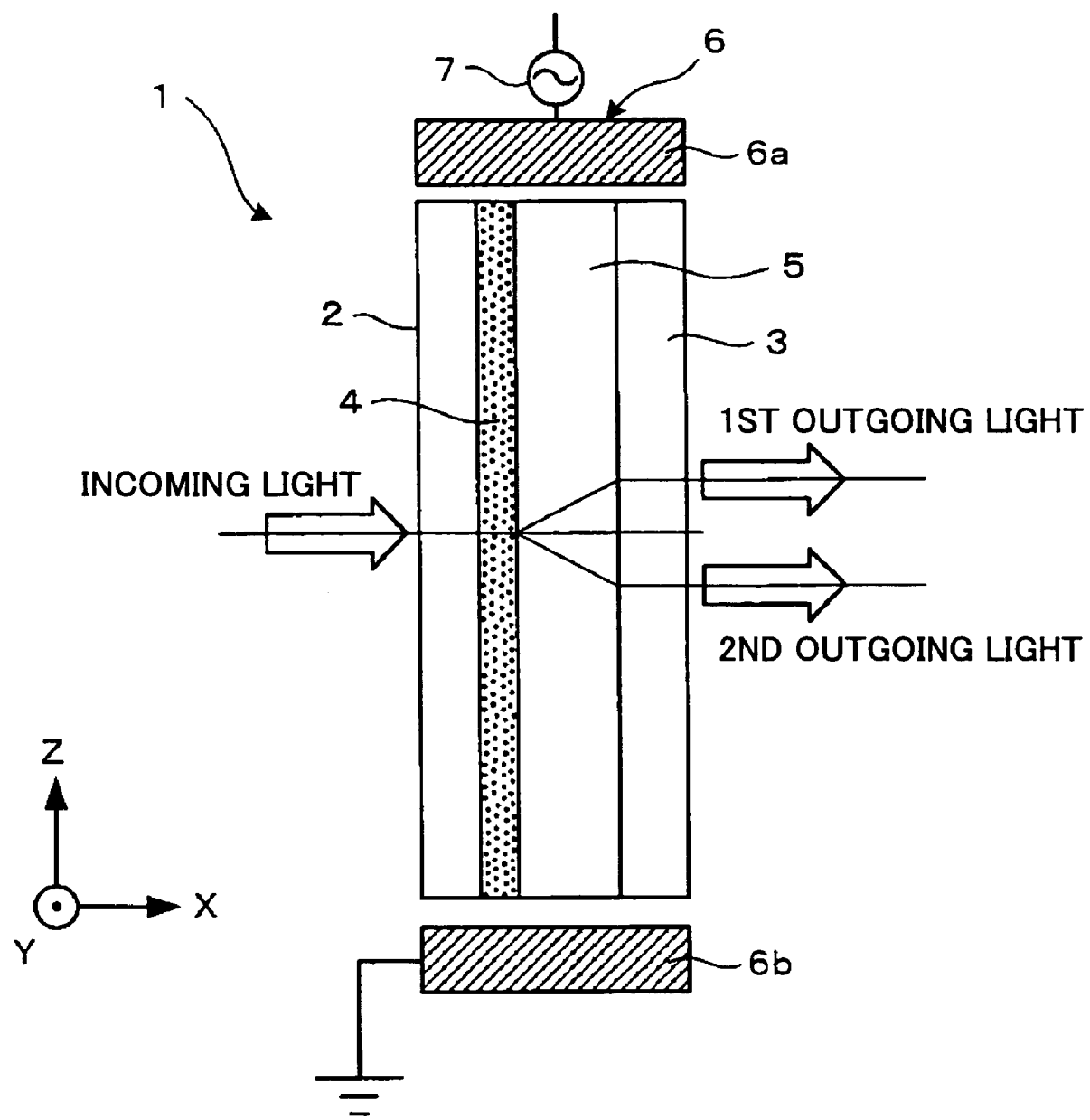
FIG. 1 is a cross sectional view showing an optical path deflecting element proposed in the Japanese Laid-Open Patent application No. 2002-328402.
Figure 6:
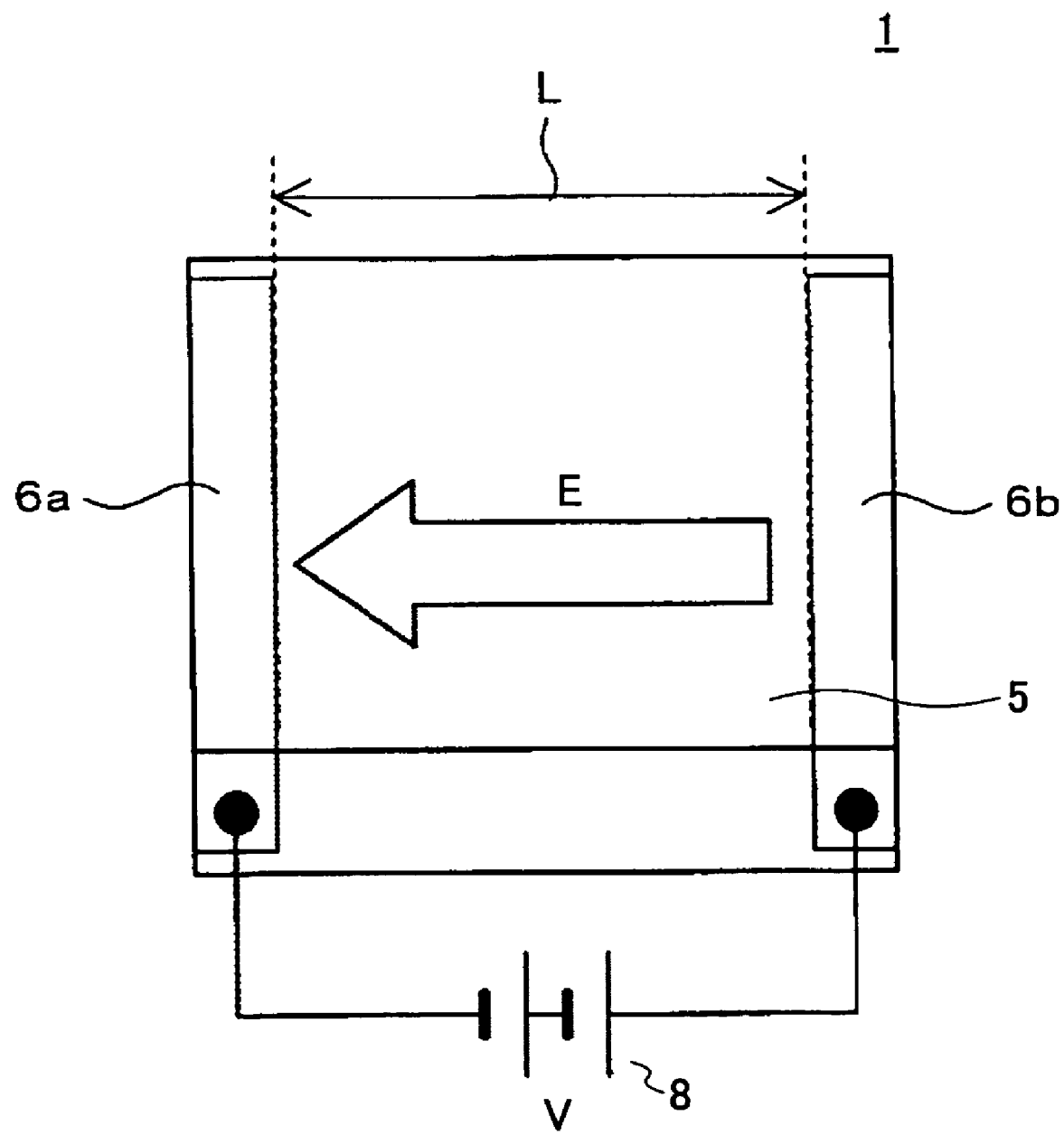
FIG. 6 is a diagram for explaining a conventional method of applying the electric field to the liquid crystal layer of the optical axis deflecting element.

FIG. 6 is a diagram for explaining a conventional method of applying the electric field to the liquid crystal layer of the optical axis deflecting element. In FIG. 6, those parts that are the same as those corresponding parts in FIG. 1 are designated by the same reference numerals, and a description thereof will be omitted. Conventionally, the electric field E is applied to the entire effective region of the liquid crystal layer 5, that is, the effective width L, in the direction parallel to the substrate surface, by supplying the voltage V from a power supply 8 to the electrodes 6a and 6b. For example, when the electric field (or electric field intensity) E of E=150 V/mm is applied with respect to the effective width L of L=42 mm, a high voltage V of V=6.3 kV is supplied to the electrodes 6a and 6b. Consequently, due to the high voltage V supplied to the electrodes 6a and 6b, safety measures for suppressing discharge to elements in the vicinity of the optical axis deflecting element 1 are desirable.

But according to the optical axis deflecting element 10-1 of this embodiment shown in FIGS. 3 and 5, the effective region of the liquid crystal layer 15 is spatially and electrically divided into two divided regions 15a and 15b. The parallel electric field E is alternately applied to the divided regions 15a and 15b for a short time on the order of approximately several milliseconds, so as to approximately maintain the orientation state of the liquid crystal layer 15 that would occur if the parallel electric field E were applied with respect to the entire effective region. Since the width of each of the divided regions 15a and 15b to which the parallel electric field E is applied is approximately 21 mm which is approximately ½ that of the entire effective region, the parallel electric field (or electric field intensity) E of E=150 V/mm can be applied to each of the divided region 15a and 15b by supplying the voltage of 3.15 kV which is approximately V/2 to the corresponding electrode pair. For this reason, it is possible to simplify the measures required to suppress the generation of discharge and noise within the optical axis deflecting element 10-1, and therefore enable the size of the power supply 18 to be reduced and enable the cost of the apparatus using the optical axis deflecting element 10-1 to be reduced.

In the first embodiment described above, the effective region of the liquid crystal layer 15 of the optical axis deflecting element 10-1 is divided into two divided regions 15a and 15b. However, the number of divided regions into which the effective region is divided is of course not limited to two. The effective region may be divided into N divided regions, where N is an integer greater than or equal to two, and the N divided regions are arranged in the direction parallel to the parallel electric field E. If the effective region has the effective width L, and the voltage V needs to be supplied with respect to the entire effective region for a predetermined voltage supplying time t if the parallel electric field E were to be applied with respect to the entire effective region, a voltage V/N may be temporarily supplied to a divided region having a width L/N for a voltage supplying time t/N in order to apply the parallel electric field E to the divided region, and the divided region to which the parallel electric field E is applied may be switched successively by time-divisionally supplying the voltage V/N to each of the N divided regions. By time-divisionally supplying the voltage V/N to each of the N divided regions, it is in effect possible to apply the parallel electric field E with respect to the entire effective region when the time average is considered.

Figure 7:
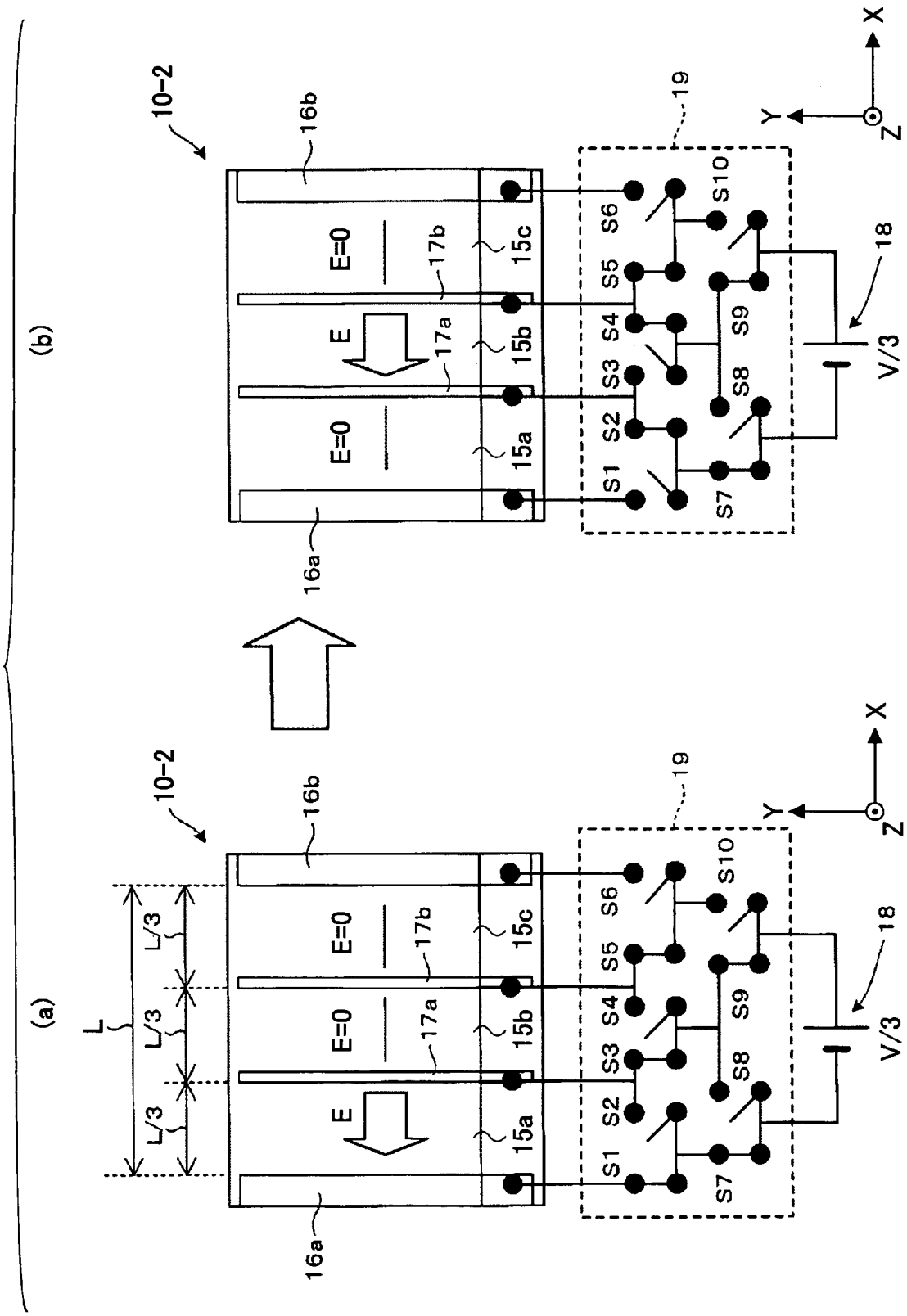
FIG. 7 is a diagram for explaining an operation of the optical axis deflecting element in a second embodiment of the present invention.

In a second embodiment of the present invention, the effective region is divided into three divided regions, as shown in FIG. 7. In FIG. 7, a first divided region 15a is defined by a first electrode pair (electrodes 16a and 17a), a second divided region 15b is defined by a second electrode pair (electrodes 17a and 17b), and a third divided region 15c is defined by a third electrode pair (electrodes 17b and 16b). A switching part 19 includes switches S1 through S10 that may be formed by photo-couplers or the like. The ON/OFF states of the switches S1 through S10 are controlled so as to time-divisionally supply the voltage V/3 to each of the first through third divided regions 15a through 15c.

In FIG. 7, the effective region has the effective width L, the parallel electric field (or electric field intensity) E is E=150 V/m, and the tilt direction of the optical axes of the liquid crystal layer 15 is shifted in the vertical direction at a frequency f of f=60 Hz, for example.

In the case of the conventional method of applying the electric field to the liquid crystal layer 5 of the optical axis deflecting element 1 described above with reference to FIG. 6, the rectangular wave A.C. voltage or the like is supplied to the electrodes 6a and 6b so as to reverse the direction of the applied electric field E at a desired frequency. Hence, the optical axis deflecting element 1 is driven so that the direction of the optical axis is shifted upwards during a time t=8.33 milliseconds and the direction of the optical axis is shifted downwards during a time t=8.33 milliseconds.

On the other hand, in the case of an optical axis deflecting element 10-2 shown in FIG. 7 having the three divided regions 15a through 15c, the voltage V/N=2.1 kV is successively supplied to the electrode pairs defining the three divided regions 15a through 15c for a time t/N=2.87 milliseconds. When the voltage V/N is supplied once to each of the electrode pairs defining the three divided regions 15a through 15c, a voltage having the opposite polarity, that is, −V/N, is successively supplied to the three divided regions 15a through 15c in a similar manner, so as to realize an A.C. type drive. The voltage may be supplied to each of the electrode pairs defining the three divided regions 15a through 15c during a short time t/6 (=t/2N) or a short time t/9 (=t/3N), and the supply of the voltage during such a short time may be repeated during the time t. It is desirable that the time for which the voltage is supplied to the electrode pair defining each divided region is at least set longer than a reorientation time of the liquid crystal layer 15 that is required for the reorientation of the liquid crystal molecules within each divided region to occur when the electric field is switched from the OFF state to the ON state in response to the applied electric field. For example, if the response time of the liquid crystal layer 15 is 1 millisecond, the optical axis deflecting element 10-2 operates satisfactorily when the short time described above is set to t/6=1.39 milliseconds, but a satisfactory operation cannot be expected when the short time described above is set to t/9=0.93 millisecond. But of course, the range in which the short time described above may be set to drive each divided region differs depending on the properties of the liquid crystal material used, the electric field intensity that is applied, the driving frequency and the like.

Next, a description will be given of the driving timing for the optical axis deflecting element when the A.C. type drive is employed. For the sake of convenience, the driving timing is described for the optical axis deflecting element 10-1 of the first embodiment shown in FIGS. 3 and 5 where N=2. However, the driving timing may be similarly determined for the cases where N is greater than or equal to 3.

Figure 8A:
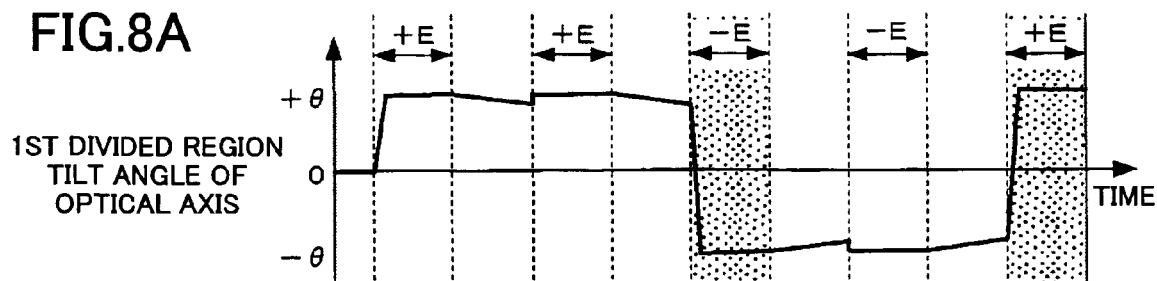
FIGS. 8A through 8D are timing charts for explaining a driving timing for the optical axis deflecting element of the first embodiment.
Figure 8B:
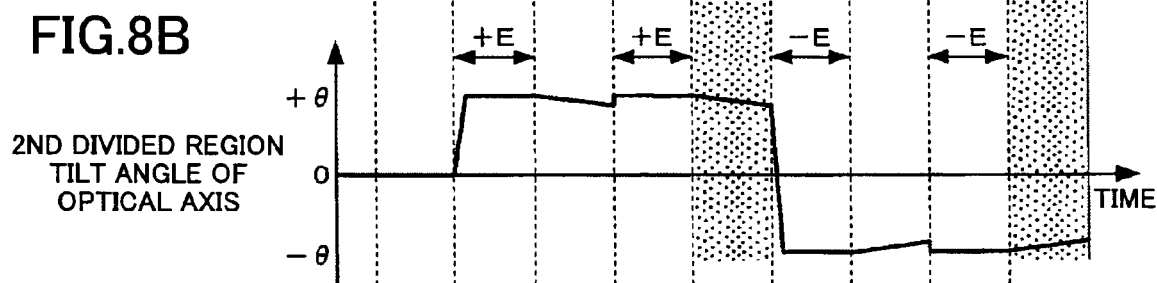
Figure 8C:
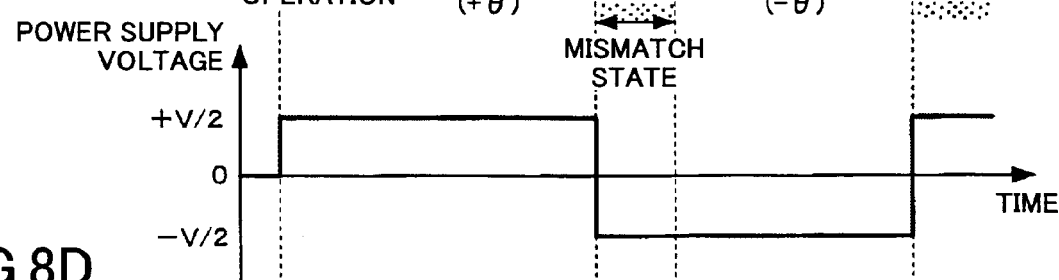
Figure 8D:
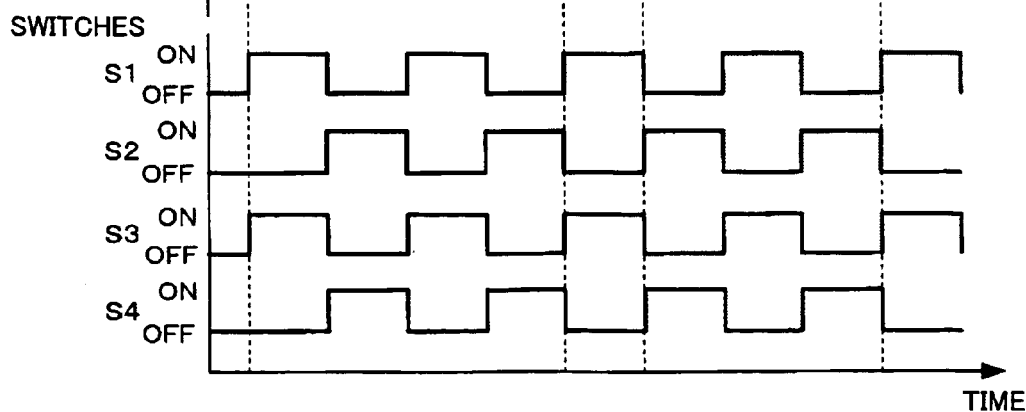
Figure 9A:
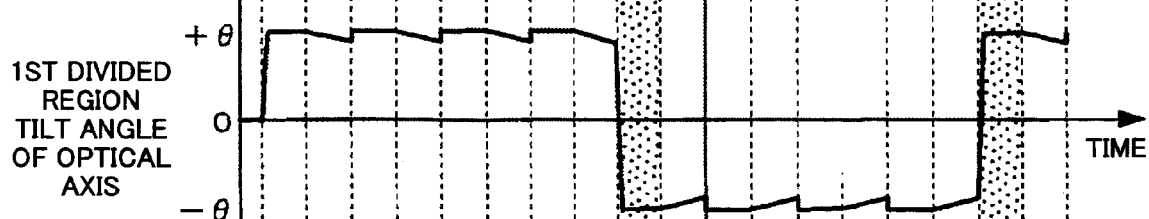
FIGS. 9A through 9D are timing charts for explaining another driving timing for the optical axis deflecting element of the first embodiment.
Figure 9B:
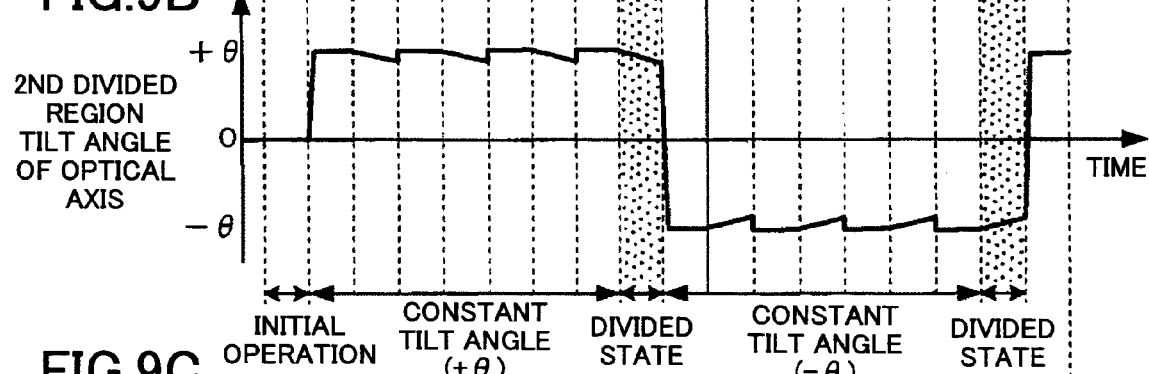
Figure 9C:
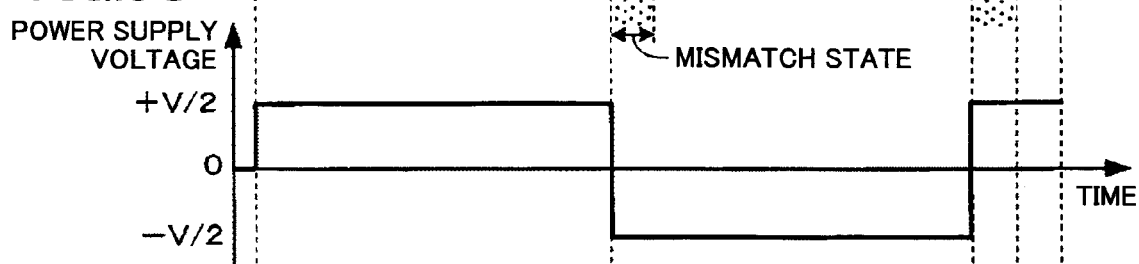
Figure 9D:
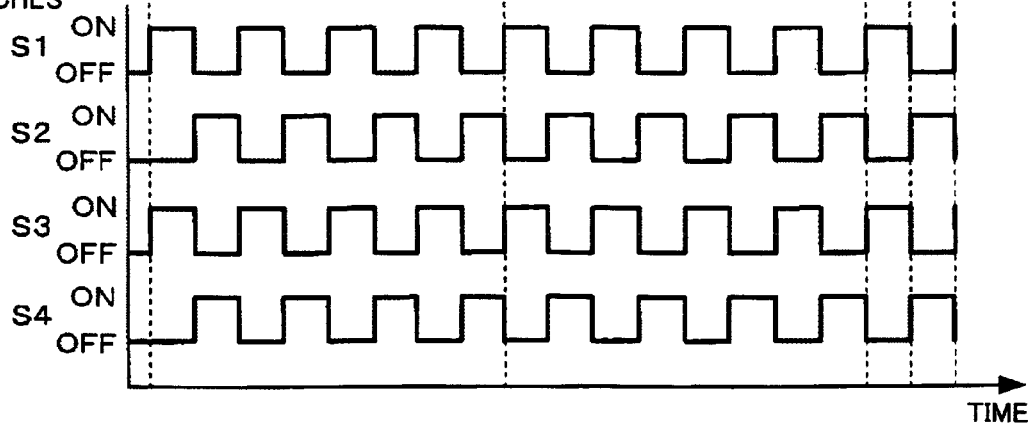

FIGS. 8A through 8D are timing charts for explaining a driving timing for the optical axis deflecting element 10-1 of the first embodiment. In FIGS. 8A and 8B, the ordinate indicates the tilt angle of the optical axes of the liquid crystal layer 15 within the corresponding divided region, and the abscissa indicates the time, both in arbitrary units. FIG. 8A shows the state of the first divided region 15a, and FIG. 8B shows the state of the second divided region 15b. In addition, arrows in FIGS. 8A and 8B indicate timings when the electric field is applied with respect to the corresponding divided region. FIG. 8C shows the change of the rectangular wave A.C. voltage supplied from the power supply 18 for one period which is 16.67 milliseconds when the frequency f is f=60 Hz. FIG. 8D shows the ON/OFF switching timings of the switches S1 through S4 of the switching part 19.

First, when the electric field +E is applied to the first divided region 15a, the tilt angle of the optical axes of the liquid crystal layer 15 within the first divided region 15a immediately becomes +θ and saturates. After this electric field +E is applied for a predetermined time, the electric field +E applied to the first divided region 15a is turned OFF, and the electric field +E is applied to the second divided region 15b. In this state, the optical axes of only the first divided region 15a is tilted by the tilt angle +θ, and the optical axis deflecting element 10-1 is in an "initial operation" state where the optical axes within the entire effective region is not yet uniform. By the time tilt angle of the optical axes within the second divided region 15b become +θ and saturates, the tilt angle of the optical axes within the first divided region 15a begin to become smaller due to the reorientation that occurs because the electric field +E is no longer applied to the first divided region 15a. However, the electric field +E is again applied to the first divided region 15a, so that the tilt angle within the first divided region 15a is maintained to approximately +θ on the time average. The tilt angle within the second divided region 15b is similarly maintained to approximately +θ on the time average. By using for the liquid crystal layer 15 a liquid crystal material having a relatively slow reorientation rate when the applied electric field is turned OFF, it is possible to maintain a "constant tilt state" where the tilt angle of the optical axes is approximately +θ and constant within both the first and second divided regions 15a and 15b at the same time.

Next, a description will be given of the timing when the tilt angle of the optical axes of the liquid crystal layer 15 is reversed. First, in FIG. 8A, reversed electric field −E is applied to the first divided region 15a, and the tilt angle of the optical axes within the first divided region 15a becomes −θ and saturates. In this state, the tilt angle of the optical axes within the second divided region 15b is still approximately +θ. In other words, a "mismatch state" is generated in which the tilt angle of the optical axes is different between the first and second divided regions 15a and 15b. Thereafter, the reversed electric field −E is applied to the second divided region 15b, and the tilt angle of the optical axes within the second divided region 15b becomes −θ and saturates, to thereby immediately eliminate the "mismatch state" and assume the "constant tilt state" in which the tilt angle is −θ on the time average within both the first and second divided regions 15a and 15b at the same time.

In the first embodiment, the "mismatch state" is preferably set as short as possible when uniformly using the entire effective region of the liquid crystal layer 15. Since this "mismatch state" occurs in correspondence with each electric field applying time in which the electric field is applied in one direction, it is desirable to increase the number of time-divisions with which the voltage is applied with respect to the electrode pairs defining the first and second divided regions 15a and 15b. FIGS. 9A through 9D are timing charts for explaining another driving timing for the optical axis deflecting element 10-1 of the first embodiment, with an increased number of time-divisions with which the voltage is supplied with respect to the electrode pairs defining the first and second divided regions 15a and 15b. The ordinate and the abscissa in FIGS. 9A through 9D are the same as in FIGS. 8A through 8D. As shown in FIGS. 9A through 9D, the number of time-divisions with which the voltage is supplied with respect to the electrode pairs defining the first and second divided regions 15a and 15b can be increased by increasing the switching speed with which the ON/OFF states of the switches S1 through S4 of the switching part 19 are switched, so as to shorten the duration of the "mismatch state".

FIGS. 10A through 10D are timing charts for explaining still another driving timing for the optical axis deflecting element 10-1 of the first embodiment. The ordinate and the abscissa in FIGS. 10A through 10D are the same as in FIGS. 8A through 8D. In this case, the electric field applying time is set short only when the electric field is reversed. In other words, as shown in FIGS. 10A through 10D, the ON/OFF states of the switches S1 through S4 of the switching part 19 are switched so that the electric field applying time in which the electric field is temporarily applied to reverse the tilt direction of the optical axes is set shorter than the electric field applying time in which the electric field is temporarily applied to maintain the tilt direction of the optical axes approximately in one direction. In FIGS. 10A through 10D, the duration of the "mismatch state" is shortened by setting the electric field applying time in the "constant tilt state" to approximately ¼ the electric field applying time in the "reverse operation state" when the direction of the applied electric field is reversed. Accordingly, the state where the tilt direction of the optical axes approximately match within the entire effective region of the liquid crystal layer 15 can be set to a relatively long time, and the time-wise and spatial uniformity of the optical characteristic of the optical axis deflecting element 10-1 can be improved. Preferably, the electric field applying time in the "reverse operation state" is at least set longer than the reorientation time that is required by the liquid crystal molecules to undergo the reorientation when the electric field is switched from the OFF state to the ON state.

In the optical axis deflecting elements 10-1 and 10-2 described above, the dividing electrodes 17, 17a and 17b are provided within the effective region of the liquid crystal layer 15 are made of a metal layer. The metal layer, however, blocks the light that is to be transmitted through the effective region. Particularly as the number of divided regions increases, the number of dividing electrodes increases correspondingly, and the transmittance of the optical axis deflecting element 10-1 or 10-2 as a whole deteriorates.

Hence, in a third embodiment of the present invention, an optical axis deflecting element 10-3 uses a line-shaped transparent electrode 20 that is formed on the substrate surface as the dividing electrode dividing the effective region of the liquid crystal layer 15, as shown in FIGS. 11A and 11B. FIGS. 11A and 11B are a cross sectional view and a plan view respectively showing an important part of the optical axis deflecting element 10-3 in this third embodiment of the present invention. In FIGS. 11A and 11B, those parts that are the same as those corresponding parts in FIGS. 3 and 5 are designated by the same reference numerals, and a description thereof will be omitted.

By using the line-shaped transparent electrode 20, it is possible to prevent blocking the light that is to be transmitted through the optical axis deflecting element 10-3, and improve the light transmittance. Preferably, an oxide semiconductor, such as ITO (Indium Tin Oxide or indium-containing tin oxide) and ZnO, is used as the transparent electrode material that forms the layer of the transparent electrode 20 by evaporation or sputtering. Of course, a material having fine particles of such an oxide semiconductor dispersed within a resin may be coated or formed to form the layer of the transparent electrode 20.

Next, a description will be given of a case where the effective region or area of the liquid crystal layer of the optical axis deflecting element is designed to be even larger. As the width of the optical axis deflecting element increases, it is necessary to increase the voltage that is supplied to the electrode pair defining the width in order to apply a constant electric field on the liquid crystal layer. Hence, in the embodiments described above, the effective region is divided into a plurality of divided regions, and the divided regions are time-sequentially driven so that the width in which the electric field is generated at one time is reduced and the voltage supplied to the electrode pair defining this width is reduced when compared to the case where the electric field is generated with respect to the entire effective region at one time.

It is conceivable to increase the number of divided regions of the effective region as the area of the effective region or area of the liquid crystal layer of the optical axis deflecting element increases. But when taking into consideration the complexity of the switching part for switching the voltage and the restriction caused by the reorientation time of the liquid crystal layer in the state where no electric field is applied thereto, it is preferable that the number N of divisions of the effective region is approximately 2 to 4. From the practical point of view, there are cases where the number N of divisions of the effective region is set as small as possible as long as the upper limit of the high voltage safely usable within the apparatus permits. In such cases, the width of each divided region is relatively wide, and if the width of each divided region is on the order of approximately several mm to approximately 10 mm, the mere provision of the electrode pair having the electrode disposed at each end of the divided region as shown in FIGS. 5 and 7 may not be able to effectively generate the electric field at the central portion of the divided region. In other words, as the distance between two mutually adjacent electrodes (or the pitch of the adjacent electrodes) in the direction parallel to the substrate surface of the optical axis deflecting element increases, the generated electric field is concentrated in the vicinity of the electrode pair in a range of several mm from each electrode, and the uniformity of the electric field generated within the divided region may deteriorate.

Figure 12:
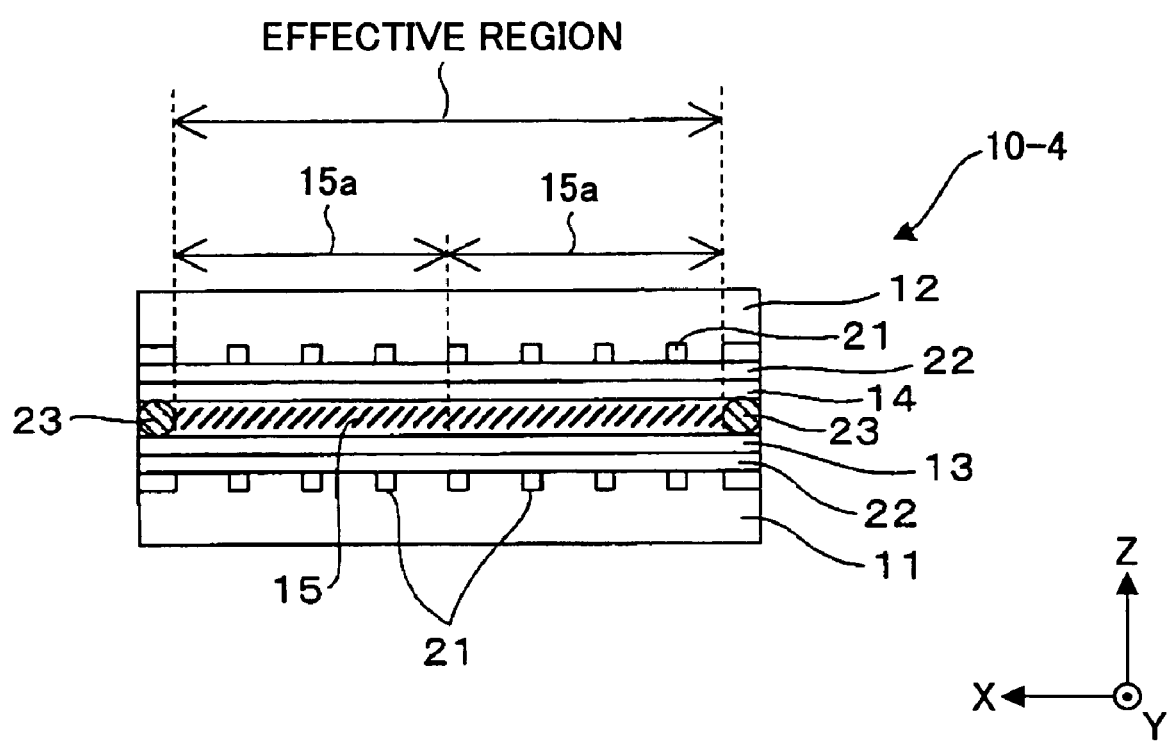
FIG. 12 is a cross sectional view showing an important part of the optical axis deflecting element in a fourth embodiment of the present invention.
Figure 13A:
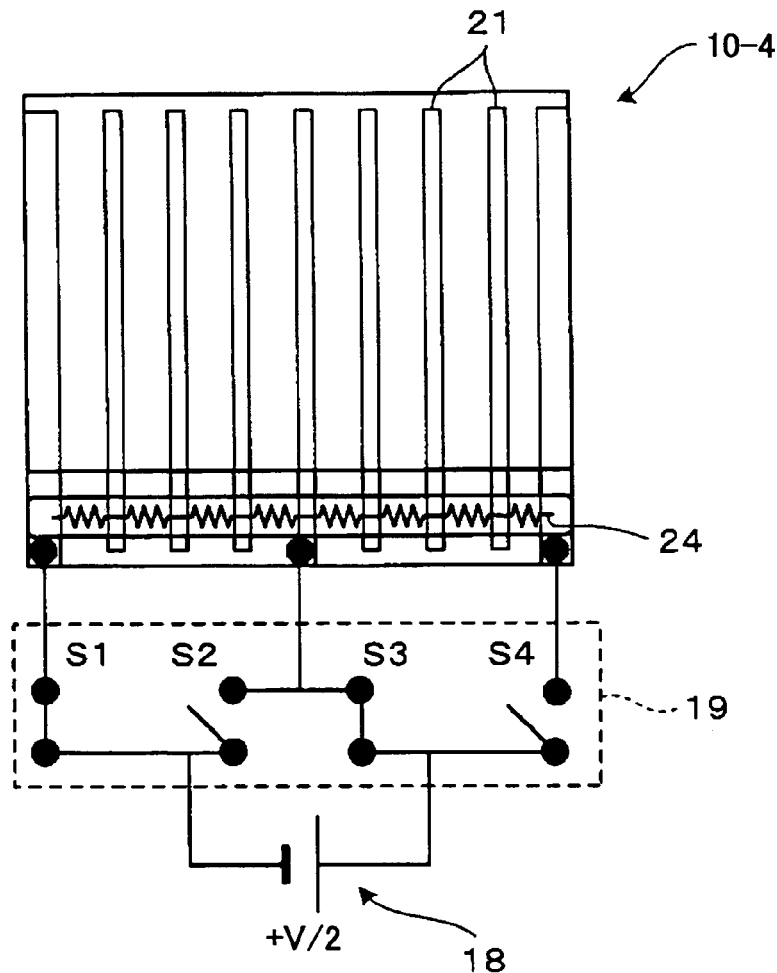
FIGS. 13A and 13B are diagrams for explaining the operation of the optical axis deflecting element in the fourth embodiment.
Figure 13B:
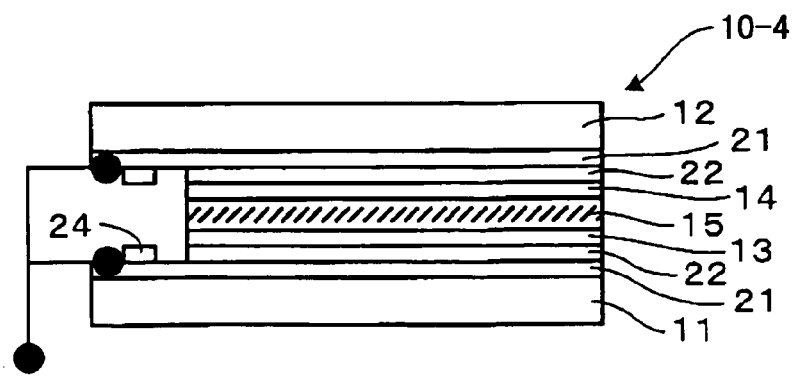

FIG. 12 is a cross sectional view showing an important part of the optical axis deflecting element in a fourth embodiment of the present invention, and FIGS. 13A and 13B are diagrams for explaining the operation of the optical axis deflecting element in the fourth embodiment. In FIGS. 12, 13A and 13B, those parts that are the same as those corresponding parts in FIGS. 3 and 5 are designated by the same reference numerals, and a description thereof will be omitted. In an optical axis deflecting element 10-4 shown in FIGS. 12, 13A and 13B, a large number of transparent line electrodes 21 are formed on the substrate surface to form the dividing electrodes within the effective region. A dielectric layer 22 is formed between the liquid crystal layer 15 and each plane on which a group of the transparent line electrodes 21 is provided. Each of the transparent line electrodes 21 of one group are electrically connected in series via resistors 24 shown in FIGS. 13A and 13B, so that a potential difference is applied across two transparent line electrodes 21 located at positions corresponding to the width of the divided region 15a or 15b, that is, located at both sides of the divided region 15a or 15b. In this particular case, the electrodes on both sides of the effective region are also formed by the transparent line electrodes 21 on the substrate surface, and thus, a spacers 23 is provided on each side of the effective region.

Preferably, an oxide semiconductor, such as ITO and ZnO, is used as the transparent electrode material that forms the layer of the transparent line electrode 21 by evaporation or sputtering. Of course, a material having fine particles of such an oxide semiconductor dispersed within a resin may be coated or formed to form the layer of the transparent line electrode 21. Preferably, the width of the transparent line electrode 21 is as narrow as possible, but practically, the width is set to approximately 10 μm. The pitch of the transparent line electrodes 21 is approximately several tens of μm to approximately several hundreds μm, but this pitch may be set in relation to the permittivity, the thickness and the like of the dielectric layer 22 described hereunder.

A material having high transparency, such as glass and resin, may be used for the dielectric layer 22, and the material preferably has no double refraction. The thickness of the dielectric layer 22 is preferably approximately several μm to approximately several hundred μm, and may be set in relation to the pitch of the adjacent transparent line electrodes 21. The dielectric layer 22 is bonded, using a transparent adhesive agent, on the substrate surface having the transparent line electrodes 21 formed thereon. When making the dielectric layer 22 thin, a thick dielectric layer may first be bonded on the substrate surface and the dielectric layer may be polished to a desired thickness. Preferably, the adhesive agent has a high permittivity, and has a double refraction that is relatively large and close to the index of refraction of the transparent electrode material. Furthermore, since the perpendicular orientation layers 13 and 14 are formed on the corresponding dielectric layers 22, the adhesive agent is preferably heat resistant to temperatures of approximately 100° C. to approximately 200° C. so as to withstand the thermal process that is carried out when forming the perpendicular orientation layers 13 and 14. In addition, in a case where the dielectric layers 22 and the perpendicular orientation layers 13 and 14 are made of resins, it is necessary to optimize the coating solvents of the resins. The optical axis deflecting element 10-4 is formed by filling the liquid crystal layer 15 between two substrate parts, one (lower substrate part) having the dielectric layer 22 and the perpendicular orientation layer 13 bonded together, and the other (upper substrate part) having the dielectric layer 22 and the perpendicular orientation layer 14 bonded together. In FIG. 12, the positions of the transparent line electrodes 21 match between the upper and lower substrate parts, but the transparent line electrodes 21 may be arranged so that the positions of the transparent line electrode 21 are staggered between the upper and lower substrate parts and the transparent line electrodes 21 of the upper substrate part and the transparent line electrodes 21 of the lower substrate part are alternately arranged when viewed from the top of the optical axis deflecting element 10-4.

The resistors 24 are formed as shown in FIGS. 13A and 13B so as to electrically the transparent line electrodes 21 in series. Any suitable resistor 24 capable of displaying a desired resistance and formable on the transparent line electrodes 21 may be used. In order for the resistors 24 to function stably, to prevent breakdown or the like of the resistors 24, and to prevent undesirable effects on the liquid crystal characteristic due to excessive heating of the resistors 24, the resistors 24 are preferable made of a material having a surface resistance of $1 \times 10^7$ $\Omega/\square$. More particularly, materials such as chrome oxide, tin oxide, antimony oxide, zinc oxide and ATO (Antimony Tin Oxide or antimony-containing tin oxide), and coatable materials such having fine particles of such oxide materials dispersed within a resin may be used for the resistors 24. The resistors 24 may be formed on the transparent line electrodes 21 by evaporation, sputtering, and the like, and when the coatable material is used, it is possible to use spin-coating, and printing techniques such as flexographic printing, screen printing, and spray techniques such as nozzle or ink-jet techniques. It is necessary to mask portions other than the portions where the resistors 24 are to be formed, depending on the technique used to form the resistors 24. The width of each resistor 24 formed on the transparent line electrodes 21 differs slightly depending on the resistor material used, but is preferably approximately 1 mm to approximately 5 mm. In addition, instead of forming the resistors 24 on the substrate part as shown in FIGS. 13A and 13B, it is possible to extend the transparent line electrodes 21 using a flexible substrate or the like, and connect the extended transparent line electrodes 21 to a resistor array or resistor material provided on the substrate separate from the substrate part on which the optical axis deflecting element 10-4 is formed.

In FIGS. 13A and 13B, the three transparent line electrodes 21 respectively located at the center and both sides of the optical axis deflecting element 10-4 are connectable to the power supply 18 via the switching part 19, so as to divide the effective region into the first and second divided regions 15a and 15b. Accordingly, this optical axis deflecting element 10-4 may be driven in the same manner as described above with reference to FIGS. 8A through 10D.

In the optical axis deflecting element 10-4, a periodic structure is formed by the transparent line electrodes 21 within the effective region. For this reason, if a difference between the indexes of refraction of the transparent electrode material and the adhesive agent becomes large, the periodic structure formed by the transparent line electrodes 21 acts as a diffraction grating, to thereby generate a diffraction phenomenon.

Figure 14:
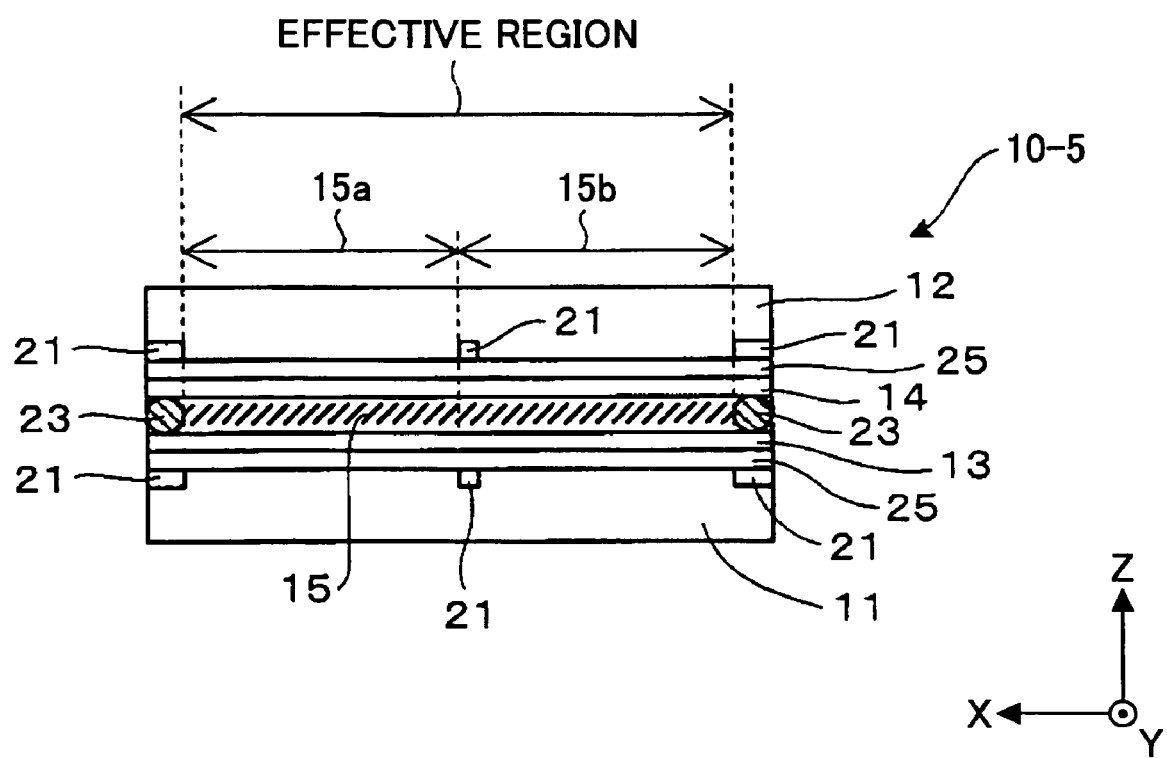
FIG. 14 is a cross sectional view showing an important part of the optical axis deflecting element in a fifth embodiment of the present invention.
Figure 15A:
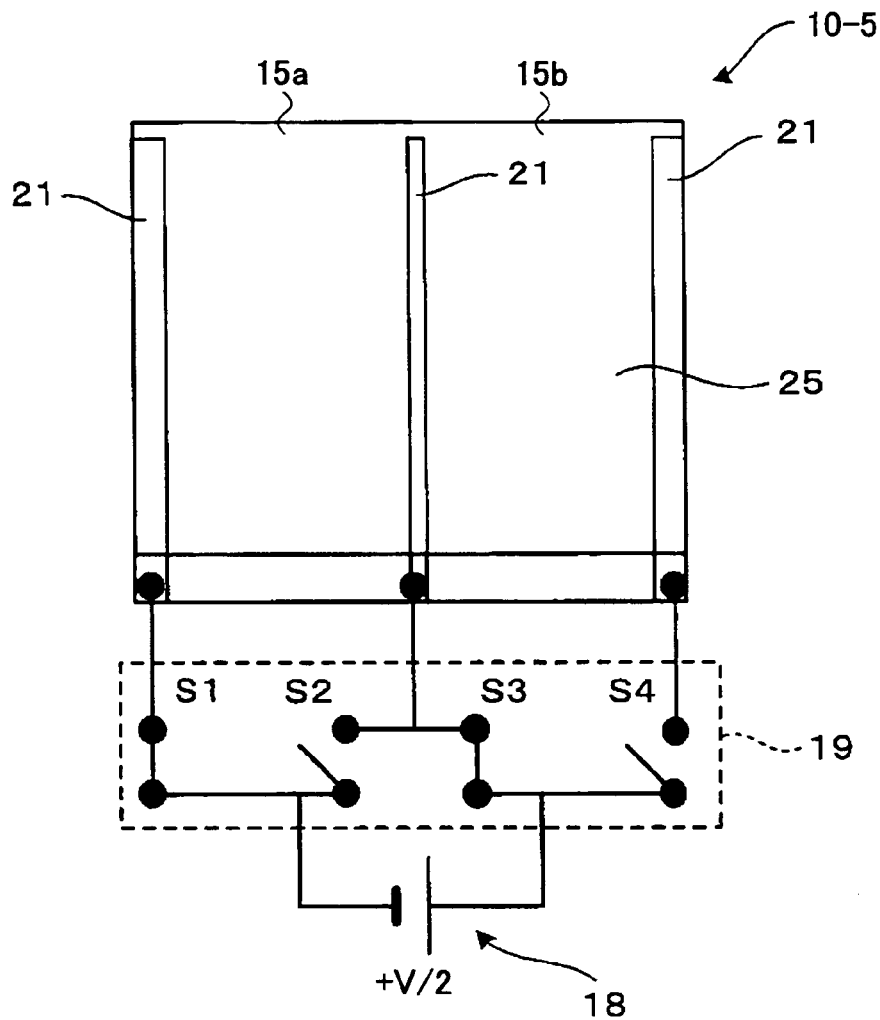
FIGS. 15A and 15B are diagrams for explaining the operation of the optical axis deflecting element in the fifth embodiment.
Figure 15B:
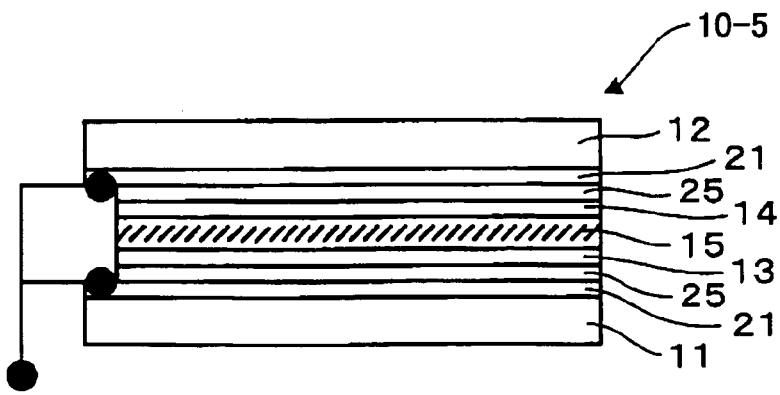

A fifth embodiment of the present invention avoids this diffraction phenomenon. FIG. 14 is a cross sectional view showing an important part of the optical axis deflecting element in this fifth embodiment of the present invention, and FIGS. 15A and 15B are diagrams for explaining the operation of the optical axis deflecting element in this fifth embodiment. In FIGS. 14, 15A and 15B, those parts that are the same as those corresponding parts in FIGS. 3 and 5 are designated by the same reference numerals, and a description thereof will be omitted. In an optical axis deflecting element 10-5 shown in FIGS. 14, 15A and 15B, the transparent line electrodes 21 are only arranged on both sides and at the dividing position within the effective region. A transparent resistor layer 25 is formed on the substrate surface over the transparent line electrodes 21. The diffraction phenomenon of the transmitted light can be prevented because no periodic structure is provided within the effective region. In addition, a parallel electric field that is relatively uniform can be formed by the transparent resistor layers 25, even though no dielectric layer is provided. Furthermore, in order to average the distortion in the electric field caused by resistor inconsistencies and defects locally occurring in the transparent resistor layer 25, it is of course possible to provide a dielectric layer, similar to the dielectric layer 22 shown in FIGS. 12, 13A and 13B, between the transparent resistor layer 25 and the liquid crystal layer 15.

The transparent resistor layer 25 may be made of a resin layer having tin oxide-based or indium oxide-based conductor powder dispersed therein, and this resin layer may be formed by spin-coating, various printing techniques or the like. Light transmitting metal oxides may also be used for the transparent resistor layer 25. Examples of the metal oxides include 2-element compounds such as tin oxide, zinc oxide, cadmium oxide, indium oxide, lead oxide and gallium oxide, and 3-element compounds such as magnesium-indium oxide, gallium-indium oxide, zinc-indium oxide and zinc-tin oxide, and the like. Such 2-element and 3-element compounds may be added with an additive. For example, antimony or fluorine may be added to tin oxide, tin may be added to indium oxide, and antimony, gallium or boron may be added to zinc oxide. When a physical deposition technique is used to form the metal oxide material, it is possible to grow the layer from the atomic or molecular level in a relatively low-temperature state, and the degree of freedom with which the substrates 11 and 12 may be selected is increased, thereby enabling the formation of a layer having a uniform thickness and composition over a large area. The physical deposition technique includes vapor deposition, ion plating, sputtering and the like which are popularly used industrially.

The function of the transparent resistor layer 25 of this embodiment is to form a desired potential gradient along the substrate surface, and it is desirable to use the transparent resistor layer 25 under the condition that the amount of heat generated by the transparent resistor layer 25 when applied with a current is relatively small. For this reason, a high-resistance transparent resistor material having a surface resistance of approximately $1 \times 10^8$ $\Omega/\square$ or greater is preferably used for the transparent resistor layer 25. When a corresponding volume resistivity is taken into consideration, it is preferable that the volume resistivity is $10^3$ $\Omega$cm or greater when the thickness of the transparent resistor layer 25 is 0.1 μm, $10^4$ $\Omega$cm or greater when the thickness of the transparent resistor layer 25 is 1 μm, $10^5$ $\Omega$cm or greater when the thickness of the transparent resistor layer 25 is 10 μm. In this case, the time constant of the transparent resistor layer 25 is less than or equal to microseconds, such that no problem is introduced from the practical point of view hen used to switch the voltage at a period of several hundred microseconds.

In FIGS. 15A and 15B, the three transparent line electrodes 21 respectively located at the center and both sides of the optical axis deflecting element 10-5 are connectable to the power supply 18 via the switching part 19, so as to divide the effective region into the first and second divided regions 15a and 15b. Accordingly, this optical axis deflecting element 10-5 may be driven in the same manner as described above with reference to FIGS. 8A through 10D.

An approximately uniform optical axis deflecting operation can be carried out in the entire effective region of the optical axis deflecting element 10-5 having the structure described above. However, when the vicinities of the dividing electrode is observed in detail, the uniformity of the optical axes may be found to be poor in some cases. A description will now be given of the case where the line-shaped transparent electrode 20 is used as the dividing electrode, as described above in conjunction with FIGS. 11A and 11B.

Figure 16:
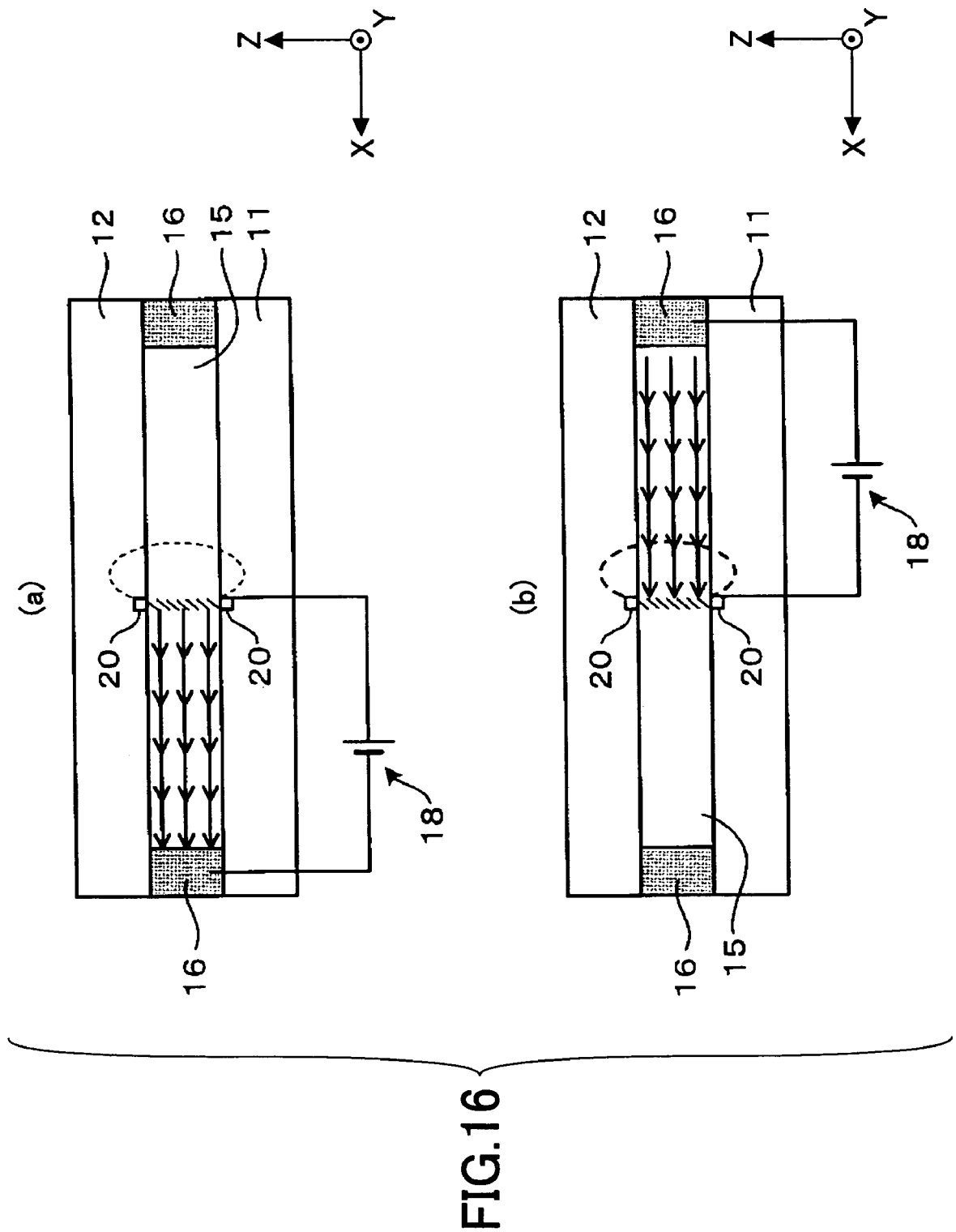
FIG. 16 is a diagram generally showing a state where an electric field is applied in a vicinity of a boundary dividing an effective region of the optical axis deflecting element.

FIG. 16 is a diagram generally showing a state where an electric field is applied in a vicinity of a boundary dividing an effective region of the optical axis deflecting element. In FIG. 16 and FIGS. 17 through 20 which will be described later, the same reference numerals are used for the corresponding elements of the optical axis deflecting element. In FIG. 16, the optical axis deflecting element has a structure similar to that shown in FIGS. 11A and 11B, and the illustration of the perpendicular orientation layers 13 and 14 is omitted. A dotted line illustrated at the center of the optical axis deflecting element in FIG. 16 indicates that the dividing electrode 20 on the upper substrate 12 and the dividing electrode 20 on the lower substrate 11 are electrically connected. FIG. 16(a) shows a state where the voltage is supplied with respect to the left divided region, and FIG. 16(b) shows a state where the voltage is supplied with respect to the right divided region. The illustration of the switching part for switching the voltage supply to the divided regions and a description of the operation thereof will be omitted. The dividing electrode 20 at least has a width of approximately 10 μm, but no electric field is generated within the width of the dividing electrode 20 because the potential is the same within the width of the dividing electrode 20. For this reason, a portion where the electric field decreases is generated within the liquid crystal layer 15 in the vicinity of the dividing electrode 20. In a case where the positions of the dividing electrodes 20 on the upper and lower substrates 12 and 11 match and confront the light transmitting direction (up-and-down direction with respect to the paper surface), a central portion of the optical axis deflecting element indicated by the hatching is adjacent to the divided region not applied with the electric field, for both the states shown in FIG. 16(a) and FIG. 16(b) where the electric field is applied to the other divided region, and this hatched portion constantly tends to become a low-electric-field portion. In this low-electric-field portion, the tilt angle of the optical axes is locally small, and causes the uniformity of the entire effective region to deteriorate. Particularly the light beam that is perpendicularly incident to this low-electric-field portion is easily affected thereby.

Figure 17:
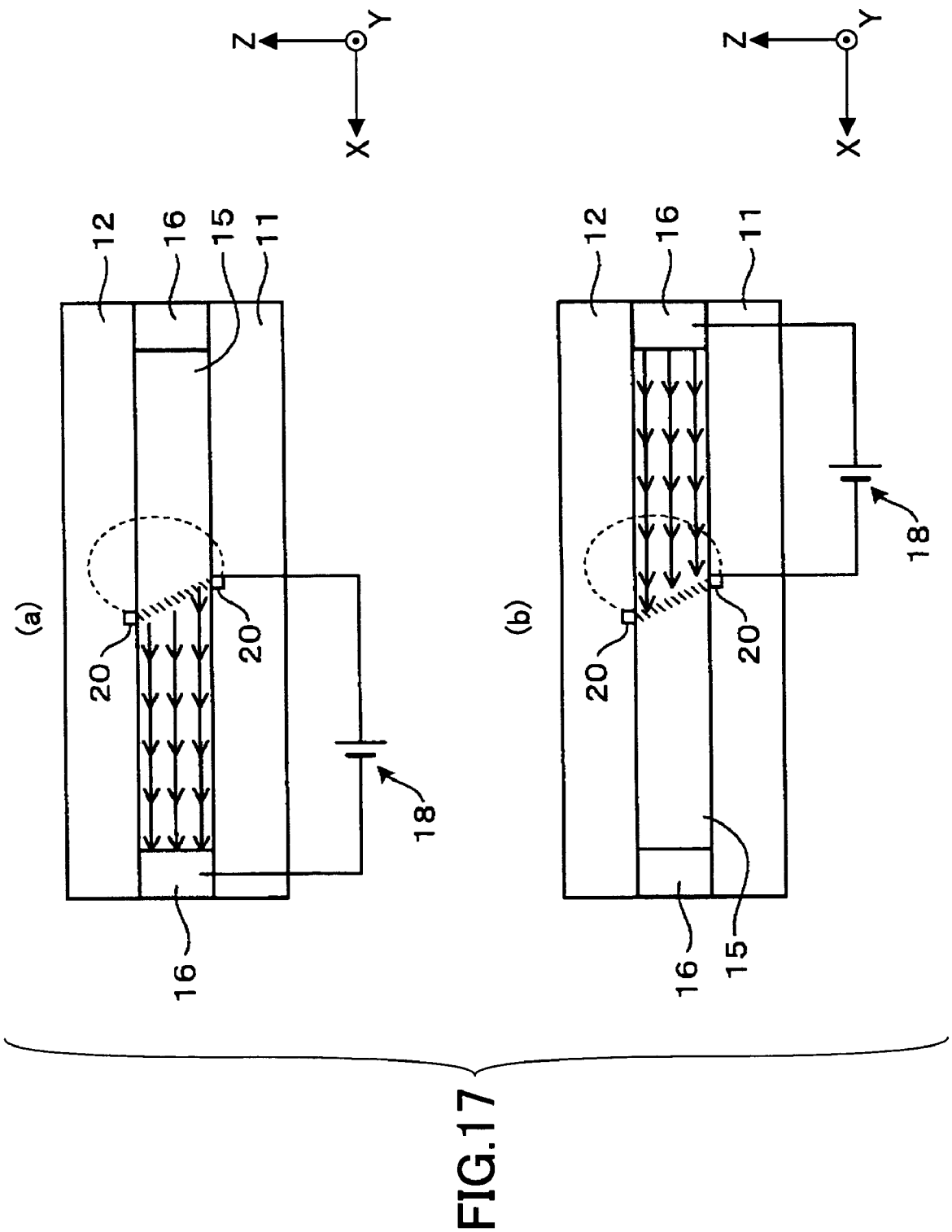
FIG. 17 is a diagram for explaining the effects of shifting the position of the dividing electrode of the optical axis deflecting element.

Hence, the positions of the upper and lower dividing electrodes 20 may be shifted as shown in FIG. 17, so that the low-electric-field portion is generated in an inclined direction with respect to the direction in which the thickness of the liquid crystal layer 15 is taken relative to the substrate surface. FIG. 17 is a diagram for explaining the effects of shifting the position of the dividing electrode of the optical axis deflecting element. FIG. 17(a) shows a state where the voltage is supplied with respect to the left divided region, and FIG. 17(b) shows a state where the voltage is supplied with respect to the right divided region. Accordingly, the light beam perpendicularly incident to the substrate surface in the vicinity of the dividing electrode 20 only passes a portion of the low-electric-field portion in the direction taken along the thickness of the liquid crystal layer relative to the substrate surface, and the effects of the low-electric-field portion on the uniformity of the entire effective region are reduced compared to the case shown in FIG. 16.

The above positional shifting of the dividing electrodes 20 may be similarly applied to the structure shown in FIGS. 14, 15A and 15B having the transparent resistor layer 25.

Figure 18:
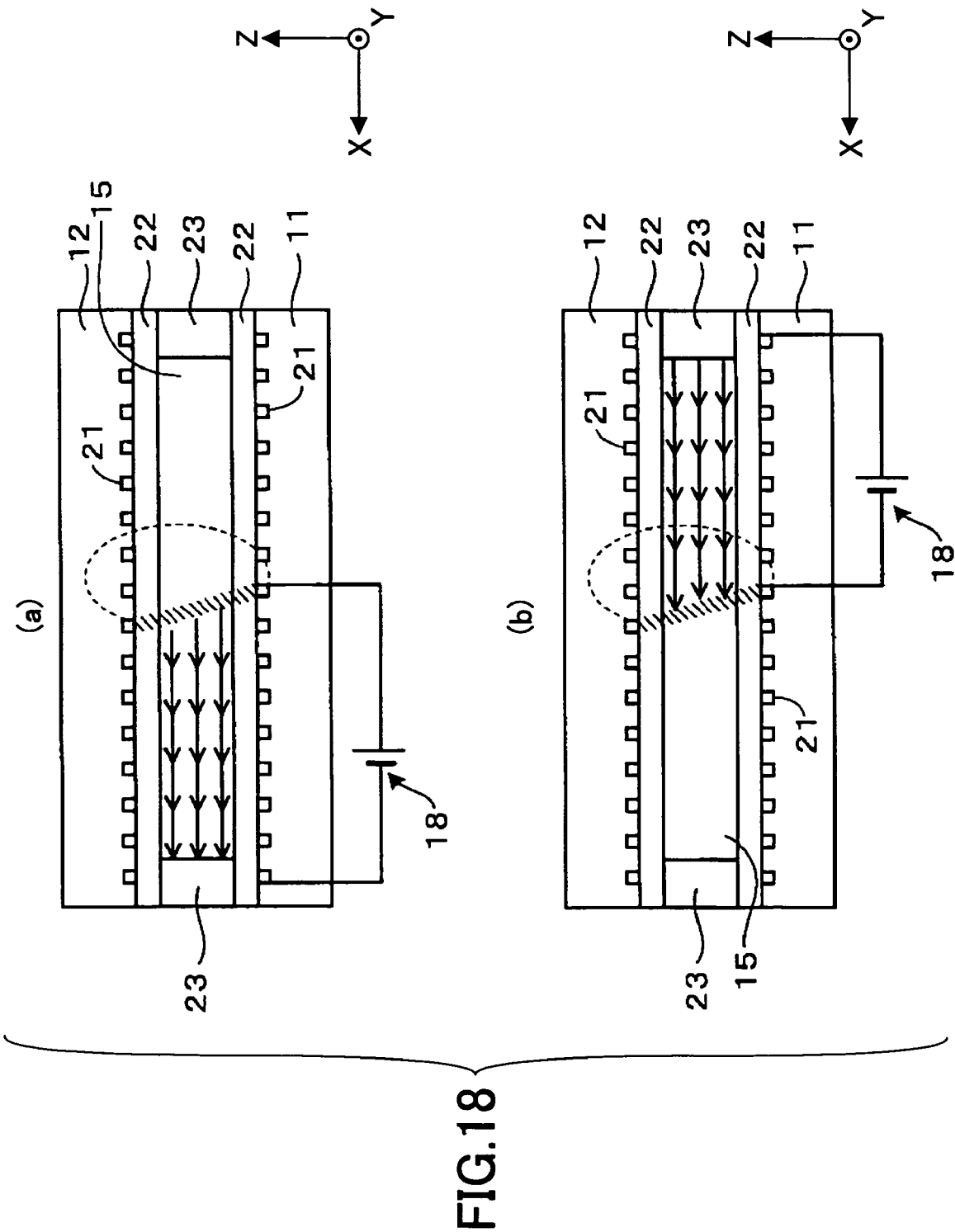
FIG. 18 is a diagram for explaining the effects of shifting the set position of the dividing electrode of the optical axis deflecting element.

In addition, when a large number of transparent line electrodes 21 are arranged as shown in FIGS. 12, 13A and 13B, the positions of the upper and lower transparent line electrodes 21 on the upper and lower substrates 12 and 11 and connected to be used as the dividing electrodes may be shifted as shown in FIG. 18, so that the low-electric-field portion is generated in an inclined direction with respect to the direction in which the thickness of the liquid crystal layer 15 is taken relative to the substrate surface. FIG. 18 is a diagram for explaining the effects of shifting the set position of the dividing electrode of the optical axis deflecting element. FIG. 18(a) shows a state where the voltage is supplied with respect to the left divided region, and FIG. 18(b) shows a state where the voltage is supplied with respect to the right divided region. Accordingly, the light beam perpendicularly incident to the substrate surface in the vicinity of the dividing electrode only passes a portion of the low-electric-field portion in the direction taken along the thickness of the liquid crystal layer relative to the substrate surface, and the effects of the low-electric-field portion on the uniformity of the entire effective region are reduced compared to the case shown in FIG. 16.

Figure 19:
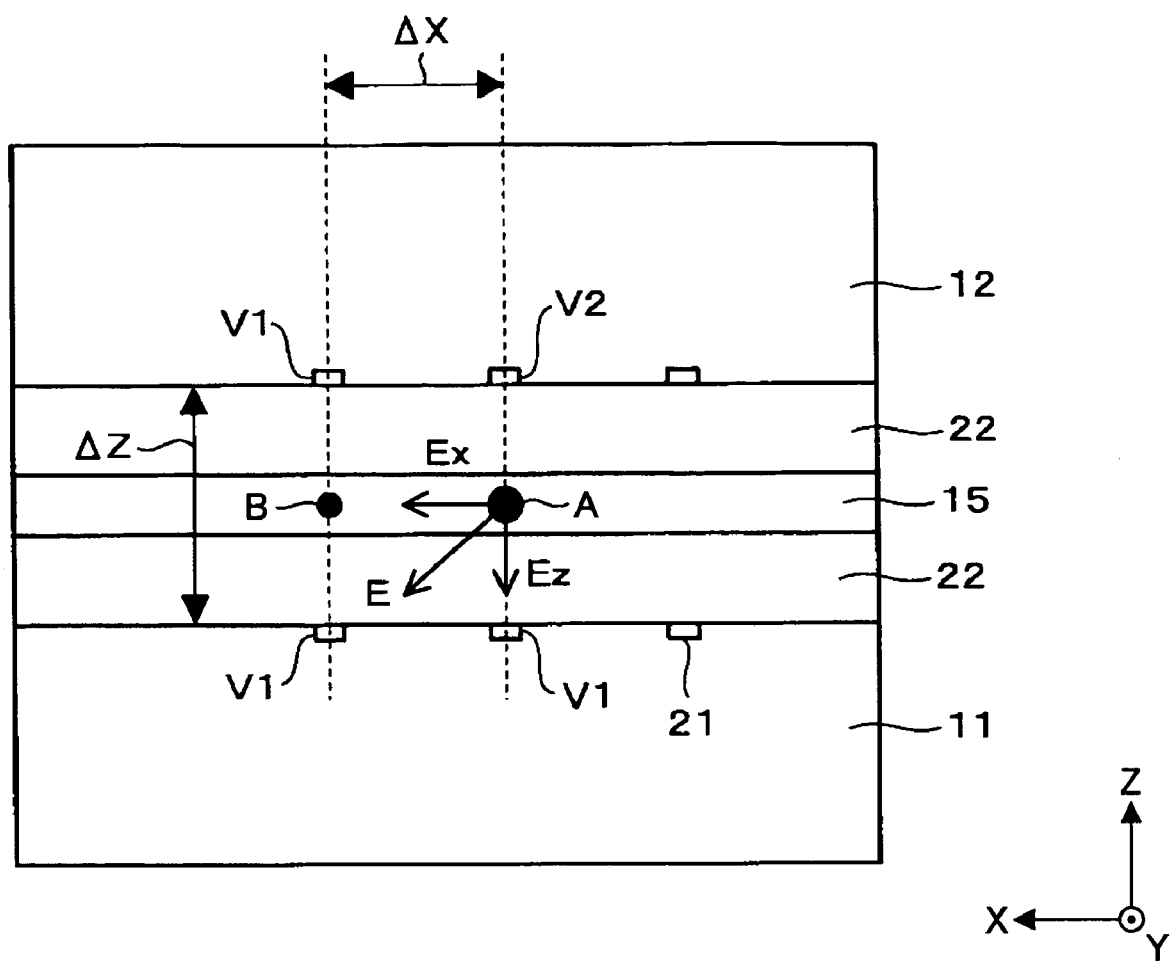
FIG. 19 is a diagram generally showing the electric field in the vicinity of the dividing electrode of the optical axis deflecting element shown in FIG. 18(b)

In the structures shown in FIGS. 17 and 18, when the positions of the dividing electrodes on the upper and lower electrodes 12 and 11 are greatly shifted relative to each other, an electric field component is also generated in the direction taken along the thickness of the liquid crystal layer 15 relative to the substrate surface, and the tilt direction of the optical axis changes at the portion where the electric field is applied. FIG. 19 is a diagram generally showing the electric field in the vicinity of the dividing electrode of the optical axis deflecting element shown in FIG. 18(b). In FIG. 19 the electric field within the liquid crystal layer 15 is considered by a simple model for the sake of convenience. In the following description, a potential of the electrode that is set as the dividing electrode is denoted by V1, an amount of shift of the dividing electrodes on the upper and lower substrates 12 and 11 in the X-axis direction in FIG. 19 is denoted by ΔX, a distance between the corresponding dividing electrodes on the upper and lower substrates 12 and 11 in the Z-axis direction is denoted by ΔZ, and a potential of the line electrode on the upper substrate 12 and corresponding to the dividing electrode on the lower substrate 11 is denoted by C2. In addition, it is assumed that the potential of the line electrode on the lower substrate and corresponding to the dividing electrode on the upper substrate is approximately equal to V1. To be more precise, it is desirable to consider the internal electric field distribution based on the dielectric constants of the substrates 11 and 12, the dielectric layers 22 and the liquid crystal layer 15, but it is assumed in this simple model that the dielectric constants are the same. Moreover, it may be regarded that the perpendicular orientation of the liquid crystal layer 15 deteriorates to generate cloudiness or undesirable scattering state when the direction of the electric field within the liquid crystal layer 15 is tilted by 45 degrees or greater.

Hence, the amount ΔX of shift of the dividing electrodes may be set smaller than the distance ΔZ between the electrodes. In the case of the simple model shown in FIG. 19, the electric field at a point A within the liquid crystal layer 15 is a combination of an electric field Ex in the X-axis direction and an electric field Ez in the Z-axis direction. The following relationships stand if the potential at the point A is denoted by VA and a potential at a point B is denoted by VB.

$$Ex=(VA-VB)/\Delta X$$

$$Ez=(VA-V1)/(\Delta Z/2)$$

Since VB is approximately equal to V1, the following relationship stands.

$$Ex \times \Delta X = EWz \times (\Delta Z/2)$$

In order to set the tilt direction of the electric field E at the point A to 45 degrees or less, a relationship Ex>Ez needs to be satisfied, and from the above described formulas, it may be seen that a relationship $(\Delta Z/2) > \Delta X$ needs to be satisfied. In other words, it is possible to prevent the generation of the liquid crystal orientation defect caused by the inclined electric field by setting the amount $\Delta X$ of shift of the dividing electrodes smaller than ½ the distance $\Delta Z$ between the electrodes.

Figure 20:
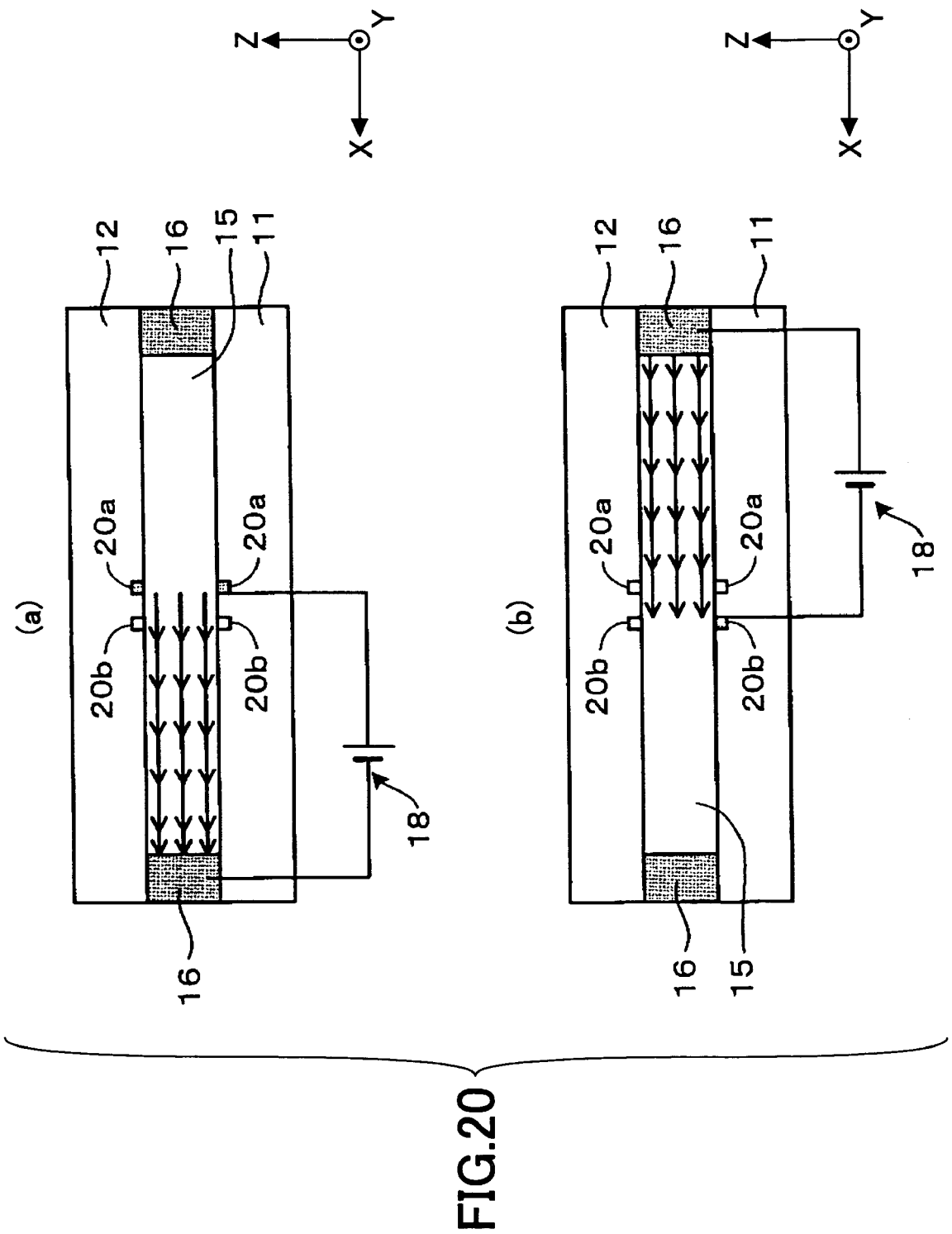
FIG. 20 is a diagram for explaining the effects of time change of the dividing electrode position of the optical axis deflecting element.

The positions of the dividing electrodes are fixed in the structures described above, but the positions of the electrodes that are to function as the dividing electrodes may of course be changed depending on the region to which the electric field is to be applied. FIG. 20 is a diagram for explaining the effects of time change of the dividing electrode position of the optical axis deflecting element. As shown in FIG. 20, at least a pair of line electrodes 20*a* and 20*b* are provided on each of the upper and lower substrates 12 and 11 as the dividing electrode for dividing the effective region into a plurality of regions. In addition, when time-sequentially applying the electric field to the divided regions of the effective region, the electric field applying times partially overlap in a region of the liquid crystal layer 15 between the pair of line electrodes 20*a* and 20*b*. For example, FIG. 24(*a*) shows a state where the voltage is supplied to the line electrodes 20*a* on the right so as to apply the electric field to the region to the left of the line electrodes 20*a*. On the other hand, FIG. 24(*b*) shows a state where the voltage is supplied to the line electrodes 20*b* on the left so as to apply the electric field to the region to the right of the line electrodes 20*b*. Hence, the electric field is constantly applied to the region between the line electrodes 20*a* and 20*b*, and since the low-electric-field region at one end of the divided region shifts depending on the switching of the divided region shown in FIG. 20(*a*) and FIG. 20(*b*), it is possible to constantly prevent the generation of the low-electric-field that would be generated in the case shown in FIG. 16 described above. In the case shown in FIG. 20, the width of each divided region is slightly larger compared to that shown in FIG. 16 and a slightly large voltage needs to be applied to each divided region in order to generate the same electric field as in FIG. 16. However, since the distance between the line electrodes 20*a* and 20*b* in the X-axis direction is sufficiently small compared to the width of each divided region in the X-axis direction, no problem is introduced from the practical point of view. In addition, in the case shown in FIG. 18 using a large number of transparent line electrodes 21, it is also possible to change the transparent line electrodes 21 that are selected as the dividing electrodes similarly to FIG. 20, so as to obtain effects similar to those obtainable by the structure shown in FIG. 20.

In the embodiments described heretofore, the voltage used to generate the electric field within the divided region of the effective region is supplied to only the pair of electrodes defining the divided region, and the pair of electrodes defining the divided region other than the divided region in which the electric field is to be generated is in an electrically floating state. In this case where the electric field is applied to one divided region, however, there is a possibility of generating an electric field in an opposite (or reverse) direction within the other divided region that is adjacent to the one divided region even though no voltage is supplied to the electrode pair defining this adjacent divided region. This electric field in the reverse direction may change the orientation state of the liquid crystal layer 15 within the adjacent divided region which should originally not be applied with an electric field.

Figure 21:
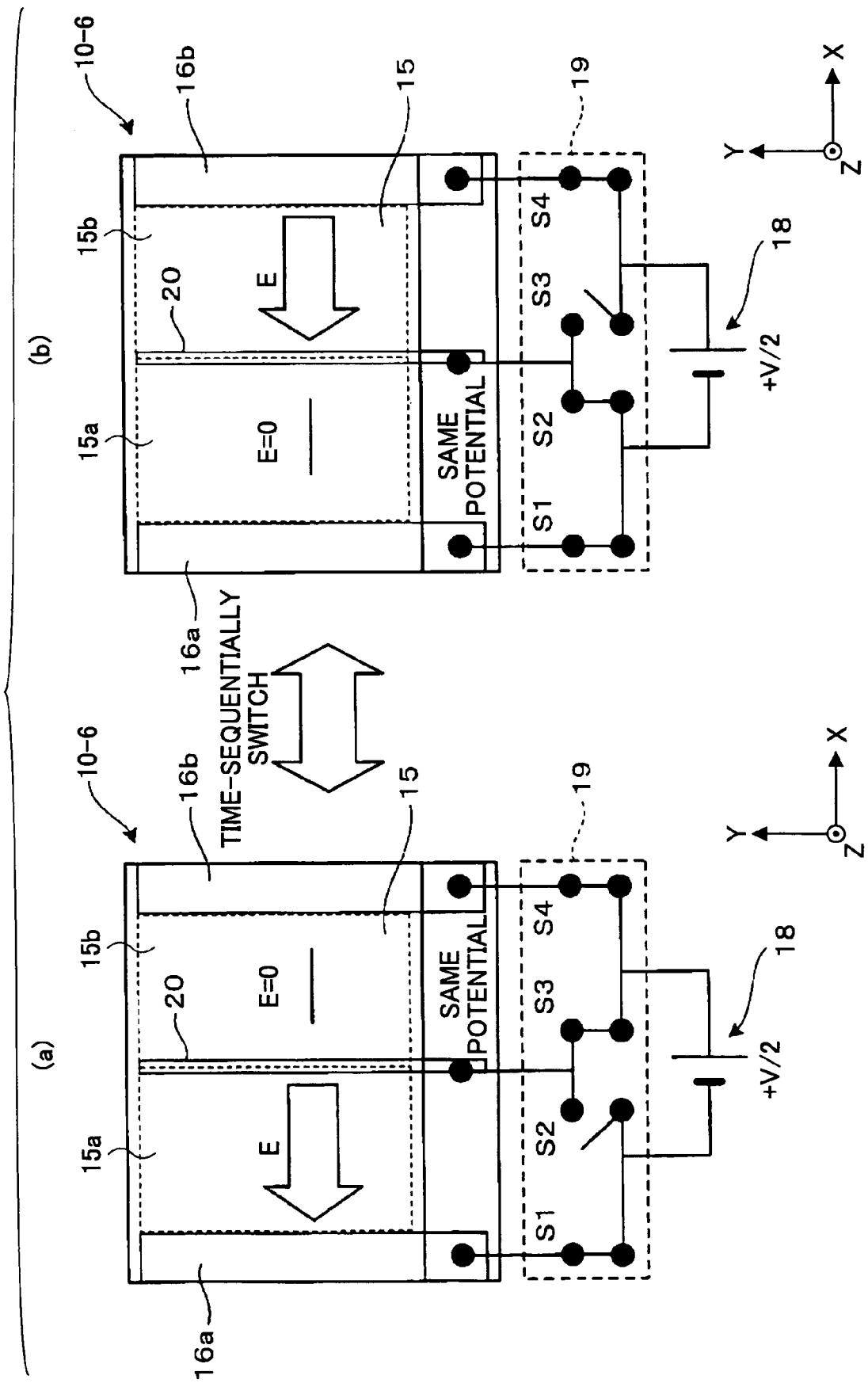
FIG. 21 is a diagram for explaining a method of supplying the voltage to the optical axis deflecting element in a sixth embodiment of the present invention.

Accordingly, the voltage supplied to the electrode pairs may be controlled so that the electrode pair defining the divided region other than the divided region to which the electric field is applied has the same potential, as shown in FIG. 21. FIG. 21 is a diagram for explaining the method of supplying the voltage to an optical axis deflecting element 10-6 in a sixth embodiment of the present invention. In FIG. 21, the ON/OFF states of the switching part 19 are controlled so that the electrode pair defining the divided region that is not to be applied with an electric field has the same potential. In the case shown in FIG. 21(*a*) where the voltage is supplied to the electrode pair defining the left divided region 15*a* to generate the electric field E therein, the electrode pair defining the right divided region 15*b* is controlled to have the same potential. On the other hand, in the case shown in FIG. 21(*b*) where voltage is supplied to the electrode pair defining the right divided region 15*b* to generate the electric field E therein, the electrode pair defining the left divided region 15*a* is controlled to have the same potential. As a result, it is possible to positively prevent the generation of an unwanted electric field, which may disturb the tilted state of the optical axes of the liquid crystal layer 15, within the divided region which should originally be in a state not applied with an electric field.

Figure 22:
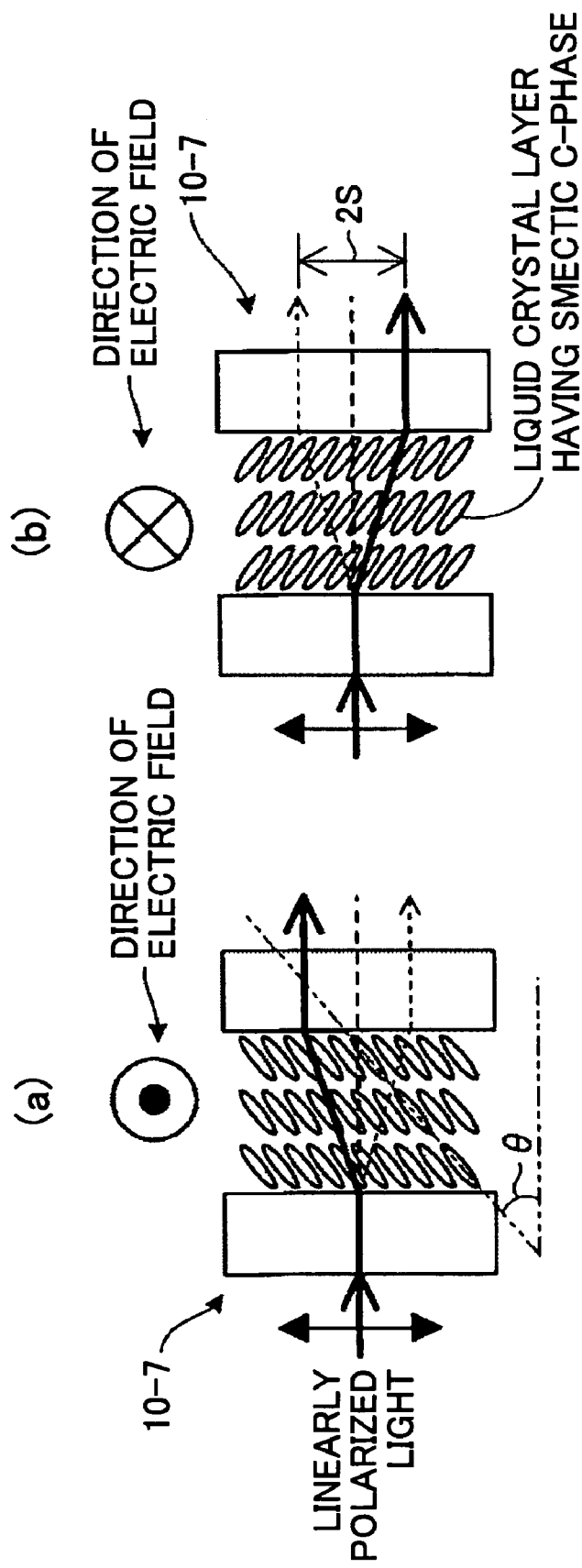
FIG. 22 is a diagram for explaining the optical axis deflecting operation of the optical axis deflecting element in a seventh embodiment of the present invention.

FIG. 22 is a diagram for explaining the optical axis deflecting operation of an optical axis deflecting element 10-7 in a seventh embodiment of the present invention. In this embodiment, the optical axis deflecting element 10-7 is used as an optical path deflecting element. As shown in FIG. 22, it is possible to shift the position of an output optical path of outgoing light with respect to an incident optical path of incoming light, by using linearly polarized light as the incident light to the optical axis deflecting element 10-7 and setting the plane of polarization of the linearly polarized light in a direction perpendicular with respect to the direction in which the parallel electric field is applied to the liquid crystal layer 15. In addition, by controlling the shift of the optical path by connecting a driving part or means, including the power supply 18 and the switching part 19, to the optical axis deflecting element 10-7, it is possible to deflect the optical path of light in response to an electrical signal.

FIG. 22 schematically shows the orientation state of the liquid crystal molecules in the liquid crystal layer 15 of the optical axis deflecting element 10-7, and the illustration of the perpendicular orientation layers, the spacer, the electrodes and the like is omitted. For the sake of convenience, it is assumed that the voltage is supplied with a polarity such that the direction of the generated electric field is perpendicularly outwards from the paper surface in FIG. 22(*a*) and is perpendicularly inwards to the paper surface in FIG. 22(*b*). The direction in which the electric field is generated may be switched by the driving part or means in correspondence with the desired tilt direction of the optical axis.

When the electric field is applied perpendicularly outwards from the paper surface in FIG. 22(*a*) with respect to the liquid crystal layer 15, the number of liquid crystal molecules having directors tilted towards the top right increases if the spontaneous polarization of the liquid crystal molecules is positive, and the average optical axis of the liquid crystal layer 15 is also tilted towards the top right and functions as a double refraction plate. When the electric field is greater than or equal to the threshold value at which the spiral structure of the chiral smectic C-phase dissolves, all liquid crystal directors show the tilt angle θ, and the double refraction plate has an optical axis that is tilted upwards by the angle θ. Accordingly, when the linearly polarized light is incident to the optical axis deflecting element 10-7 from the left in FIG. 22(*a*) as extraordinary light, this linearly polarized light makes a parallel shift towards the upward direction. If the index of refraction of the liquid crystal molecules in the long-axis direction is denoted by ne, the index of refraction in the short-axis direction is denoted by no, and the thickness (or gap) of the liquid crystal layer 15 is denoted by d, an amount S of shift can be described by the following formula (1), as may be understood from "Crystal Optics", Edited by Optics Conference of the Japan Society of Applied Physics, 1975, p. 198.

$$S=[\{(1/no)^2-(1/ne)^2\}\sin(2\theta)\times d]/[2\{(1/ne)^2\sin^2\theta+(1/no)^2\cos^2\theta\}] \quad (1)$$

Similarly, when the electric field is applied perpendicularly inwards into the paper surface in FIG. 22(*b*) with respect to the liquid crystal layer 15, the number of liquid crystal molecules having directors tilted towards the bottom right increases if the spontaneous polarization of the liquid crystal molecules is positive, and the average optical axis of the liquid crystal layer 15 is also tilted towards the bottom right and functions as a double refraction plate. When the electric field is greater than or equal to the threshold value at which the spiral structure of the chiral smectic C-phase dissolves, all liquid crystal directors show the tilt angle θ, and the double refraction plate has an optical axis that is tilted downwards by the angle θ. Accordingly, when the linearly polarized light is incident to the optical axis deflecting element 10-7 from the left in FIG. 22(*b*) as extraordinary light, this linearly polarized light makes a parallel shift towards the downward direction. In addition, by reversing the direction of the electric field, the total amount of parallel shift of the optical path between the states shown in FIG. 22(*a*) and FIG. 22(*b*) is 2S.

Therefore, by switching the direction of the applied electric field to switch the tilt direction of the optical axis of the liquid crystal layer 15, it is possible to switch the position of the outgoing light from the optical axis deflecting element 10-7. As a result, it is possible to realize an optical path deflecting element, an optical axis deflecting unit or an optical path deflecting unit which can be driven by a relatively small voltage with respect to a relatively large effective region or area.

Figure 23:
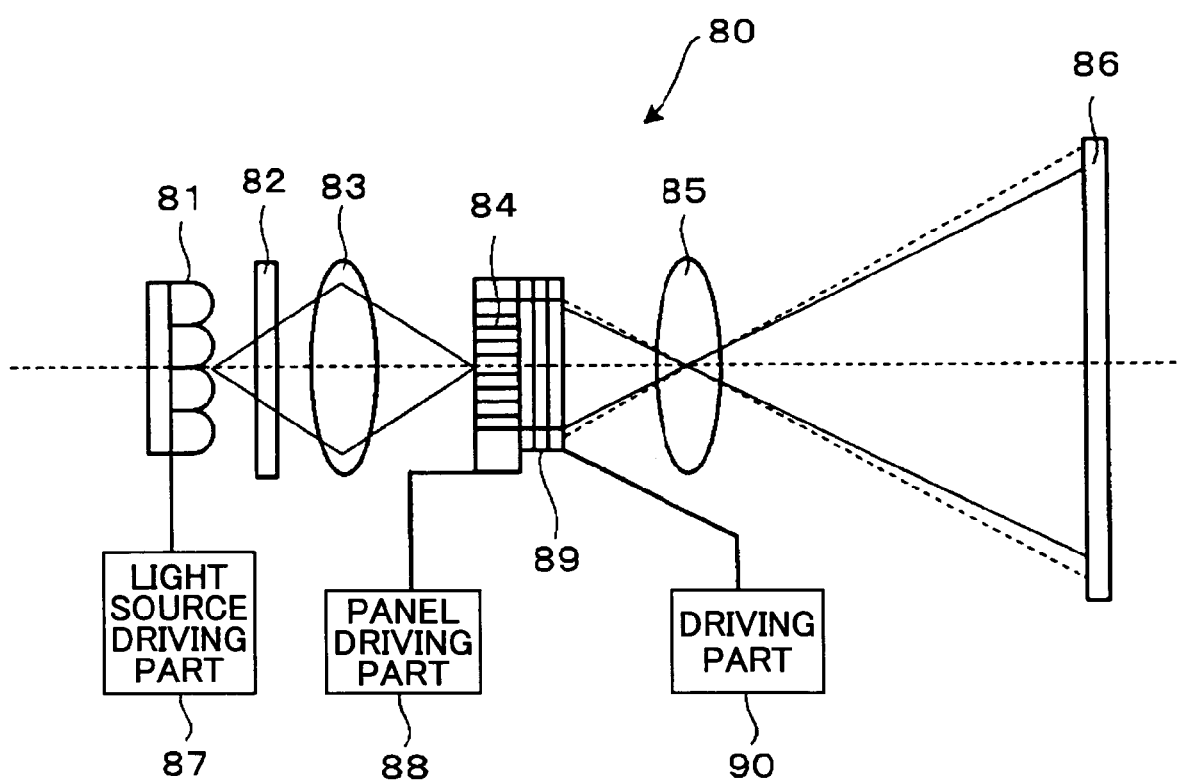
FIG. 23 is a diagram showing an image display apparatus in an eighth embodiment of the present invention.

Next, a description will be given of an eighth embodiment of the present invention, by referring to FIG. 23. FIG. 23 is a diagram showing an image display apparatus in this eighth embodiment of the present invention. In this embodiment, the optical axis deflecting element unit (or optical path deflecting unit) having the structure described above is used as an optical path deflecting unit or means of an image display apparatus 80.

In FIG. 23, a light source 81 has LED lamps arranged in a two-dimensional array. In a direction in which the light progresses from this light source 81 towards a screen 86, a diffusion plate 82, a condenser lens 83, a transmission type liquid crystal panel 84 forming an image display element, and a projection lens 85 are provided. The projection lens 85 forms an optical member for observing the image pattern. A light source driving part 87 drives the light source 81, and a panel driving part 88 drives the transmission type liquid crystal panel 84. The screen 86 may form a part of the image display apparatus 80 or, be a separate part from the image display apparatus 80.

An optical path deflecting element 89, which functions as a pixel shift element, is interposed in an optical path between the transmission type liquid crystal panel 84 and the projection lens 85. A driving part 90 drives the optical path deflecting element 89 and form the optical path deflecting unit. The optical path deflecting element 89 has the structure described above using the optical axis deflecting element or optical path deflecting element.

The illuminating light emitted from the light source 81 under the control of the light source driving part 87 is formed into uniform illuminating light by the diffusion plate 82, and critically illuminates the transmission type liquid crystal panel 84 via the condenser lens 83 by being controlled by the panel driving part 88 in synchronism with the light source 81. The spatially and optically modulated illuminating light from the transmission type liquid crystal panel 84 is directed to the optical path deflecting element 89 as image light, and the optical path deflecting element 89 shifts the image light by an arbitrary distance in the direction in which the pixels are arranged in the array. The shifted image light is enlarged by the projection lens 85 and projected onto the screen 86.

By displaying on the transmission type liquid crystal panel 84 an image pattern in which the display position is shifted depending on the deflection of the optical path for each of a plurality of sub fields into which the image field is divided in time-division by the optical path deflecting element 89, it is possible to display the image by increasing the apparent number of pixels of the transmission type liquid crystal panel 84. The amount of shift provided by the optical path deflecting element 89 increases the apparent number of pixels to two times with respect to the direction in which the pixels are arranged in the transmission type liquid crystal panel 84. Hence, by correcting the image signal that drives the transmission type liquid crystal panel 84 by an amount corresponding to the amount of shift, it is possible to display an image with a high apparent definition. Since the optical axis deflecting element or unit described above is used for the optical path deflecting element 89, it is possible to improve the light utilization efficiency, and provide a high-quality image that is bright to the viewer, without having to increase the load on the light source 81.

Figure 24:
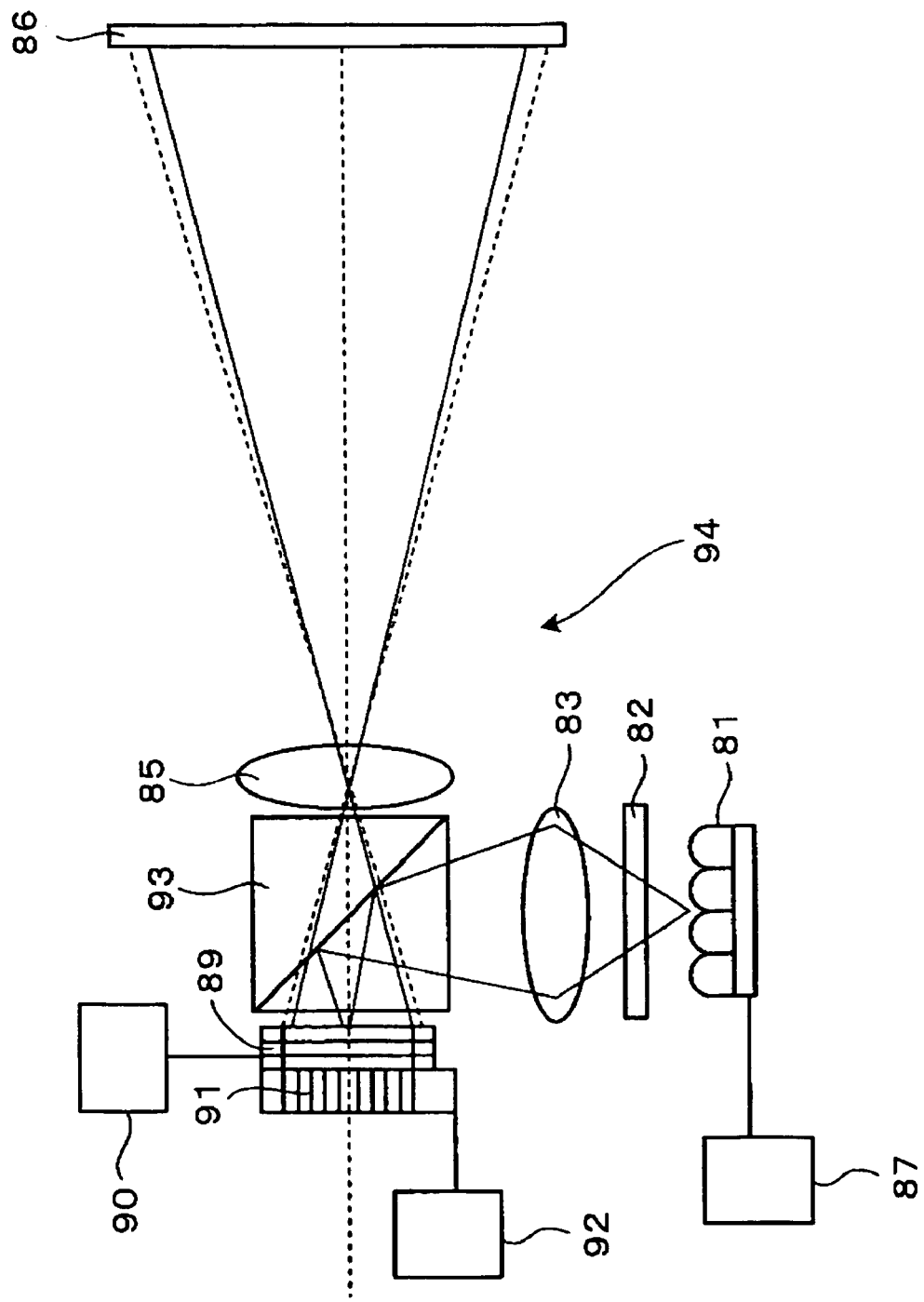
FIG. 24 is a diagram showing the image display apparatus in a ninth embodiment of the present invention.

The present invention is not limited to the image display apparatus using the transmission type liquid crystal panel 84 for the image display element. FIG. 24 is a diagram showing the image display apparatus in a ninth embodiment of the present invention. An image display apparatus 94 shown in FIG. 24 uses a reflection type liquid crystal panel 91 for the image display element. A panel driving part 92 drives the reflection type liquid crystal panel 91. Compared to the image display apparatus 80 shown in FIG. 23, the image display apparatus 90 shown in FIG. 24 additionally includes a polarization beam splitter (PBS) 93. The light from the illuminating system including the light source is directed towards the reflection type liquid crystal panel 91 by the PBS 93, and illuminates the reflection type liquid crystal panel 91 via the optical path deflecting element 89. The illuminating light incident to the reflection type liquid crystal panel 91 is reflected by the reflection type liquid crystal panel 91 and formed into the image light by being spatially modulated depending on the image. Thereafter, the image light is shifted in a predetermined direction in which the pixels are arranged by the optical path deflecting element 89. The image light thereafter progresses in a path similar to that of the image display apparatus 80 shown in FIG. 23.

Next, a description will be given of particular embodiment samples of the present invention and comparison examples.

First Embodiment Sample

First, the optical axis deflecting element 10-1 having the structure shown in FIG. 3 was formed in the following manner. Two kinds of glass substrates both having a thickness of 1.1 mm and respectively having sizes of 10 mm×8 mm and 5 mm×7 mm were prepared as the transparent substrates 11 and 12. On a central portion each glass substrate surface, a chrome electrode line (corresponding to the dividing electrode 17) was formed with a width of 0.5 μm taken along the short side of the substrate and a length of 8 mm or 7 mm taken along the long side of the substrate. One end of the chrome electrode line was enlarged to several mm in width for wiring connection on the larger glass substrate. A perpendicular (or homeotropic) orientation layer (corresponding to the perpendicular orientation layer 13 or 14) made of a polyimide compound was formed to a thickness of 0.06 μm on the substrate surface formed with the chrome line electrode line for the two glass substrates. Each polyimide orientation layer was formed by spin-coating a polyamic acid solution and carrying out a thermal process at approximately 180° C. A pair of electrodes (corresponding to the electrodes 16a and 16b) made of aluminum sheets and also functioning as spacer members was formed an respective sides of the effective region (or effective area), outside the effective region. Each electrode was formed with a thickness of 80 μm, a width of approximately 1 mm, and a length of 8 mm. The two confronting glass substrates were then combined in a state sandwiching the pair of electrodes, so as to form a cell. In this state, the chrome electrode lines on the upper and lower glass substrates within the effective region mutually overlap when viewed from the top. The chrome electrode lines on the upper and lower glass substrates were electrically connected by sandwiching therebetween a small amount of conductor paste. In a state where the cell is heated to approximately 90° C., a ferroelectric liquid crystal (for example, CS1024 manufactured by Chisso), corresponding to the liquid crystal layer 15, was injected into the space between the upper and lower glass substrates by the capillary method. After cooling, the upper and lower glass substrates were encapsulated by an adhesive agent, to thereby produce the optical axis deflecting element 10-1 in which the liquid crystal layer 15 has a thickness of 80 μm and the effective region has a rectangular size of 8 mm×7 mm.

The aluminum sheets forming the electrodes 16a and 16b which are provided on respective sides of the optical axis deflecting element 10-1 and also function as the spacer members, and the enlarged portion of the chrome electrode line forming the dividing electrode 17 on the larger glass substrate are respectively exposed. These exposed portions are connected to the power supply 18 via the switching part 19 as shown in FIG. 5, so that the electric field may be applied to each divided region of the effective region. The effective region was divided into two divided regions 15a and 15b respectively having the width of 4 mm.

When the driving part or means supplied the voltage to the liquid crystal layer 15 of the optical axis deflecting element 10-1 to apply the electric field E of E=150 V/mm on the divided region 15a or 15b, the response time from the time when the voltage is supplied until the electric field E was generated was 0.5 milliseconds and sufficiently fast. On the other hand, the reorientation time from the time when the supplied voltage is stopped until the optical axes of the liquid crystal layer 15 return to the original state before the voltage was supplied was approximately several hundred milliseconds and extremely slow.

The tilt angle of the optical axes of the liquid crystal layer 15 of the optical axis deflecting element 10-1 was measured by conoscope observation. This measurement used white laser as the light source, and irradiated the divergent light from the light source on the effective region of the optical axis deflecting element 10-1 via a beam expander, a polarizer and a microscope objective lens having NA=0.75 in this order. The light transmitted through the liquid crystal layer 15 of the optical axis deflecting element 10 was passed through an analyzer and projected on a transmission type screen surface, so as to obtain a conoscope image. This conoscope image was picked up by a CCD camera or a high-speed camera, and the tilt angle of the optical axis was measured by analyzing the position of the cross-shaped shadow in the conoscope image. As shown in FIG. 5, a D.C. voltage of 600 V was alternately supplied to the divided regions 15a and 15b for 5 milliseconds each for 1 second in 100 periods. When the state of the tilt angle of the optical axis of the liquid crystal layer 15 during this 1 second was analyzed, it was confirmed that the tilt angle is maintained approximately uniformly to 25 degrees within both the divided regions 15a and 15b of the effective region.

FIRST COMPARISON EXAMPLE

A cell was formed similarly to the first embodiment sample described above, except that the chrome electrode line (dividing electrode) was not provided at the central portion of the effective region. The optical axis deflecting element 1 having the structure shown in FIG. 6 was formed with the effective region having the rectangular size of 8 mm×7 mm. In order to generate the electric field E=150 V/mm similarly to the first embodiment sample, a D.C. voltage of 1200 V was supplied for 1 second to the electrodes 6a and 6b on both sides of the effective region. As a result, the optical axes of the liquid crystal layer 5 had a tilt angle of 35 degrees in the vicinity of the electrodes 6a and 6b, but the tilt angle was approximately 20 degrees at the central portion of the effective region. It was thus confirmed that, even if the voltage is simply supplied across the two ends of the effective region which is relatively wide, a sufficiently large electric field will not be applied to the liquid crystal layer 5 at the central portion of the effective region. In addition, it was necessary to supply the high voltage, that is two times higher than that required in the case of the first embodiment sample, to generate the same electric field E of E=150 V/mm.

Second Embodiment Sample

The optical axis deflecting element 10-4 shown in FIGS. 12, 13A and 13B was formed using glass substrates 11 and 12 having a thickness of 1.1 mm and a rectangular size of 50 mm×50 mm. On each substrate surface, 420 ITO transparent line electrodes 21, having a width of 10 μm and a length of 45 were formed in parallel with a pitch of 100 μm. The transparent line electrodes 21 on both ends of the effective region were made larger, to a width of 4 mm and a length of 50 mm. In addition, one transparent line electrode 21 at the central portion of the effective region was made larger, to a length of 50 mm. One end of each of the transparent line electrodes 21 on both ends of the effective region and the transparent line electrode 21 at the central portion of the effective region were made wider to a width of several mm for wiring connection. The effective region had a square size of approximately 42 mm×40 mm, and the dielectric layer 22 was formed on the transparent electrode lines 21 over the effective region. A glass layer having a thickness of 150 µm was bonded on each of the glass substrates, as the corresponding dielectric layer 22, by use of an ultraviolet curing adhesive agent which was formed to a thickness of approximately 10 µm. The resistors 24 were formed by sputtering a CrSiO layer having a surface resistance of approximately $1\times10^8$ Ω/□ on the exposed portions of the transparent line electrodes 21 having the width of 5 mm.

As shown in the cross sectional view of FIG. 12, the transparent line electrodes 21 were embedded within the transparent glass electrodes 11 and 12, and as shown in FIG. 13A, each of the transparent line electrodes 21 was connected in series by the resistor 24 formed by the CrSiO layer. A perpendicular (or homeotropic) orientation layer (corresponding to the perpendicular orientation layer 13 or 14) made of a polyimide compound was formed to a thickness of 0.06 µm on the substrate surface formed with the dielectric layer 22 and the resistors 24 for the two glass substrates 11 and 12. Each polyimide orientation layer was formed by spin-coating a polyamic acid solution and carrying out a thermal process at approximately 180° C. A pair spacers (or spacer sheets) 23 was formed an respective sides of the effective region (or effective area), outside the effective region. Each spacer 23 was formed to a thickness of 80 µm. The two confronting glass substrates 11 and 12 were then combined in a state sandwiching the pair of spacers 23, so as to form a cell. In this state, the transparent line electrodes 21 on the upper and lower glass substrates 12 and 11 within the effective region mutually overlap when viewed from the top. In a state where the cell is heated to approximately 90° C., a ferroelectric liquid crystal (for example, CS1024 manufactured by Chisso), corresponding to the liquid crystal layer 15, was injected into the space between the upper and lower glass substrates 12 and 11 by the capillary method. After cooling, the upper and lower glass substrates 12 and 11 were encapsulated by an adhesive agent, to thereby produce the optical axis deflecting element 10-4 in which the liquid crystal layer 15 has a thickness of 80 µm and the effective region has a rectangular size of 42 mm×40 mm.

The transparent line electrodes 21 on both sides of the effective region and the transparent electrode 21 at the central portion of the effective region of the optical axis deflecting element 10-4 were connected to the power supply 18 via the switching part 19 shown in FIG. 13A which can apply the electric field to each of the divided regions of the effective region.

A pulse generator and a high-voltage amplifier were used for the power supply 18, and a photo-coupler was used for the switching part 19 forming a high voltage switch, so as to drive the optical axis deflecting element 10-4 by supplying the voltage with the timing described above in conjunction with FIGS. 8A through 8D. The rectangular wave A.C. power supply 18 supplied a voltage of ±3.15 kV having a frequency of 60 Hz. Since the width of each divided region is 21 mm, the electric field E applied to each divided region was E=150 V/mm. One period of the driving voltage having the frequency of 60 Hz is approximately 16.67 milliseconds, and thus, the duration in which the optical axis driving element 10-4 was driven by the voltage of one polarity was approximately T=8.33 milliseconds. For the driving timing shown in FIGS. 8A through 8D, one electric field applying time with respect to each divided region was set to 1.85 milliseconds. In the continuous driving state excluding the initial state of the operation, the positive voltage was supplied two times with respect to each divided region for a total of 1.85×4=7.4 milliseconds, and the negative voltage was thereafter briefly supplied one time with respect to each divided region for a total of 0.46×2=0.93 millisecond, as the voltage reversing operation, and such supplying of the positive and negative voltages were regarded as ½ the period of the driving voltage, that is, T=8.33 milliseconds. By supplying the voltage for such short times, the "mismatch state" in which the tilt angle of the optical axes becomes different between the divided regions of the effective region due to the voltage reversal can be shortened to approximately 0.46 millisecond, which is approximately the same as the electric field response time of the liquid crystal layer 15, thereby making the "mismatch state" no problem from the practical point of view.

When the conoscope image of the optical axis deflecting element 10-4 was observed in a state where the optical axis reversing operation was repeated at 60 Hz, the optical axis reversal operation was confirmed for the optical axes having the tilt angle of approximately ±25 degrees, approximately uniformly, for the entire effective region having the width of 42 mm. However, when observed in detail, the tilt angle was slightly smaller in the vicinity of the central boundary between the dividing regions. In addition, when a He—Ne laser beam was irradiated on the optical axis deflecting element 10-4, a slight diffraction pattern was observed in the outgoing light. It may be regarded that this slight diffraction pattern is caused by the periodic phase modulation due to the difference between the indexes of refraction of the ITO transparent electrode and the adhesive agent.

Third Embodiment Sample

The optical axis deflecting element 10-5 shown in FIGS. 14, 15A and 15B was formed using glass substrates 11 and 12 having a thickness of 1.1 mm and a rectangular size of 50 mm×50 mm. On each substrate surface, a wide transparent line electrode 21 having a width of 4 mm and a length of 50 mm was formed on both sides of the effective region, and a single transparent line. electrode 21 having a width of 10 µm and a length of 50 mm was formed at the central portion of the effective region. In addition, a single transparent line electrode 21 at the central portion of the effective region was made larger, to a length of 50 mm. One end of the transparent line electrode 21 at the central portion of the effective region was made wider to a width of several mm for wiring connection. The transparent resistor layer 25 was formed on each substrate surface in the range shown in FIGS. 15A and 15B. A tin oxide layer having a thickness of 0.1 µm was formed as the transparent resistor layer 25 by high-frequency magnetron sputtering, using sintered tin oxide body as the target. Argon gas and oxygen were supplied during the sputtering, and the ratio of the flow rates of the argon gas and the oxygen was approximately 1:4. No substrate heating or cooling process was carried out during the sputtering. The volume resistivity of the tin oxide layer formed under these conditions was approximately $5\times10^3$ Ωcm and high, and the surface resistance for the case where the thickness of the tin oxide layer is 0.1 µm was approximately $5\times10^8$ Ω/□. The visible light transmittance for this tin oxide layer was 90% or greater. Each of the transparent line electrode 21 was connected in series by the transparent resistor layer 25. A perpendicular (or homeotropic) orientation layer (corresponding to the perpendicular orientation layer 13 or 14) made of a polyimide compound was formed to a thickness of 0.06 µm on the substrate surface for the two glass substrates 11 and 12. Each polyimide orientation layer was formed by spin-coating a polyamic acid solution and carrying out a thermal process at approximately 180° C. A pair spacers (or spacer sheets) 23 was formed an respective sides of the effective region (or effective area), outside the effective region. Each spacer 23 was formed to a thickness of 80 µm. The two confronting glass substrates 11 and 12 were then combined in a state sandwiching the pair of spacers 23, so as to form a cell. In this state, the transparent line electrodes 21 on the upper and lower glass substrates 12 and 11 within the effective region mutually overlap when viewed from the top. In a state where the cell is heated to approximately 90° C., a ferroelectric liquid crystal (for example, CS1024 manufactured by Chisso), corresponding to the liquid crystal layer 15, was injected into the space between the upper and lower glass substrates 12 and 11 by the capillary method. After cooling, the upper and lower glass substrates 12 and 11 were encapsulated by an adhesive agent, to thereby produce the optical axis deflecting element 10-5 in which the liquid crystal layer 15 has a thickness of 80 µm and the effective region has a rectangular size of 42 mm×40 mm.

The transparent line electrodes 21 on both sides of the effective region and the transparent electrode 21 at the central portion of the effective region of the optical axis deflecting element 10-5 were connected to the power supply 18 via the switching part 19 shown in FIG. 15A which can apply the electric field to each of the divided regions of the effective region.

A pulse generator and a high-voltage amplifier were used for the power supply 18, and a photo-coupler was used for the switching part 19 forming a high voltage switch, so as to drive the optical axis deflecting element 10-5 by supplying the voltage with the same timing as the second embodiment sample described above. When the conoscope image of the optical axis deflecting element 10-5 was observed by supplying the same voltage pattern as the second embodiment sample, the optical axis reversal operation was confirmed for the optical axes having the tilt angle of approximately ±25 degrees, approximately uniformly, for the entire effective region having the width of 42 mm. However, when observed in detail, the tilt angle was very slightly smaller in the vicinity of the central boundary between the dividing regions. In addition, when a He—Ne laser beam was irradiated on the optical axis deflecting element 10-5, no diffraction pattern, such as that observed in the second embodiment sample, was observed in the outgoing light.

Fourth Embodiment Sample

The optical axis deflecting element 40 similar to that of the third embodiment sample was used, but the switching part 19 forming the high voltage switch was modified as shown in FIG. 21 so that the electrode pair defining the divided region not applied with the electric field has the same potential. As a result, the very slightly smaller tilt angle observed in the vicinity of the central boundary between the dividing regions in the case of the third embodiment sample was not observed in this fourth embodiment sample. It may be regarded that the divided region that is adjacent to the divided region in which the electric field is applied is positively maintained to the state where no electric field is applied thereto, and that the tilt angle of the optical axis at the time when no electric field is applied to the adjacent divided region is maintained large therein.

Fifth Embodiment Sample

In the second embodiment sample, the single transparent line electrode 21 at the central portion of the effective region has the length of 50 mm, the width of one end of this transparent line electrode 21 is widened to several mm for wiring connection, and the upper and lower substrates 12 and 11 are combined so that the transparent line electrodes 21 at the central portion of the effective region overlap. But in this fifth embodiment sample, the electrode positions for wiring connection are set so that the positions of the transparent line electrodes 21 at the central portion of the effective region are shifted when the upper and lower substrates 12 and 11. Otherwise, the structure of this fifth embodiment sample is basically the same as the second embodiment sample, and the optical axis deflecting element similar to that shown in FIG. 18 was formed. According to this optical axis deflecting element, the shift $\Delta X$ in the positions of the dividing electrodes between the upper and lower electrodes 21 and 11 in the X-axis direction was 100 µm, and the distance $\Delta Z$ between the corresponding upper and dividing electrodes via the dielectric layer 22, the liquid crystal layer 15 and the dielectric layer 22 in the Z-axis direction was approximately 400 µm. Hence, the condition $(\Delta Z/2) > \Delta X$ for preventing the generation of the electric field in the oblique direction within the liquid crystal layer 15 was satisfied.

When the power supply 18 and the switching part 19 forming the high voltage switch were used and the optical axis reversing operation was observed from the conoscope image, similarly to the second embodiment sample, the optical axis reversal operation was confirmed for the optical axes having the tilt angle of approximately ±25 degrees, approximately uniformly, for the entire effective region having the width of 42 mm. The slightly smaller tilt angle observed in the vicinity of the central boundary between the dividing regions in the case of the second embodiment sample was not observed in this fifth embodiment sample. However, when a microscope observation was made by arranging the optical axis deflecting element within a crossed nicols of a polarizing plate, a slight light leak was observed which may be caused by light-scattering in the vicinity of the central portion of the effective region. It may be regarded that the slight light-scattering is generated because the liquid crystal layer 15 is distorted by the effects of the oblique electric field generated in the vicinity of the dividing electrode, but no problem is introduced by such a slight light leak.

Sixth Embodiment Sample

In the second embodiment sample, the single transparent line electrode 21 at the central portion of the effective region has the length of 50 mm, the width of one end of this transparent line electrode 21 is widened to several mm for wiring connection, and the upper and lower substrates 12 and 11 are combined so that the transparent line electrodes 21 at the central portion of the effective region overlap. But in this sixth embodiment sample, the length of the two transparent line electrodes 20a and 20b at the central portion of each of the upper and lower substrates 12 and 12 in FIG. 20 was set to 50 mm, and one end of each of the two transparent line electrodes 20a and 20b was widened for wiring connection. Otherwise, the structure of this sixth embodiment sample is basically the same as the second embodiment sample, and the optical axis deflecting element similar to that shown in FIG. 20 was formed.

The power supply 18 and the switching part 19 forming the high voltage switch were used similarly to the second embodiment sample, and an additional switch (not shown) was provided so as to enable the position of the dividing electrode to be switched with respect to the dividing region. By the provision of this additional switch, it was possible to apply the voltage to each of the widened dividing region as shown in FIG. 20(a) and FIG. 20(b). Compared to the dividing region of the second embodiment sample having the width of 21 mm, the width of the dividing region was widened to 21.1 mm in this sixth embodiment sample. However, from the practical point of view, there was no decrease in the electric field intensity caused by the widened dividing region.

When the optical axis reversing operation was observed from the conoscope image, similarly to the second embodiment sample, the optical axis reversal operation was confirmed for the optical axes having the tilt angle of approximately ±25 degrees, approximately uniformly, for the entire effective region having the width of 42 mm. The slightly smaller tilt angle observed in the vicinity of the central boundary between the dividing regions in the case of the second embodiment sample was not observed in this sixth embodiment sample. Furthermore, when a microscope observation was made by arranging the optical axis deflecting element within the crossnicol of the polarizing plate, unlike the fifth embodiment sample, no light leak was observed in the vicinity of the central portion of the effective region. It may be regarded that no light leak occurs because no oblique electric field is generated in the vicinity of the dividing electrode.

Seventh Embodiment Sample

An image display apparatus having a structure similar to that shown in FIG. 23 was made. Three polysilicon thin film transistor (TFT) liquid crystal panels having a diagonal size of 0.9 inch and 1024 dots×768 dots were used as the image display element 84. In FIG. 23, only one liquid crystal panel is used, but the lights from the three liquid crystal panels were combined using a combining prism and then projected via a single projection lens 85. The pixel pitch of each liquid crystal panel was approximately 18 μm in both the vertical and horizontal directions, and the numerical aperture of the pixels was approximately 50%. In addition, a microlens array was arranged on the side of the image display element 84 closer to the light source 81 so as to improve the light-gathering power with respect to the illuminating light. In this seventh embodiment sample, the frame frequency of the image display was 60 Hz, and the sub field frequency was 120 Hz which is two times the frame frequency in order to obtain the effect of doubling the apparent number of pixels by the pixel shift. Each of the three liquid crystal panels was illuminated by a corresponding one of light sources having three colors such as red (R), green (G) and blue (B) or, illuminated by a corresponding light component that is obtained via a prism or filter which carries out a color separation with respect to white light from a while light source. The images of each of the three colors, from the three liquid crystal panels, are combined by a combining prism (not shown) to display a full color image. In addition, by matching the deflecting direction of the light output from the liquid crystal panel 84 to the tilt direction of the optical axis of the optical path deflecting element 89, it was possible to generate the optical path shifting function and to shift the optical path in the deflecting direction. The amount of shift of the optical path was approximately 9 μm when the optical axis deflecting element of the fourth embodiment sample was used as the optical path deflecting element 89, which is ½ the pixel pitch of the liquid crystal panels. In addition, n order to positively deflect the incident light to the optical path deflecting element 89, a linearly polarizing plate (not shown) was provided on the light incident side of the optical path deflecting element 89.

The voltage that is supplied and the voltage supplying timing of the optical path deflecting unit were respectively set to ±3.15 kV and a frequency of 60 Hz, similarly to the fourth embodiment sample. By switching the sub field image that is displayed on the image display element 84 to T=8.33 milliseconds in synchronism with the switching timing of the optical path shifting position, it was possible to display a high-definition image in which the apparent number of pixels was doubled. In this state, the parallel electric field intensity applied to the entire liquid crystal layer 15 was 150 V/mm, and the optical path switching time was approximately 0.5 millisecond. Hence, a sufficient pixel shift effect and light utilization efficiency were obtained.

The optical axis deflecting element, the optical path deflecting element, the optical axis deflecting unit, and the optical path deflecting unit of the present invention described above are suited for use in image display apparatuses such as a projection displays and head-mount displays, and are also applicable to image forming apparatuses and optical write apparatuses such as digital copying machines, laser printers, laser plotters and laser facsimile machines. In addition, the optical axis deflecting element, the optical path deflecting element, the optical axis deflecting unit, and the optical path deflecting unit of the present invention described above may also be applied to other apparatuses such as image input apparatuses and laser measurement apparatuses.

Next, a description will be given of other embodiments of the present invention.

Image display apparatuses employing the line-sequential scanning system are proposed in Japanese Laid-Open Patent Applications No. 1-101520 and No. 4-340932.

Figure 25:
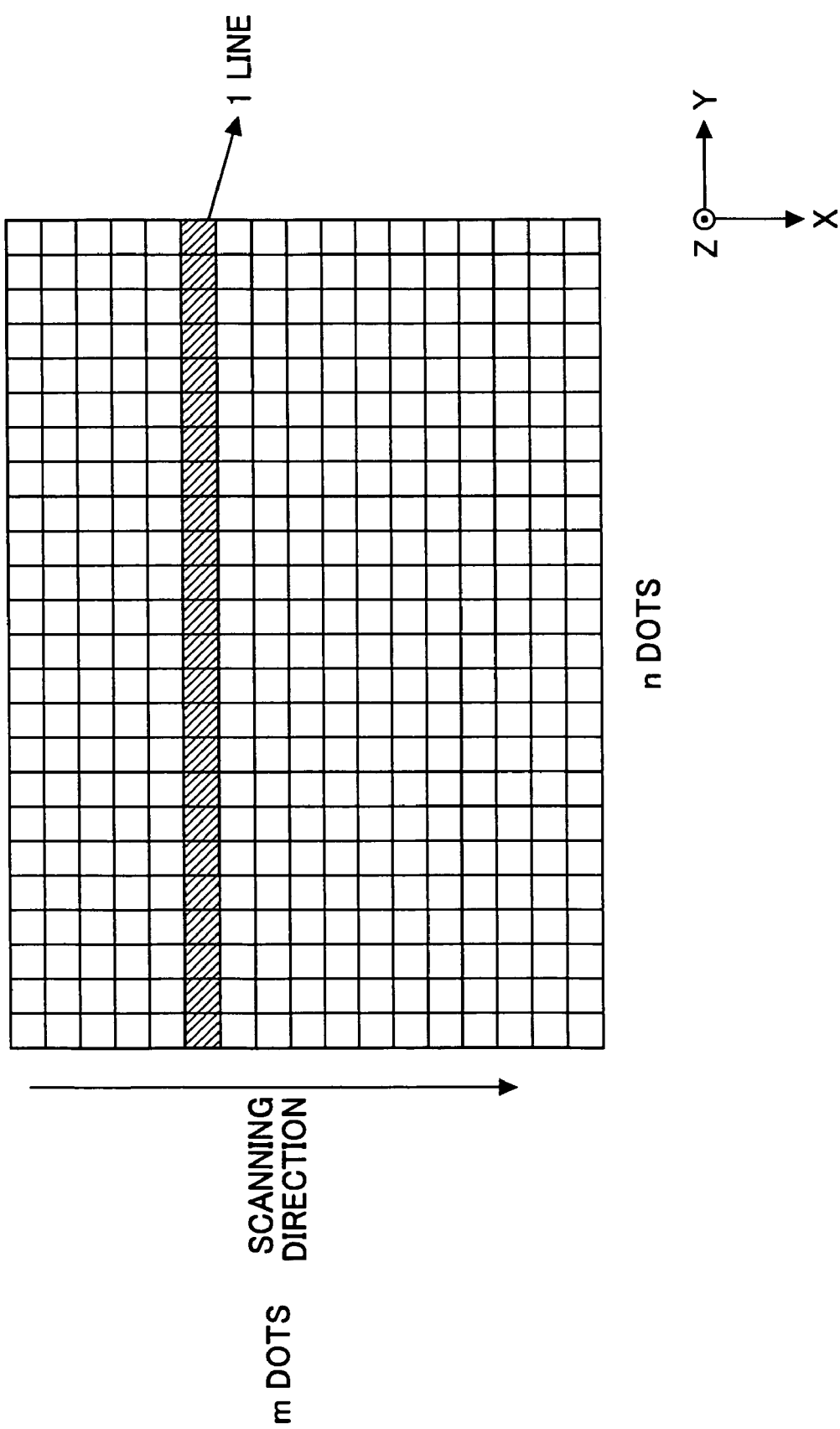
FIG. 25 is a diagram showing a two-dimensional display region of the image display apparatus.

A description will be given of an image display apparatus employing the line-sequential scanning system, by referring to FIGS. 25 through 27. It is assumed for the sake of convenience that a two-dimensional image display region of the image display apparatus is formed by a pixel array made up of m dots×n dots as shown in FIG. 25, where m dots are arranged in the vertical direction and n dots are arranged in the horizontal direction. In FIG. 25, each square region corresponds to one dot, with the vertical direction indicated by a Y-axis direction and the horizontal direction indicated by an X-axis direction. According to the line-sequential scanning system, the image information. is updated in units of n dots in the horizontal direction (that is, one line) in the vertical direction, that is, in the scanning direction. Hence, the image information is continuously updated along the scanning direction.

Figure 26:
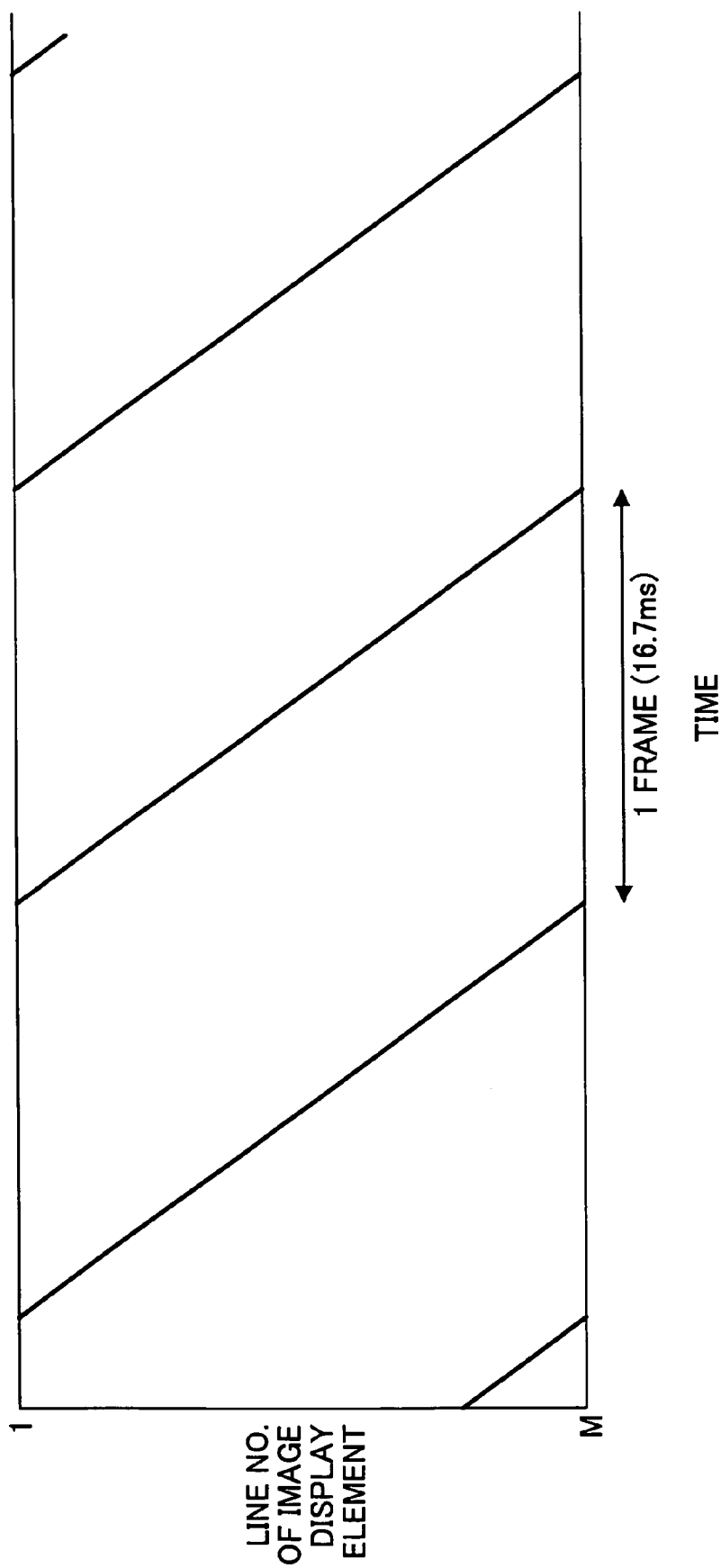
FIG. 26 is a timing chart schematically showing an image information updating timing.
Figure 27:
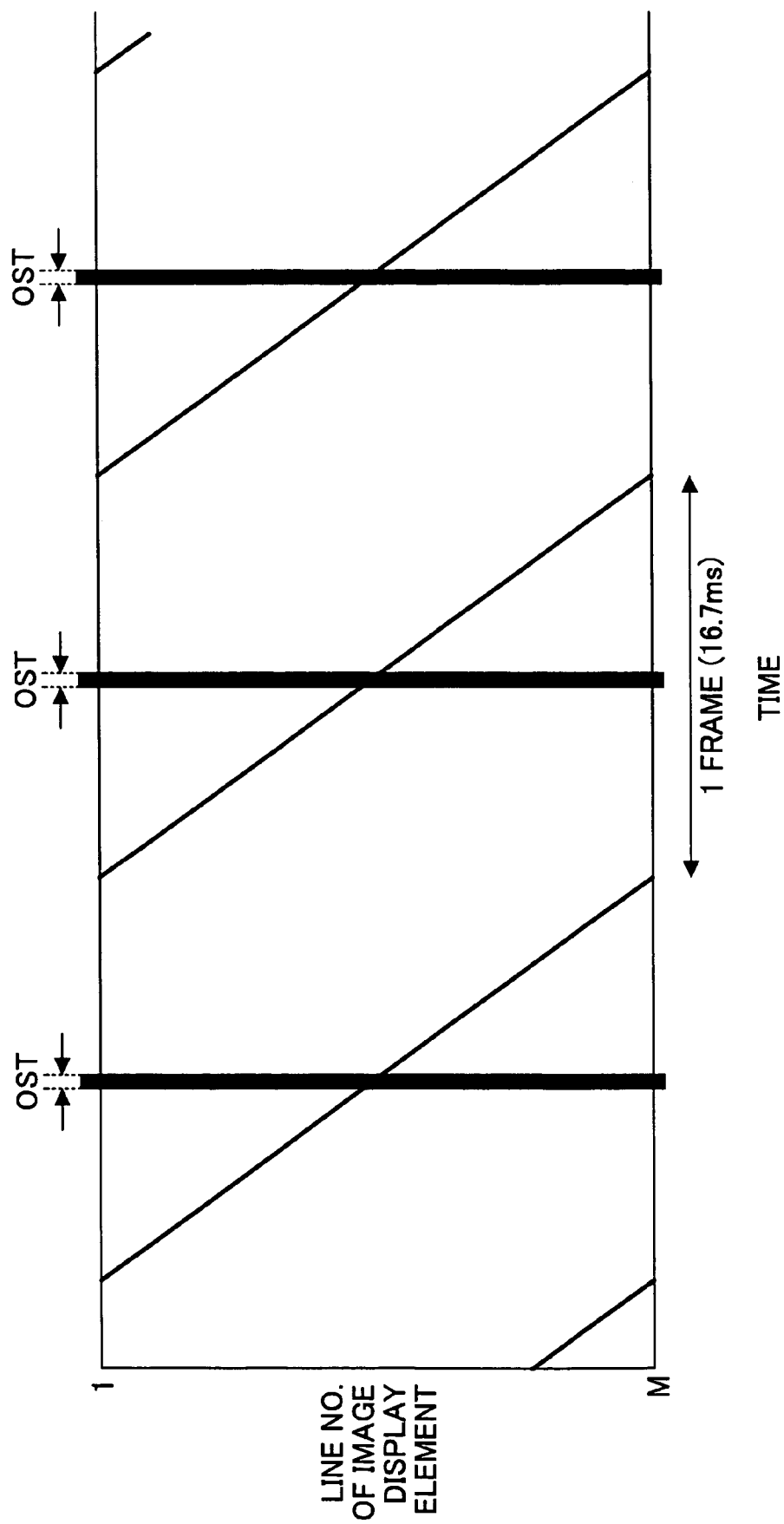
FIG. 27 is a timing chart schematically showing the image information updating timing including an orientation switching time of liquid crystal molecules of the optical axis deflecting element.

FIG. 26 is a timing chart schematically showing the image information updating timing. In FIG. 26, the abscissa indicate the time in arbitrary units, and the ordinate indicates the line number (position) of the image display element. An oblique solid line represents the start and the end of the updating of the image information for a certain line. The time required to update the first through Mth lines, that is, the time required to update one image, is referred to as one frame. When one frame is set to 16.7 milliseconds (or 60 Hz), for example, the flicker will not appear conspicuous to the human eye.

In addition, there is a system that divides one line into a plurality of line portions and carries out the scan in units of the line portions. Furthermore, there is a system that carries out the scan in units of a plurality of lines (or blocks). Both of these systems may be treated approximately similarly to the line-sequential scanning system described above which carries out the scan in units of one line, and thus, the line-sequential scanning system which carries out the scan in units of one line will be described as a typical example in the following description.

On the other hand, an optical axis deflecting element which changes the tilt direction of the optical axes of the liquid crystal material in response to an electrical signal, has been proposed. Various optical path deflecting elements and optical path deflecting units have been proposed, which shift the outgoing light in parallel with respect to the incoming light or rotate the outgoing light by a predetermined angle with respect to the incoming light by deflecting the optical path of light by use of this optical axis deflecting element. Moreover, various image display apparatuses have been proposed that use such optical path deflecting units.

In the embodiments of the present invention described above, the effective region of the liquid crystal layer forming the optical axis deflecting element is divided into a plurality of divided regions, and the electric field is time-divisionally applied to each of the divided regions, so that a satisfactory optical axis deflecting effect is obtainable even when the voltage supplied to the electrodes of the optical axis deflecting element is reduced compared to the conventional optical axis deflecting element. For example, if the effective region is divided into two divided regions, the electric field is applied in one direction with respect to the first divided region during a first time interval, the electric field applied with respect to the first divided region is stopped and the electric field is applied in the same one direction with respect to the second divided region during a second time interval, the electric field applied with respect to the second divided region is stopped and the electric field is applied in a reverse direction with respect to the first divided region during a third time interval, and the electric field applied with respect to the first divided region is stopped and the electric field is applied in the same reverse direction with respect to the second divided region during a fourth time interval. Such an electric field applying operation is repeated. During the second time interval, the electric field applied to the first divided region is stopped, but the electric field is again applied to the first divided region during the third time interval before the optical axes of the liquid crystal material return to the initial state. Similarly, during the third time interval, the electric field applied to the second divided region is stopped, but the electric field is again applied to the second divided region during the fourth time interval before the optical axes of the liquid crystal material return to the initial state. The direction in which the electric field is applied to the first and second dividing region is the same except for a mismatch time interval, and the direction of the electric field reverses once within one period of the power supply voltage applied to the optical axis deflecting element. In the embodiments described above, this mismatch time interval is set as short as possible. For this reason, it is possible to obtain the optical axis deflecting effect which is similar to that obtainable when the electric field is applied to the entire effective region without dividing the effective region into the divided regions, and the optical axes of the liquid crystal material within the effective region can be tilted approximately by a constant tilt angle.

However, when the optical axis deflecting element of the above described embodiments is applied to the image display apparatus employing the line-sequential scanning system, the following problems occur. In other words, according to the line-sequential scanning system, the image information is updated in units of lines, but as shown in FIG. 27, an orientation switching time (that is, a switching time of the tilt angle of the optical axis) OST of the liquid crystal molecules of the optical axis deflecting element is approximately several us to approximately several tens of μs. In FIG. 27, the abscissa and the ordinate are the same as those of FIG. 26. For this reason, when the optical axis deflecting element of the above described embodiments having a relatively large area is applied to the image display apparatus employing the line-sequential scanning system, and an attempt is made to obtain a high-definition image by the effects of increasing the apparent number of pixels even when using the image display element (or transmission type liquid crystal panel) having a relatively small number of pixels, the effect of deflecting the optical axis is only visible at some of the lines, such as the (1/M)-th line, of one frame in the image display apparatus, and the effect of increasing the apparent number of pixels can hardly be obtained. According to the optical axis deflecting element of the embodiments described above, the effect of increasing the apparent number of pixels is notable when applied to the image display apparatus employing the system that simultaneously switches one image in its entirety.

Next, a description will be given of embodiments of the present invention that can obtain the high-definition image by the effect of increasing the apparent number of pixels, even when the optical axis deflecting element having the low power consumption structure of the embodiments described above is applied to the image display apparatus employing the line-sequential scanning system.

In the optical axis deflecting element of the following embodiments of the present invention, the effective region of the liquid crystal layer through which the light is transmitted is divided into first through Nth divided regions, where N is an integer greater than or equal to two. The optical path of the outgoing light with respect to the incoming light to the optical axis deflecting element is switched by time-divisionally applying the electric field to the first through Nth divided regions in a direction approximately parallel to the direction in which the first through Nth divided regions are arranged. During one frame that is required to update one image by the line-sequential scanning system, the liquid crystal layer is driven, so that the tilt angle of the optical axes of the liquid crystal material forming the liquid crystal layer is maintained approximately constant independently within each divided region, by a first time interval in which the electric field is time-divisionally applied in a first direction with respect to the first through Nth divided regions, one or a plurality of second time intervals in which the direction of the electric field time-divisionally applied with respect to the first through (N−1)-th divided regions is sequentially switched to a second direction that is opposite to the first direction, a third time interval in which the electric field is time-divisionally applied with respect to the first through Nth divided regions in the second direction, and one or a plurality of fourth time intervals in which the direction of the electric field time-divisionally applied with respect to the first through (N−1)-th divided regions is sequentially switched to the first direction. A total number of the first through fourth time intervals is desirably 2N.

According to the following embodiments of the present invention, it is possible to obtain a high-definition image by the effect of increasing the apparent number of pixels, even when the optical axis deflecting element having the structure of the embodiments described above is applied to the image display apparatus employing the line-sequential scanning system.

A description will be given of a tenth embodiment of the present invention. The optical axis deflecting element of this tenth embodiment may have the same structure as the first embodiment described above in conjunction with FIGS. 3 and 5. However, the electric field is applied to the divided regions 15a and 15b of the effective region of the liquid crystal layer 15 in a manner different from that of the first embodiment.

Figure 28:
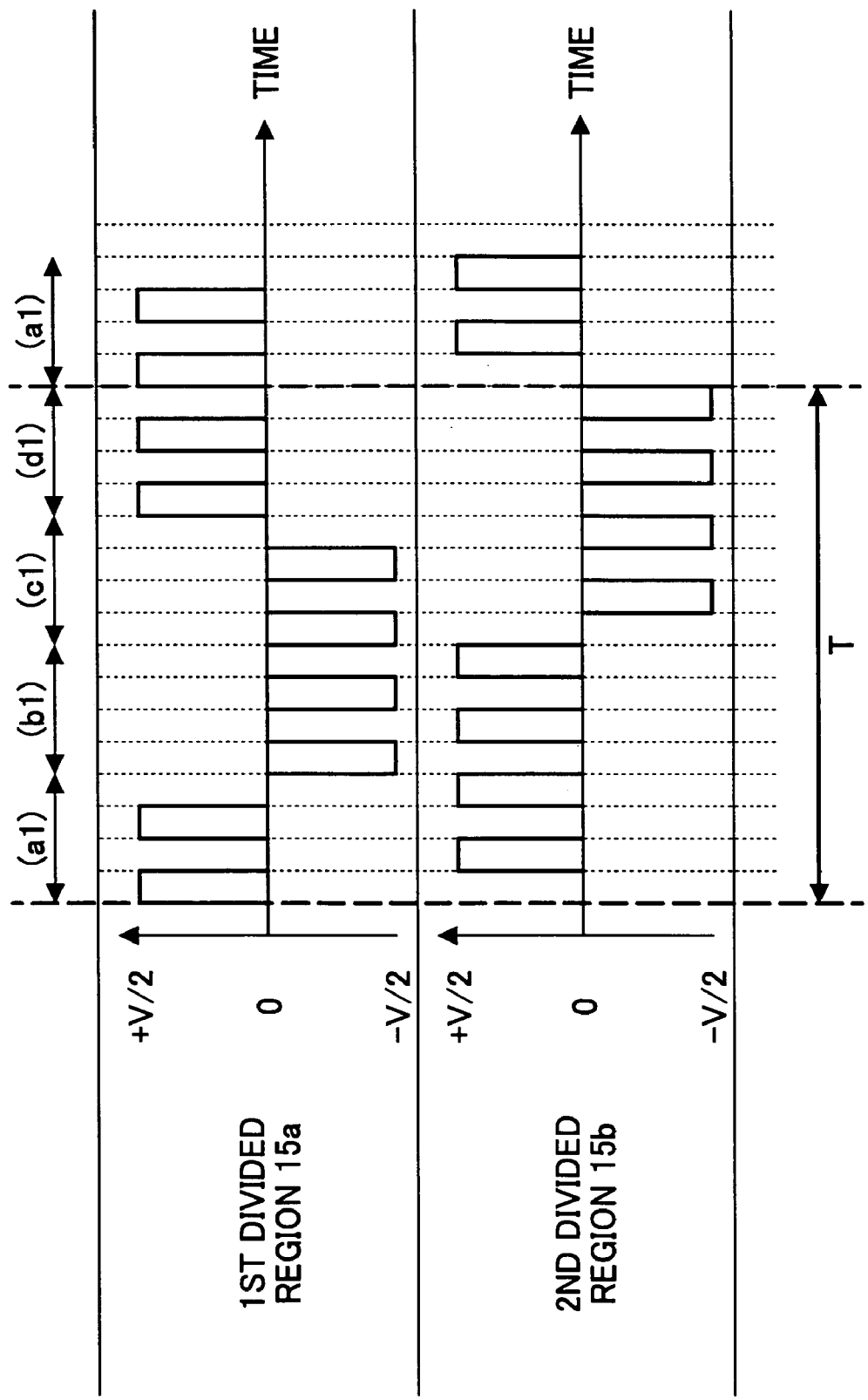
FIG. 28 is a diagram for explaining the voltage supplied to the electrode pair defining each divided region in a tenth embodiment of the present invention.

FIG. 28 is a diagram for explaining the voltage supplied to the electrode pair defining each divided region in this tenth embodiment of the present invention. In FIG. 28, the upper portion shows the voltage supplied to the first electrode pair defining the first divided region 15a, and the lower portion shows the voltage supplied to the second electrode pair defining the second divided region 15b. In addition, FIG. 29 is a diagram for explaining the electric field applied to each divided region in this tenth embodiment. The direction of the electric field applied to the first and second divided regions 15a and 15b during a time interval (a1) shown in FIG. 28 is in the leftward direction as indicated by arrows in FIG. 29(a).

During a time interval (b1) shown in FIG. 28, only the polarity of the voltage supplied to the first electrode pair defining the first divided region 15a is reversed, and the direction of the electric field applied to the first divided region 15a is switched to the rightward direction as indicated by the arrow in FIG. 29(b). The direction of the electric field applied to the second divided region 15b does not change and is applied in the leftward direction as indicated by the arrow in FIG. 29(b).

During a time interval (c1) shown in FIG. 28, only the polarity of the voltage supplied to the second electrode pair defining the second divided region 15b is reversed, and the direction of the electric field applied to the second divided region 15b is switched to the rightward direction as indicated by the arrow in FIG. 29(c). The direction of the electric field applied to the first divided region 15a does not change and is applied in the rightward direction as indicated by the arrow in FIG. 29(c).

During a time interval (d1) shown in FIG. 28, only the polarity of the voltage supplied to the first electrode pair defining the first divided region 15a is again reversed, and the direction of the electric field applied to the first divided region 15a is switched to the leftward direction as indicated by the arrow in FIG. 29(d). The direction of the electric field applied to the second divided region 15b does not change and is applied in the rightward direction as indicated by the arrow in FIG. 29(d).

After the time interval (d1), the electric field is applied again similarly to the time interval (a1).

A time T made up of the time intervals (a1) through (d1) shown in FIG. 28 is equal to the time required to update one image by the line-sequential scanning system, that is, one frame.

In other words, during one frame that is required to update one image by the line-sequential scanning system, the liquid crystal layer 15 is driven, so that the tilt angle of the optical axes of the liquid crystal material forming the liquid crystal layer 15 is maintained approximately constant independently within each of the divided regions 15a and 15b, by the first time interval (a1) in which the electric field is time-divisionally applied in a first direction with respect to the first and second divided regions 15a and 15b, the second time interval (b1) in which the direction of the electric field time-divisionally applied with respect to the first divided region 15a is switched to a second direction that is opposite to the first direction, the third time interval (c1) in which the electric field is time-divisionally applied with respect to the first and second divided regions 15a and 15b in the second direction, and the fourth time interval (d1) in which the direction of the electric field time-divisionally applied with respect to the first divided region 15a is switched to the first direction. In this case where the number N of divided regions into which the effective region is divided is N=2, a total number of the first through fourth time intervals (a1) through (d1) is desirably 2N=4.

The mismatch time interval in which the electric field is applied in mutually different directions (the polarity of the supplied voltage is mutually different) between the first and second divided regions 15a and 15b is set as short as possible in the first through ninth embodiments described above, so as to increase the time interval in which the optical axes are uniformly oriented within the effective region. On the other hand, in this tenth embodiment, this mismatch time interval is positively inserted, so as to improve the effect of increasing the apparent number of pixels of the image display apparatus employing the line-sequential scanning system by use of the optical axis deflecting element 10.

Figure 30:
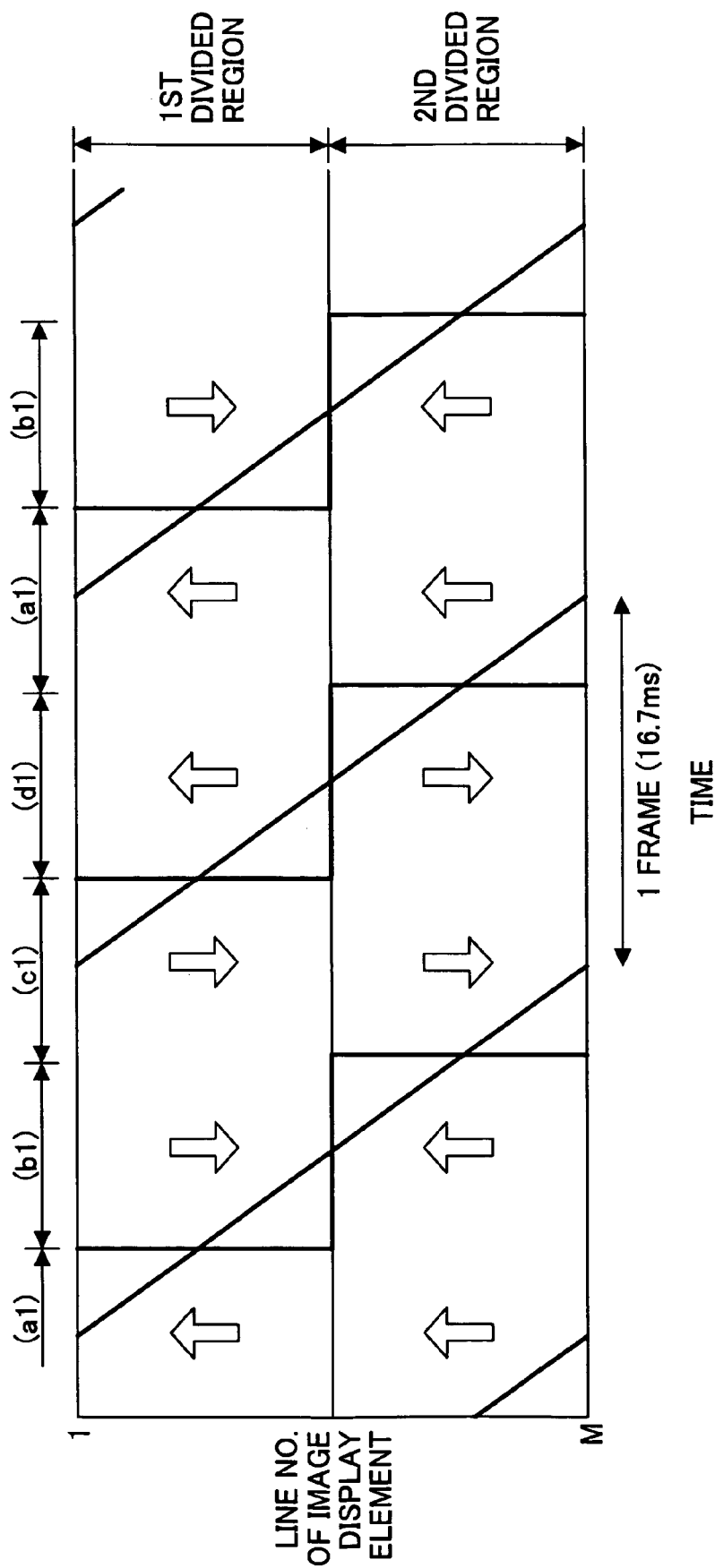
FIG. 30 is a timing chart schematically showing the image information updating timing including the orientation switching time of the liquid crystal molecules of the optical axis deflecting element in the tenth embodiment.

FIG. 30 is a timing chart schematically showing the image information updating timing including the orientation switching time of the liquid crystal molecules of the optical axis deflecting element 10 in this tenth embodiment. In FIG. 30, the abscissa indicates the time in arbitrary units, and the ordinate indicates the line number (position) of the image display element. An oblique solid line represents the start and the end of the updating of the image information for a certain line. A bold solid line indicates the optical axis deflecting timing of the optical axis deflecting element 10. In addition, arrows indicate the relationship of the directions of the electric field applied to the first and second divided regions 15a and 15b by supplying the voltages of the corresponding polarities to the electrode pairs defining the first and second divided regions 15a and 15b. The time required to update the first through Mth lines, that is, the time required to update one image, is referred to as one frame. When one frame is set to 16.7 milliseconds (or 60 Hz), for example, the flicker will not appear conspicuous to the human eye.

Since the scanning speed of the image display apparatus employing the line-sequential scanning system is approximately constant, the lengths of the time intervals (a1), (b1), (c1) and (d1) shown in FIG. 28 are desirably approximately the same. In other words, when the time of one frame of the image display apparatus is denoted by T and the number of divided regions into which the effective region of the optical axis deflecting element 10 is divided is denoted by N (N=2 in this case), it is most effective to set the length of each of the time intervals (a1), (b1), (c1) and (d1) to $T/2 \times N = T/4$ as shown in FIG. 28. By this setting, it is possible to minimize the error between the write timing of the image display apparatus and the optical axis deflecting timing of the optical axis deflecting element 10 as shown in FIG. 30, and suppress the image deterioration when using the image display apparatus employing the line-sequential scanning system. That is, the optical axis deflecting timing in the divided regions 15a and 15b of the optical axis deflecting element 10 indicated by the bold sold line in FIG. 30 is set to a staircase (or stepped) characteristic approximating the linear characteristic (oblique solid line) indicating the start and end of the updating of the image information for the certain line.

If the time T of one frame is 16.7 milliseconds (60 Hz), this time T is equally divided into 16 segments in FIG. 28, and the pulse width of the voltage supplied to each electrode pair is approximately 1 millisecond (960 Hz). In addition, if each of the time intervals (a1), (b1), (c1) and (d1) is referred to as a sub frame of the optical axis deflection, one sub frame is approximately 4.2 milliseconds (240 Hz). In this case, there are two pulses within one sub frame. However, the number of pulses within one sub frame is not limited to two. In other words, in the state where no electric field is applied to the divided region, the liquid crystal molecules within this divided region tend to return to the non-tilted state, and for this reason, the voltage supplied to the electrode pair defining this divided region only needs to be supplied in the form of a plurality of pulses so as to maintain the orientation or tilt of the liquid crystal molecules. In order to obtain the effect of increasing the apparent number of pixels using the optical axis deflecting element in the image display apparatus employing the line-sequential scanning system, one frame needs to be divided into a number of sub frames corresponding to the number of pixels by which the apparent number of pixels is to be increased. If the desired effect of increasing the apparent number of pixels is four times, one frame needs to be divided into four sub frames.

Moreover, between the first and second divided regions 15a and 15b, the timings with which the voltage is supplied to the corresponding electrode pairs defining the first and second divided regions 15a and 15b are shifted by one pulse. Accordingly, the voltage will not be supplied simultaneously with respect to the electrode pairs defining different divided regions at one time. This is to prevent the generation of the electric field in a direction opposite to the direction in which the electric field is to be originally applied, that would otherwise occur if the voltage were simultaneously supplied to the different divided regions.

As may be seen from FIG. 28, the pulse width and the pulse intervals of the voltage supplied to the electrode pair defining each divided region are set so that the pulse width does not overlap on the time base with the pulse width of the voltage supplied to the electrode pair defining other divided regions. Further, the pulse width is set to a time greater than or equal to the time required to switch the tilt angle of the optical axes of the liquid crystal material forming the liquid crystal layer 15 by applying the electric field, and the pulse intervals are set to a time less than the time required for the title angle of the optical axes of the liquid crystal material to return to the initial state when the application of the electric field is stopped.

Of course, the voltage waveform supplied to each electrode pair is not limited to the pulse form (rectangular waveform), and other waveforms such as a sinusoidal waveform and a triangular waveform may be used.

In order to simplify the description, the power supply 18 is illustrated in FIG. 5 as a D.C. power supply, and the electric field E is illustrated as being applied in only one direction. However, the power supply 18 may be formed by an A.C. power supply which supplies a rectangular wave A.C. voltage, so that the direction of the electric field E applied to each of the divided regions 15a and 15b may be reversed.

In the tenth embodiment described above, the number N of divided regions into which the effective region of the optical axis deflecting element is divided is N=2. However, the present invention is similarly applicable to case where N is greater than or equal to 3.

A description will now be given of an eleventh embodiment of the present invention. In this eleventh embodiment, N=3. The cross section of the important portion of the optical axis deflecting element is basically the same as that shown in FIG. 3, except for the different number of dividing electrodes, and thus, a description and illustration thereof will be omitted.

Figure 31:
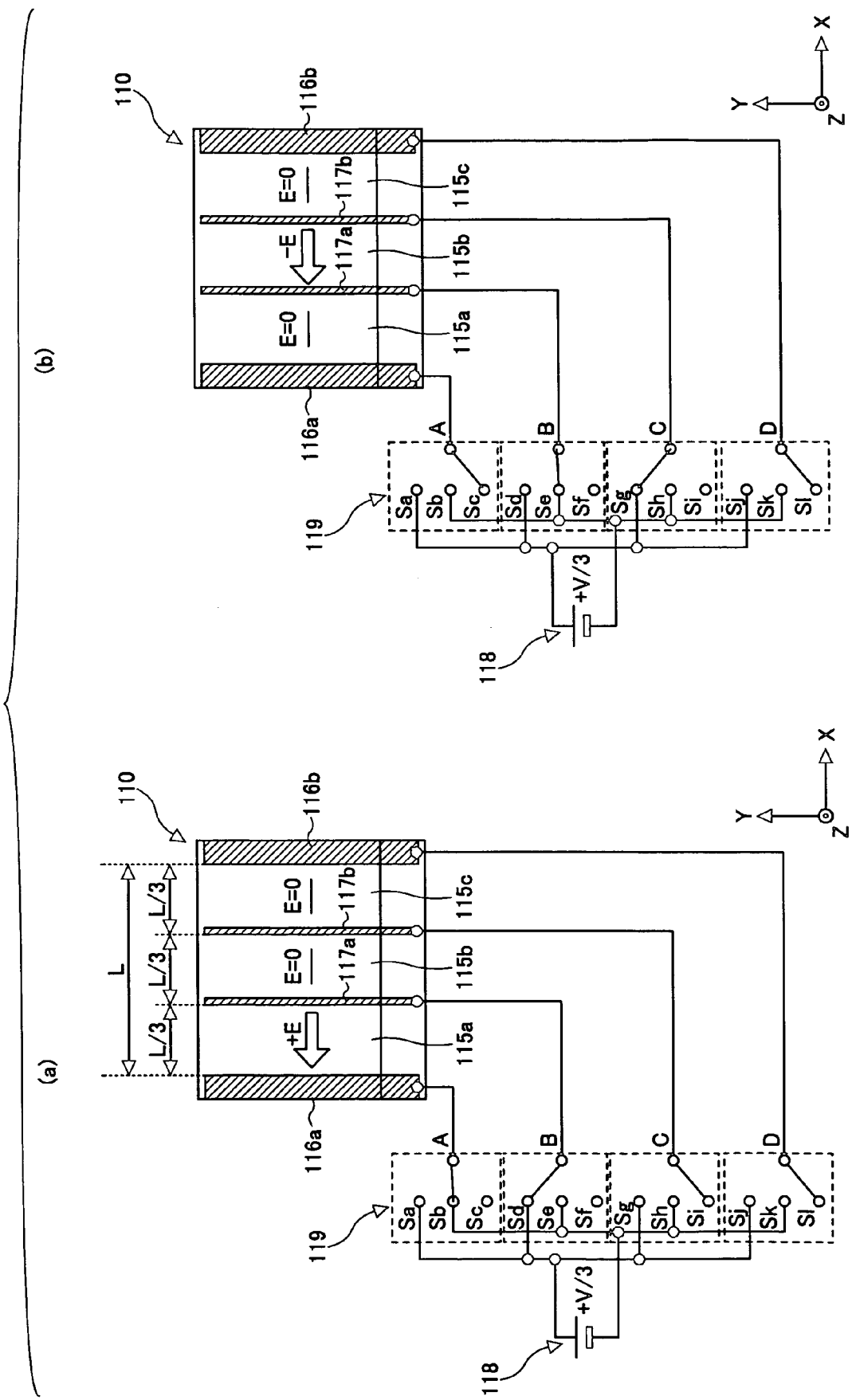
FIG. 31 is a diagram for explaining the operation of the optical axis deflecting element in an eleventh embodiment of the present invention.

FIG. 31 is a diagram for explaining the operation of an optical axis deflecting element 110 in this eleventh embodiment of the present invention. FIG. 31(a) shows a state where the electric field is applied to the first divided region forming the effective region of the liquid crystal layer 15, and FIG. 31(b) shows a state where the electric field is applied to the second divided region forming the effective region of the liquid crystal layer 15.

As shown in FIG. 31, the effective region of the liquid crystal layer 15 of the optical axis deflecting element 110 has an effective width L. Two dividing electrodes 17a and 17b are provided within the effective region at approximately equal intervals, so as to divide the effective region into three dividing regions 115a, 115b and 115c respectively having a width of L/3. A driving part or means including a switching part 119 and a power supply 118 for supplying a power supply voltage +V/3 is connected to each of the electrodes 16a, 17a, 17b and 16b. By appropriately controlling the connection states of each of switches A through D of the switching part 119 with respect to terminals Sa through Sl, it is possible to selectively and time-divisionally supply the voltage to each of the electrode pairs.

When applying the electric field E of E=150 V/mm with respect to the entire effective region of the optical axis deflecting element with the effective length L of L=42 mm, for example, it is necessary to supply a high voltage of 6.3 kV. On the other hand, by alternately applying the electric field for a short time of approximately several milliseconds, for example, with respect to each of the divided regions of the effective region, the voltage that needs to be supplied can be reduced to approximately 2.1 kV which is ⅓ the high voltage of 6.3 kV even when applying the same electric field E of E=150 V/mm. Accordingly, it is possible to simplify the measures that need to be taken to prevent the generation of discharge and noise within the apparatus that uses the optical axis deflecting element 110, and to reduce the size of the power supply, thereby enabling both the cost and the power consumption of the entire apparatus that uses the optical axis deflecting element 110 to be reduced.

For example, the voltage is temporarily supplied to the first electrode pair (electrodes 116a and 117b) to generate the electric field in the first divided region 115a on the left side of FIG. 31(a) so as to tilt the optical axes of the liquid crystal layer 15 within the first divided region 115a, and the supply of voltage with respect to the first electrode pair defining the first divided region 115a is stopped after the optical axes assume a desired tilted state.

Immediately thereafter, the voltage is temporarily supplied to the second electrode pair (electrodes 117a and 117b) to generate the electric field in the second divided region 115b at the center of FIG. 31(b) so as to tilt the optical axes of the liquid crystal layer 15 within the second divided region 115b, and the supply of the voltage with respect to the second electrode pair defining the second divided region 115b is stopped after the optical axes assume a desired tilted state.

Immediately thereafter, the voltage is temporarily supplied to the third electrode pair (electrodes 117b and 116b) to generate the electric field in the third divided region 115c on the right side so as to tilt the optical axes of the liquid crystal layer 15 within the third divided region 115c, and the supply of the voltage with respect to the third electrode pair defining the second divided region 115c is stopped after the optical axes assume a desired tilted state.

Thereafter, at the time before the tilted state of the optical axes in the first divided region 115a returns to the initial state by the reorientation of the crystal layer 15, the electric field is temporarily applied again in the same direction as before with respect to the first divided region 115a defined by the first electrode pair (116a and 117a), so as to maintain the tilted state of the optical axes within the first divided region 115a.

Thereafter, at the time before the tilted state of the optical axes in the second divided region 115b returns to the initial state by the reorientation of the crystal layer 15, the electric field is temporarily applied again in the same direction as before with respect to the second divided region 115b defined by the second electrode pair (117a and 117b), so as to maintain the tilted state of the optical axes within the second divided region 115b.

Thereafter, at the time before the tilted state of the optical axes in the third divided region 115c returns to the initial state by the reorientation of the crystal layer 15, the electric field is temporarily applied again in the same direction as before with respect to the third divided region 115c defined by the first electrode pair (117b and 116b), so as to maintain the tilted state of the optical axes within the third divided region 115c.

Figure 32:
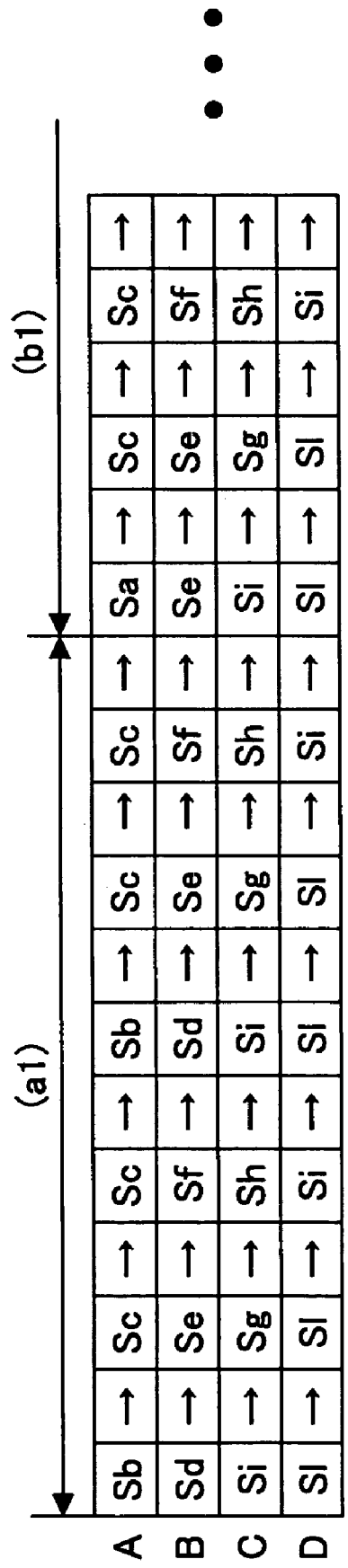
FIG. 32 is a diagram for explaining connection states of a switching part.
Figure 33:
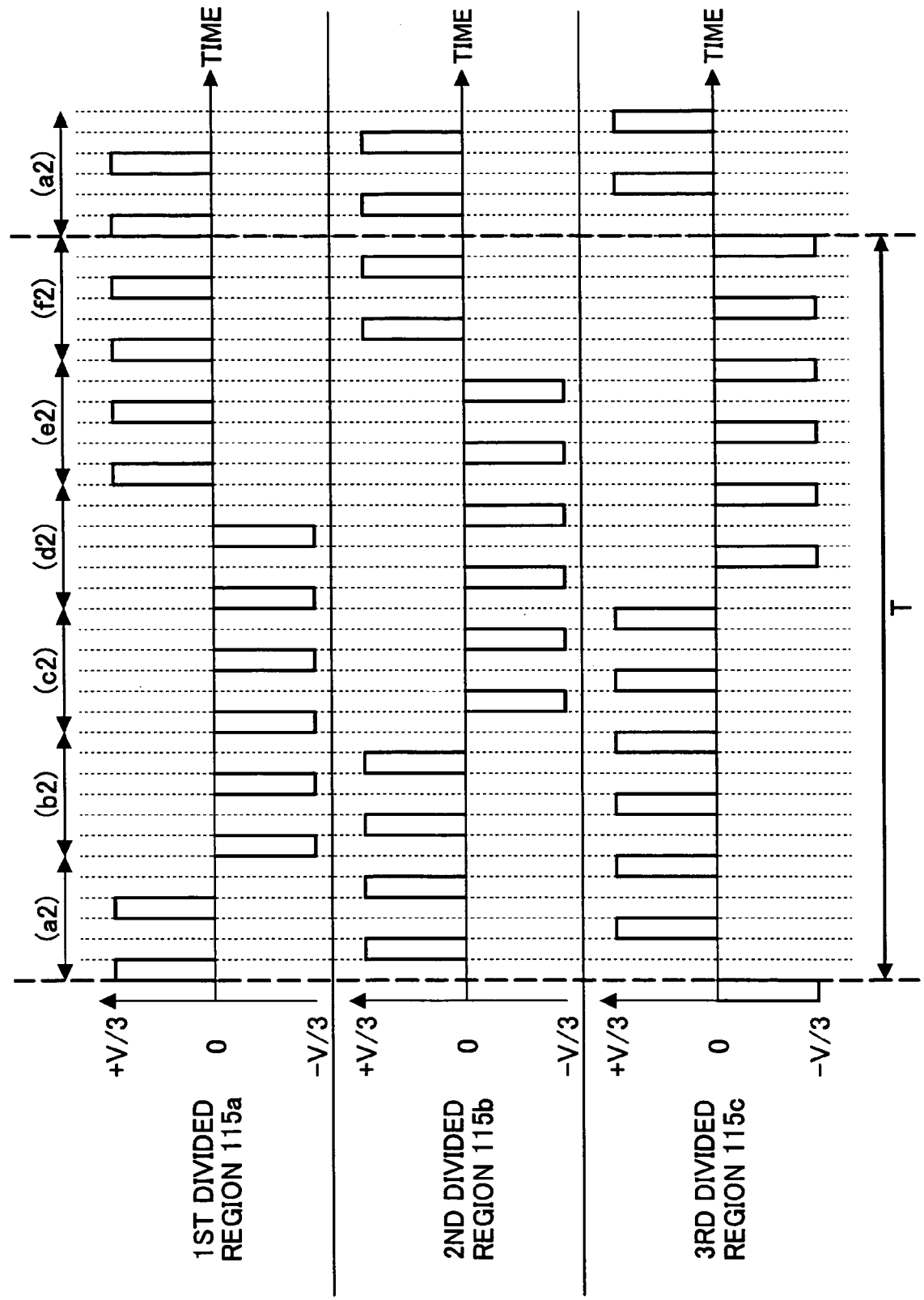
FIG. 33 is a diagram for explaining the voltage supplied to the electrode pair defining each divided region in the eleventh embodiment.
Figure 34:
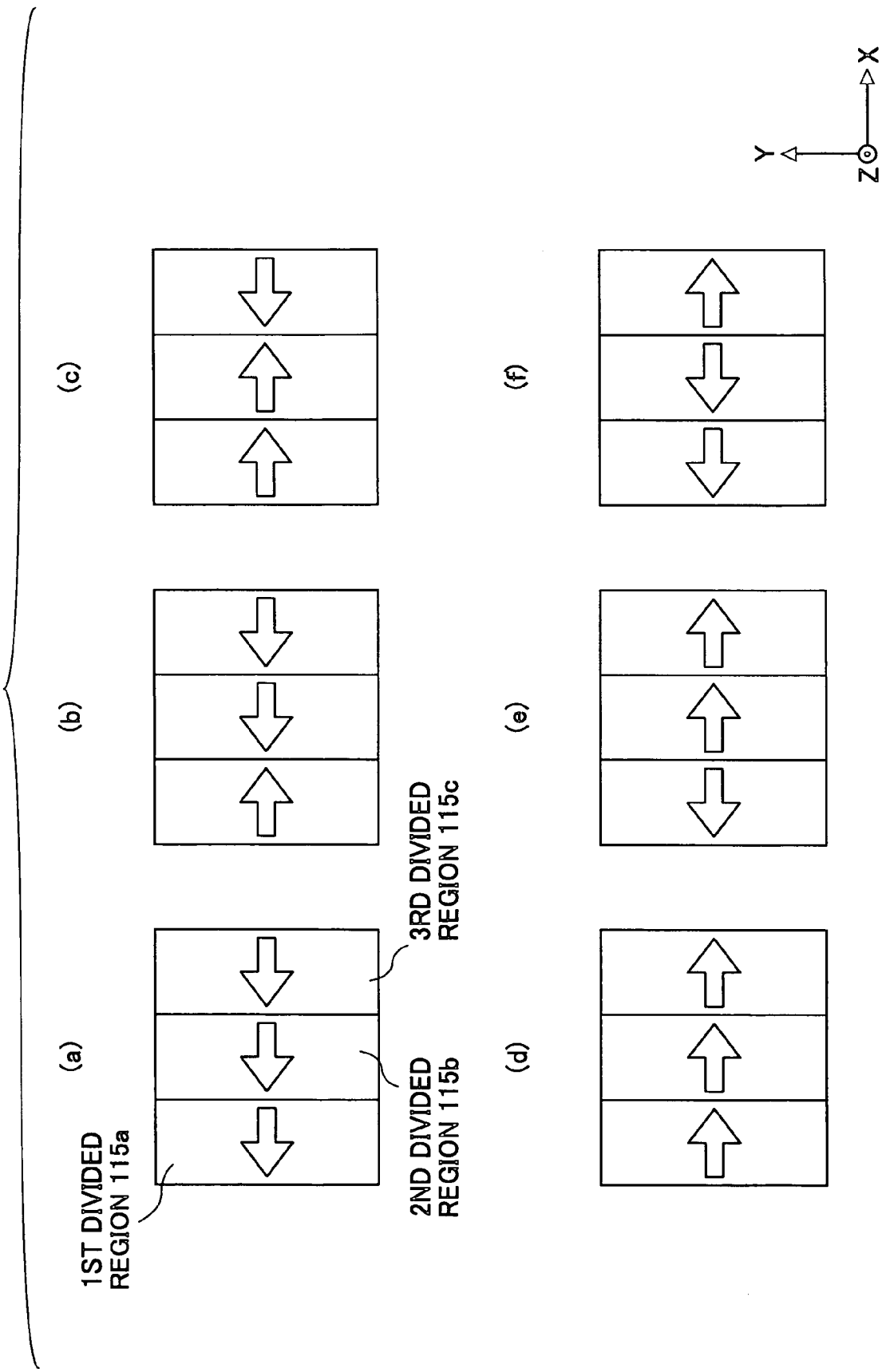
FIG. 34 is a diagram for explaining the electric field applied to each divided region in the eleventh embodiment.

FIG. 32 is a diagram for explaining connection states of the switching part 119, and FIG. 33 is a diagram for explaining the voltage supplied to the electrode pair defining each divided region in the eleventh embodiment. In FIG. 33, the upper portion indicates the voltage supplied to the first electrode pair defining the first divided region 115a, the central portion indicates the voltage supplied to the second electrode pair defining the second divided region 115b, and the lower portion indicates the voltage supplied to the third electrode pair defining the third divided region 115c. In addition, FIG. 34 is a diagram for explaining the electric field applied to each divided region in the eleventh embodiment.

During a time interval (a2) shown in FIG. 33, the direction in which the electric field is applied to the first through third divided regions 115a through 115c is the same and is in the leftward direction as indicated by arrows in FIG. 34(a). During this time interval (a2) shown in FIG. 33, the switch A of the switching part 119 shown in FIG. 31(a) is connected to the terminals as shown in FIG. 32 in the sequence of the terminals Sb→Sc→Sc→Sb→Sc→Sc, the switch B of the switching part 119 is connected to the terminals in the sequence of the terminals Sd→Se→Sf→Sd→Se→Sf, the switch C of the switching part 119 is connected to the terminals in the sequence of the terminals Si→Sg→Sh→Si→Sg→Sh, and the switch D of the switching part 119 is connected to the terminals in the sequence of the terminals Sl→Sl→Si→Sl→Sl→Si.

During a time interval (b2) shown in FIG. 33, the polarity of only the voltage supplied to the first electrode pair defining the first divided region 115a is reversed to the negative polarity, so that the direction of the electric field applied to the first divided region 115a is switched to the rightward direction as indicated by an arrow in FIG. 34(b), while the direction of the electric field applied to the second and third divided regions 115b and 115c remains the same, namely, the leftward direction as indicated by arrows in FIG. 34(b). Hence, during the time interval (b2) shown in FIG. 33, the switches A through D of the switching part 119 shown in FIG. 31 are connected to the terminals in the sequence shown in FIG. 32.

During a time interval (c2) shown in FIG. 33, the polarity of the voltage supplied to the second electrode pair defining the second divided region 115b is also reversed to the negative polarity, so that the direction of the electric field applied to the second divided region 115b is also switched to the rightward direction as indicated by an arrow in FIG. 34(c), while the direction of the electric field applied to the third divided region 115c remains the same, namely, the leftward direction as indicated by an arrow in FIG. 34(c).

During a time interval (d2) shown in FIG. 33, the polarity of the voltage supplied to the third electrode pair defining the third divided region 115c is also reversed to the negative polarity, so that the direction of the electric field applied to the third divided region 115c is also switched to the rightward direction as indicated by an arrow in FIG. 34(d).

During a time interval (e2) shown in FIG. 33, the polarity of only the voltage supplied to the first electrode pair defining the first divided region 115a is reversed again to the positive polarity, so that the direction of the electric field applied to the first divided region 115a is switched to the leftward direction as indicated by an arrow in FIG. 34(e), while the direction of the electric field applied to the second and third divided regions 115b and 115c remains the same, namely, the rightward direction as indicated by arrows in FIG. 34(e).

During a time interval (f2) shown in FIG. 33, the polarity of the voltage supplied to the second electrode pair defining the second divided region 115b is also reversed again to the positive polarity, so that the direction of the electric field applied to the second divided region 115b is also switched to the leftward direction as indicated by an arrow in FIG. 34(f), while the direction of the electric field applied to the third divided region 115c remains the same, namely, the rightward direction as indicated by an arrow in FIG. 34(f).

After the time interval (f2), the electric field is applied again similarly to the time interval (a2).

A time T made up of the time intervals (a2) through (f2) shown in FIG. 33 is equal to the time required to update one image by the line-sequential scanning system, that is, one frame.

In other words, during one frame that is required to update one image by the line-sequential scanning system, the liquid crystal layer 15 is driven, so that the tilt angle of the optical axes of the liquid crystal material forming the liquid crystal layer 15 is maintained approximately constant independently within each of the divided regions 115a through 115c, by the first time interval (a2) in which the electric field is time-divisionally applied in a first direction with respect to the first through third divided regions 115a through 15c, the second time intervals (b2) and (c2) in which the direction of the electric field time-divisionally applied with respect to the first and second divided regions 115a and 115b is sequentially switched to a second direction that is opposite to the first direction, the third time interval (d2) in which the electric field is time-divisionally applied with respect to the first through third divided regions 115a through 115c in the second direction, and the fourth time intervals (e2) and (f2) in which the direction of the electric field time-divisionally applied with respect to the first and second divided regions 115a and 115b is sequentially switched to the first direction. In this case where the number N of divided regions into which the effective region is divided is N=3, a total number of the first through fourth time intervals (a2) through (f2) is desirably 2N=6.

The mismatch time interval in which the electric field is applied in mutually different directions (the polarity of the supplied voltage is mutually different) between the first and second divided regions 115a and 115b or, between the second and third divided regions 115b and 115c, is set as short as possible in the first through ninth embodiments described above, so as to increase the time interval in which the optical axes are uniformly oriented within the effective region. On the other hand, in this eleventh embodiment, this mismatch time interval is positively inserted, so as to improve the effect of increasing the apparent number of pixels of the image display apparatus employing the line-sequential scanning system by use of the optical axis deflecting element 110.

Figure 35:
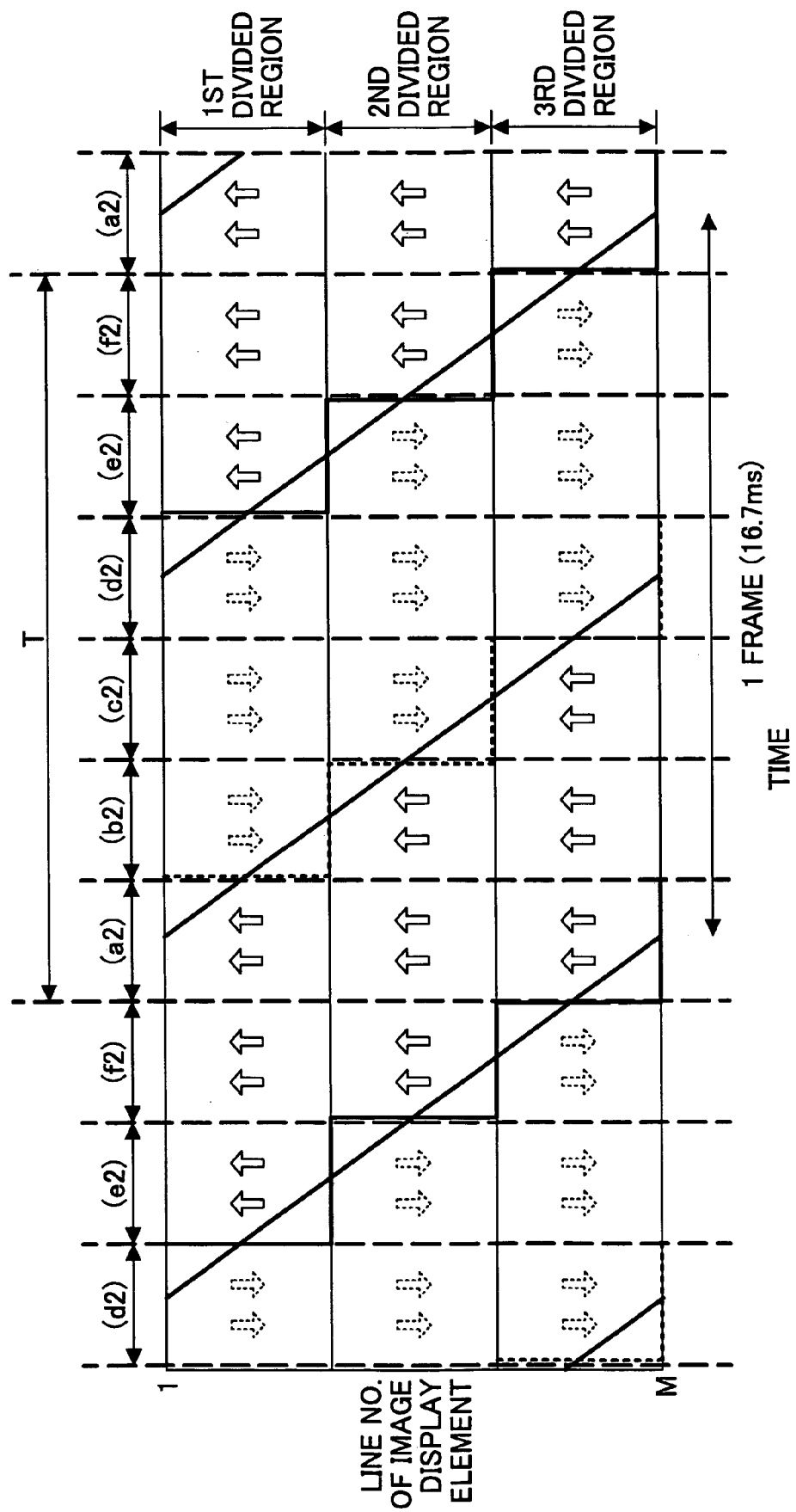
FIG. 35 is a timing chart schematically showing the image information updating timing including the orientation switching time of the liquid crystal molecules of the optical axis deflecting element in the eleventh embodiment.

FIG. 35 is a timing chart schematically showing the image information updating timing including the orientation switching time of the liquid crystal molecules of the optical axis deflecting element 110 in this eleventh embodiment. In FIG. 35, the abscissa indicates the time in arbitrary units, and the ordinate indicates the line number (position) of the image display element. An oblique solid line represents the start and the end of the updating of the image information for a certain line. A bold solid line indicates the optical axis deflecting timing of the optical axis deflecting element 110. In addition, arrows indicate the relationship of the directions of the electric field applied to the first through third divided regions 115a through 115c by supplying the voltages of the corresponding polarities to the electrode pairs defining the first through third divided regions 115a through 115c. The time required to update the first through Mth lines, that is, the time required to update one image, is referred to as one frame.

When one frame is set to 16.7 milliseconds (or 60 Hz), for example, the flicker will not appear conspicuous to the human eye.

Since the scanning speed of the image display apparatus employing the line-sequential scanning system is approximately constant, the lengths of the time intervals (a2), (b2), (c2), (d2), (e2) and (f2) shown in FIG. 33 are desirably approximately the same. In other words, when the time of one frame of the image display apparatus is denoted by T and the number of divided regions into which the effective region of the optical axis deflecting element 110 is divided is denoted by N (N=3 in this case), it is most effective to set the length of each of the time intervals (a2) through (f2) to T/3×N=T/6 as shown in FIG. 33. By this setting, it is possible to minimize the error between the write timing of the image display apparatus and the optical axis deflecting timing of the optical axis deflecting element 110 as shown in FIG. 35, and suppress the image deterioration when using the image display apparatus employing the line-sequential scanning system. That is, the optical axis deflecting timing in the divided regions 115a, 115b and 115c of the optical axis deflecting element 110 indicated by the bold sold line in FIG. 35 is set to a staircase (or stepped) characteristic approximating the linear characteristic (oblique solid line) indicating the start and end of the updating of the image information for the certain line.

If the time T of one frame is 16.7 milliseconds (60 Hz), this time T is equally divided into 36 segments in FIG. 33, and the pulse width of the voltage supplied to each electrode pair is approximately 0.5 millisecond (2.169 kHz). In addition, if each of the time intervals (a2) through (f2) is referred to as a sub frame of the optical axis deflection, one sub frame is approximately 2.8 milliseconds (360 Hz). In this case, there are two pulses within one sub frame. However, the number of pulses within one sub frame is not limited to two. In other words, in the state where no electric field is applied to the divided region, the liquid crystal molecules within this divided region tend to return to the non-tilted state, and for this reason, the voltage supplied to the electrode pair defining this divided region only needs to be supplied in the form of a plurality of pulses so as to maintain the orientation or tilt of the liquid crystal molecules. In order to obtain the effect of increasing the apparent number of pixels using the optical axis deflecting element in the image display apparatus employing the line-sequential scanning system, one frame needs to be divided into a number of sub frames corresponding to the number of pixels by which the apparent number of pixels is to be increased. If the desired effect of increasing the apparent number of pixels is six times, one frame needs to be divided into six sub frames.

Moreover, between the first and second divided regions 115a and 115b, between the second and third divided regions 115b and 115c, and between the third and first divided regions 115c and 115a, the timings with which the voltage is supplied to the corresponding electrode pairs defining the first, second and third divided regions 115a, 115b and 115c are shifted by one pulse. Accordingly, the voltage will not be supplied simultaneously with respect to the electrode pairs defining different divided regions at one time. This is to prevent the generation of the electric field in a direction opposite to the direction in which the electric field is to be originally applied, that would otherwise occur if the voltage were simultaneously supplied to the different divided regions.

As may be seen from FIG. 33, the pulse width and the pulse intervals of the voltage supplied to the electrode pair defining each divided region are set so that the pulse width does not overlap on the time base with the pulse width of the voltage supplied to the electrode pair defining other divided regions. Further, the pulse width is set to a time greater than or equal to the time required to switch the tilt angle of the optical axes of the liquid crystal material forming the liquid crystal layer 15 by applying the electric field, and the pulse intervals are set to a time less than the time required for the tilt angle of the optical axes of the liquid crystal material to return to the initial state when the application of the electric field is stopped.

Of course, the voltage waveform supplied to each electrode pair is not limited to the pulse form (rectangular waveform), and other waveforms such as a sinusoidal waveform and a triangular waveform may be used.

In order to simplify the description, the power supply 118 is illustrated in FIG. 31 as a D.C. power supply, and the electric field E is illustrated as being applied in only one direction. However, the power supply 118 may be formed by an A.C. power supply which supplies a rectangular wave A.C. voltage, so that the direction of the electric field E applied to each of the divided regions 115a, 115b and 115c may be reversed.

In the eleventh embodiment described above, the number N of divided regions into which the effective region of the optical axis deflecting element is divided is N=3. That is, N is an odd number in the eleventh embodiment. On the other hand, when N is an even number, the boundary line of the mutually adjacent divided regions is located at the center of the liquid crystal layer 15, that is, at the center of the width along the horizontal direction in the case shown in FIG. 5. When viewing the image by the human eye, there is a tendency for the human eye to focus particularly at the central portion of the image, and there is a possibility that the boundary line will appear conspicuously as noise. But when N is an odd number, the boundary line of the mutually adjacent divided regions will not be located at the center of the liquid crystal layer 15 as may be seen from FIG. 31, and the boundary line will not appear conspicuously as noise even to the human eye. Therefore, although N may be any integer greater than or equal to two, it is further desirable for N to be an odd number greater than or equal to three.

Next, a description will be given of a twelfth embodiment of the present invention. In this embodiment, the image display apparatus employing the line-sequential scanning system uses the optical axis deflecting element of the tenth or eleventh embodiment described above.

FIG. 36 is a diagram showing an important part of the image display apparatus including the optical axis deflecting element in this twelfth embodiment of the present invention. An image display apparatus 50 shown in FIG. 36 includes a light source 51, dichroic mirrors 52, mirrors 53, spatial light modulating elements (or liquid crystal panels) 54; a cross prism 55, an optical axis deflecting element 56, and a projection lens 57. The light source 51 includes a lamp 60, a fly eye lens 61, a polarization converting element 62 and the like. The spatial light modulating elements 54 form the image display element. A screen 58 may be a part of the image display apparatus 50 or, may be a separate part from the image display apparatus 50.

The illuminating light from the light source 51 is subjected to a spatial light modulation by the spatial light modulating elements 54, and image light is supplied to the optical axis deflecting element 56. The optical axis deflecting element 56 shifts (or deflects) the image light by an arbitrary distance in the direction in which the pixels are arranged, and an image that is enlarged by the projection lens 57 is projected onto the screen 58. By use of the optical axis deflecting element 56, it is possible to make the display by increasing the apparent number of pixels of the spatial light modulating elements 54, by displaying on the spatial light modulating elements 54 an image pattern having a display position that is shifted depending on the deflection of the optical path for each of the plurality of sub fields into which the image field is time-divisionally divided. By correcting the amount of shift of the image signal that drives the spatial light modulating elements 54 depending on the amount of shift (amount of deflection) by the optical axis deflecting element 56, it is possible to display on the screen 58 an image having an apparent high-definition.

FIG. 37 is a diagram showing a control system of the image display apparatus 50 shown in FIG. 36. In FIG. 37, the illustration of the light source 51 and the mirrors 52 and 53 is omitted. A control system 70 shown in FIG. 37 includes an image signal processing circuit 71, an image signal input circuit 72, a synchronizing circuit 73 and a control circuit 74. A driving part (or driving means) at least includes the control circuit 74, and may additionally include the synchronizing circuit 73 or, additionally include the synchronizing circuit 73 and the image signal processing circuit 71. The optical axis deflecting element 56 and the driving part may form an optical axis deflecting unit in the form of a module.

The image signal representing the image that is to be displayed on the screen 58 is input to the image signal processing circuit 71, and is subjected to a process such as converting the image signal into a signal format suited for display on the image display apparatus 50. The process carried out in the image signal processing circuit 71 includes the process of correcting the amount of shift of the image signal that is to drive the spatial light modulating elements 54 depending on the amount of shift (amount of deflection) of the optical axis deflecting element 56. The image signal input circuit 72 inputs the image signal subjected to the above described process to the corresponding spatial light modulating elements 54. The synchronizing circuit 73 generates synchronizing signals for synchronizing the line-sequential scan of the spatial light modulating elements 54, the electric field applying timing and the reversing timing with respect to each divided region of the liquid crystal layer of the optical axis deflecting element 56 (that is, the voltage supplying timing and the polarity reversing timing of the voltage supplied to the electrode pair defining each divided region). The control circuit 74 controls the connection of the switching part 19 shown in FIG. 7 or the switching part 119 shown in FIG. 31 based on the synchronizing signals, so as to supply the voltage (pulse voltage) shown in FIG. 28 or 33 to the electrode pair defining each divided region of the optical axis deflecting element 56, using the power supply voltage from the power supply 18 shown in FIG. 7 or the power supply 118 shown in FIG. 31. In FIG. 37, it is assumed for the sake of convenience that the switching part 19 or 119 is provided within the control circuit 74, however, the switching part 19 or 119 may of course be provided separately from the control circuit 74.

In FIGS. 36 and 37, the present invention is applied to the image display apparatus using the transmission type spatial light modulating element (or liquid crystal panel), but the present invention is of course similarly applicable to the image display apparatus using the reflection type spatial light modulating element (or liquid crystal panel).

The basic structure of the optical axis deflecting element to which the present invention is applicable is not limited to the basic structures of the tenth and eleventh embodiments described above, and the concept of the tenth and eleventh embodiments is similarly applicable to the basic structures of the first through ninth embodiments described above. All that is required for the concept to be applicable is that the effective region of the liquid crystal layer of the optical axis deflecting element is divided into a plurality of divided regions, and that it is possible to independently apply the electric field to each of the divided regions.

This application claims the benefit of Japanese Patent Application No. 2005-125787 filed Apr. 22, 2005, in the Japanese Patent Office, the disclosure of which is hereby incorporated by reference.

Further, the present invention is not limited to these embodiments, but various variations and modifications may be made without departing from the scope of the present invention.

What is claimed is:

1. An optical axis deflecting element comprising:
   a pair of transparent substrates;
   a liquid crystal layer disposed between substrate surfaces of the pair of transparent substrates and having a chiral smectic C-phase forming a homeotropic orientation; and
   a plurality of electrode pairs each defining one of a plurality of divided regions into which an effective region of the liquid crystal layer is divided,
   wherein an electric field is independently applicable to each divided region defined by a corresponding electrode pair in a direction parallel to the substrate surfaces.

2. The optical axis deflecting element as claimed in claim 1, wherein:
   the effective region has a width L between two electrodes defining the effective region; and
   if the two electrodes defining the effective region require a voltage V to be supplied thereto in order to generate an average electric field intensity E within the entire effective region, a voltage V/N is time-divisionally supplied to the electrode pairs defining each of N divided regions having a width of L/N and forming the effective region, where N is an integer greater than or equal to two.

3. The optical axis deflecting element as claimed in claim 1, wherein each electrode disposed within the effective region is formed by a transparent line electrode provided on a corresponding one of the substrate surfaces.

4. The optical axis deflecting element as claimed in claim 1, wherein a plurality of electrodes disposed within the effective region are formed by transparent line electrodes provided on a corresponding one of the substrate surfaces, and said optical axis deflecting element further comprises:
   a dielectric layer interposed between the transparent line electrodes and the liquid crystal layer; and
   a plurality of resistors coupling the transparent line electrodes in series.

5. The optical axis deflecting element as claimed in claim 1, wherein the electrodes are formed by transparent line electrodes provided on a corresponding one of the substrate surfaces, and said optical axis deflecting element further comprises:
   a transparent resistor layer provided on the corresponding one of the substrate surfaces over the transparent line electrodes.

6. The optical axis deflecting element as claimed in claim 1, wherein selected electrodes on one of the substrate surfaces are located at positions shifted relative to corresponding electrodes on the other of the substrate surfaces in a direction parallel to the direction in which the electric field is applied and perpendicular to a direction in which each electrode extends.

7. The optical axis deflecting element as claimed in claim 6, wherein the selected electrodes are configured to receive a voltage that generates the electric field in the divided region defined thereby.

8. The optical axis deflecting element as claimed in claim 6, wherein an amount $\Delta X$ of shift of the selected electrodes in a direction parallel to the substrate surfaces a distance $\Delta Z$ between the selected electrodes in a direction perpendicular to the substrate surfaces satisfy a relationship $(\Delta Z/2) > \Delta X$.

9. An optical axis deflecting unit comprising:
an optical axis deflecting element as claimed in claim 1; and
a driving part configured to time-divisionally supply a voltage to the electrode pairs defining each of the divided regions forming the effective region.

10. An image display apparatus comprising:
an image display element having a plurality of two-dimensionally arranged pixels capable of controlling light depending on image information; and
an optical axis deflecting unit as claimed in claim 9, configured to deflect an optical path of light from the image display element corresponding to each pixel thereof.

11. A driving method for driving an optical axis deflecting element comprising a pair of transparent substrates, a liquid crystal layer disposed between substrate surfaces of the pair of transparent substrates and having a chiral smectic C-phase forming a homeotropic orientation, and a plurality of electrode pairs each defining one of a plurality of divided regions into which an effective region of the liquid crystal layer is divided, said driving method comprising:
independently applying an electric field to each divided region defined by a corresponding electrode pair in a direction parallel to the substrate surfaces.

12. The driving method as claimed in claim 11, wherein the effective region has a width L between two electrodes defining the effective region, and if the two electrodes defining the effective region require a voltage V to be supplied thereto in order to generate an average electric field intensity E within the entire effective region, a voltage V/N is time-divisionally supplied to the electrode pairs defining each of N divided regions having a width of L/N and forming the effective region, where N is an integer greater than or equal to two.

13. The driving method as claimed in claim 12, wherein if the two electrodes defining the effective region require the voltage V to be supplied thereto for a time T in order to generate the average electric field intensity E within the entire effective region, the voltage V/N is time-divisionally supplied for a time T/N to the electrode pairs defining each of N divided regions forming the effective region.

14. The driving method as claimed in claim 13, wherein N is two or three.

15. The driving method as claimed in claim 13, wherein the voltage V/N is time-divisionally supplied for the time T/N to each electrode pair at intervals such that the voltage V/N is supplied again to each electrode pair before a tilted state of optical axes of the liquid crystal layer within the divided region defined thereby returns to an initial state by reorientation and the optical axes are maintained approximately in the tilted state.

16. A driving method for driving an optical axis deflecting element which has an effective region of a liquid crystal layer for transmitting light divided into first through Nth divided regions, where N is an integer greater than or equal to two, and an outgoing optical path of the optical axis deflecting element is switched with respect to incoming light by time-divisionally applying an electric field to the first through Nth divided regions in a direction approximately parallel to a direction in which the first through Nth divided regions are arranged, said driving method comprising:
driving the liquid crystal layer in a first time interval, at least one second time interval, a third time interval and at least one fourth time interval so that a tilt angle of optical axes of a liquid crystal material forming the liquid crystal layer is maintained approximately constant independently within each of the first through Nth divided regions during one frame that is required to update one image by a line-sequential scanning system,
said first time interval time-divisionally applying the electric field in a first direction with respect to the first through Nth divided regions;
said second time interval sequentially switching a direction of the electric field that is time-divisionally applied to the first through (N−1)-th divided regions to a second direction which is opposite to the first direction;
said third time interval time-divisionally applying the electric field in the second direction with respect to the first through Nth divided regions; and
said fourth time interval sequentially switching the direction of the electric field that is time-divisionally applied to the first through (N−1)-th divided regions to the first direction.

17. The driving method as claimed in claim 16, wherein a pulse voltage is supplied to electrode pairs defining each of the first through Nth divided regions in each of the first through fourth time intervals.

18. The driving method as claimed in claim 17, wherein:
a first voltage is supplied to the electrode pairs defining each of the first through Nth divided regions during the first time interval;
a second voltage having a polarity opposite to the first voltage is supplied to the electrode pairs defining each divided region to which the electric field is applied in the second direction;
the second voltage is supplied to the electrode pairs defining each of the first through Nth divided regions during the third time interval; and
the first voltage is supplied to the electrode pairs defining each divided region to which the electric field is applied in the first direction.

19. The driving method as claimed in claim 17, wherein a pulse width and pulse intervals of the voltage supplied to the electrode pairs defining each of the first through Nth divided regions are set so that the pulse width does not overlap a pulse width of the voltage supplied to the electrode pairs defining other divided regions on a time base.

20. The driving method as claimed in claim 16, wherein a plurality of said second time intervals and said fourth time intervals are provided, and a total number of time intervals of the first through fourth time intervals is 2N, where N is an odd number greater than or equal to three.

* * * * *